(12) United States Patent
Woodruff et al.

(10) Patent No.: US 12,209,577 B2
(45) Date of Patent: *Jan. 28, 2025

(54) FIBER-FED ADVANCED PULSED PLASMA THRUSTER (FPPT)

(71) Applicant: CU Aerospace, LLC, Champaign, IL (US)

(72) Inventors: Curtis Woodruff, Savoy, IL (US);
Darren King, Champaign, IL (US);
Rodney Burton, Northbrook, IL (US);
David L. Carroll, Champaign, IL (US);
Magdalena Parta, Urbana, IL (US)

(73) Assignee: CU Aerospace, LLC, Champaign, IL (US)

( * ) Notice: Subject to any disclaimer, the term of this patent is extended or adjusted under 35 U.S.C. 154(b) by 522 days.

This patent is subject to a terminal disclaimer.

(21) Appl. No.: 17/559,178

(22) Filed: Dec. 22, 2021

(65) Prior Publication Data

US 2022/0106944 A1 Apr. 7, 2022

Related U.S. Application Data

(63) Continuation-in-part of application No. 16/439,755, filed on Jun. 13, 2019, now Pat. No. 11,242,844, which is a continuation-in-part of application No. 16/436,149, filed on Jun. 10, 2019, now Pat. No. 10,570,892.

(60) Provisional application No. 62/684,275, filed on Jun. 13, 2018.

(51) Int. Cl.
*F03H 1/00* (2006.01)
*B64G 1/40* (2006.01)

(52) U.S. Cl.
CPC .......... *F03H 1/0087* (2013.01); *B64G 1/405* (2013.01)

(58) Field of Classification Search
CPC ... B64G 1/24; B64G 1/28; B64G 1/40; B64G 1/244; B64G 1/283; B64G 1/428
See application file for complete search history.

(56) References Cited

U.S. PATENT DOCUMENTS

| | | |
|---|---|---|
| 3,159,966 A | 12/1964 | Curtis |
| 3,603,089 A | 9/1971 | Esker et al. |
| 4,233,537 A | 11/1980 | Limpaecher |
| 4,821,509 A | 4/1989 | Burton et al. |
| 5,111,656 A | 5/1992 | Simon et al. |

(Continued)

*Primary Examiner* — Ehud Gartenberg
*Assistant Examiner* — William L Breazeal
(74) *Attorney, Agent, or Firm* — Adam K. Sacharoff; Much Shelist. P.C.

(57) ABSTRACT

A Fiber-fed Pulsed Plasma Thruster (FPPT) has an anode, a coaxial insulator, and a fiber propellant feed system. At least two cathodes insulated from each other are configured about the coaxial insulator to define an interior profile shaped into a nozzle region. At least one igniter fitted through each cathode. Wherein when the igniters are triggered, the igniters expel electrons toward the anode to ignite a primary high energy discharge between the anode and the cathodes thereby creating a plasma that vaporizes the fiber propellant. The dissociated fiber propellant combines with the primary high energy discharge to create a partially or fully ionized plasma, that is electromagnetically and electrothermally accelerated to produce predominantly $\vec{j} \times \vec{B} \vec{j} \times \vec{B}$ thrust.

24 Claims, 56 Drawing Sheets

(56) References Cited

U.S. PATENT DOCUMENTS

| | | |
|---|---|---|
| 5,924,278 A | 7/1999 | Burton et al. |
| 6,075,321 A | 6/2000 | Hruby |
| 6,216,445 B1 | 4/2001 | Byers et al. |
| 6,300,720 B1 | 10/2001 | Birx |
| 6,318,069 B1 | 11/2001 | Falce et al. |
| 6,336,318 B1 | 1/2002 | Falce et al. |
| 6,378,290 B1 | 4/2002 | Killinger et al. |
| 6,449,941 B1 | 9/2002 | Warboys et al. |
| 7,530,219 B1 | 5/2009 | Burton et al. |
| 7,926,257 B1 | 4/2011 | Burton et al. |
| 7,926,258 B1 | 4/2011 | Burton et al. |
| 11,242,844 B2 * | 2/2022 | Woodruff .............. F03H 1/0012 |

* cited by examiner

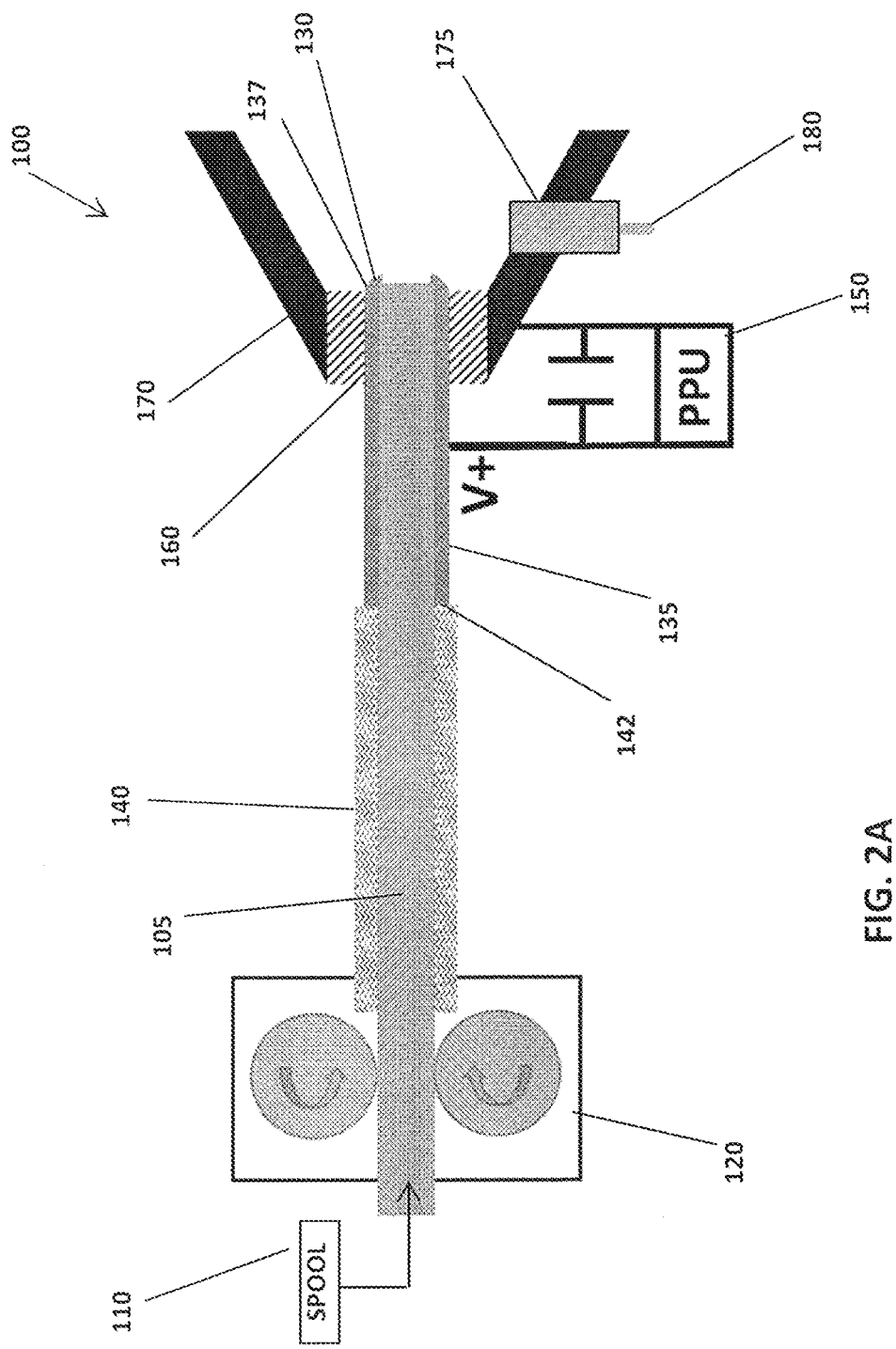

14.6 J Unsion Capacitor     9V battery (for scale)     15.2 J MLCC Capacitor Bank

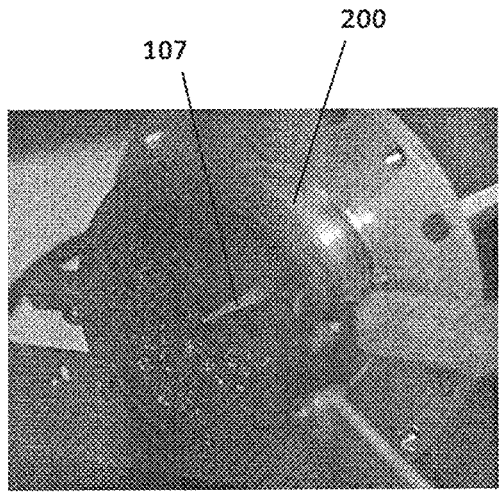 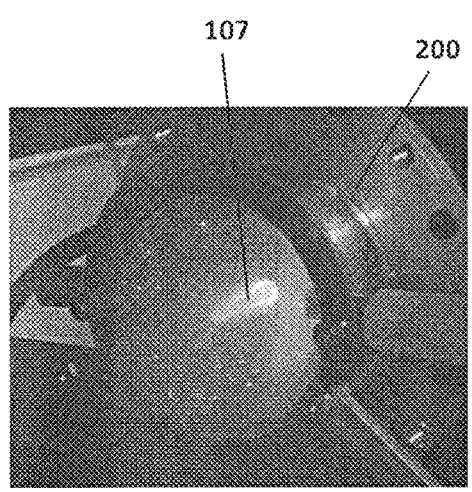
FIG. 15A    FIG. 15B
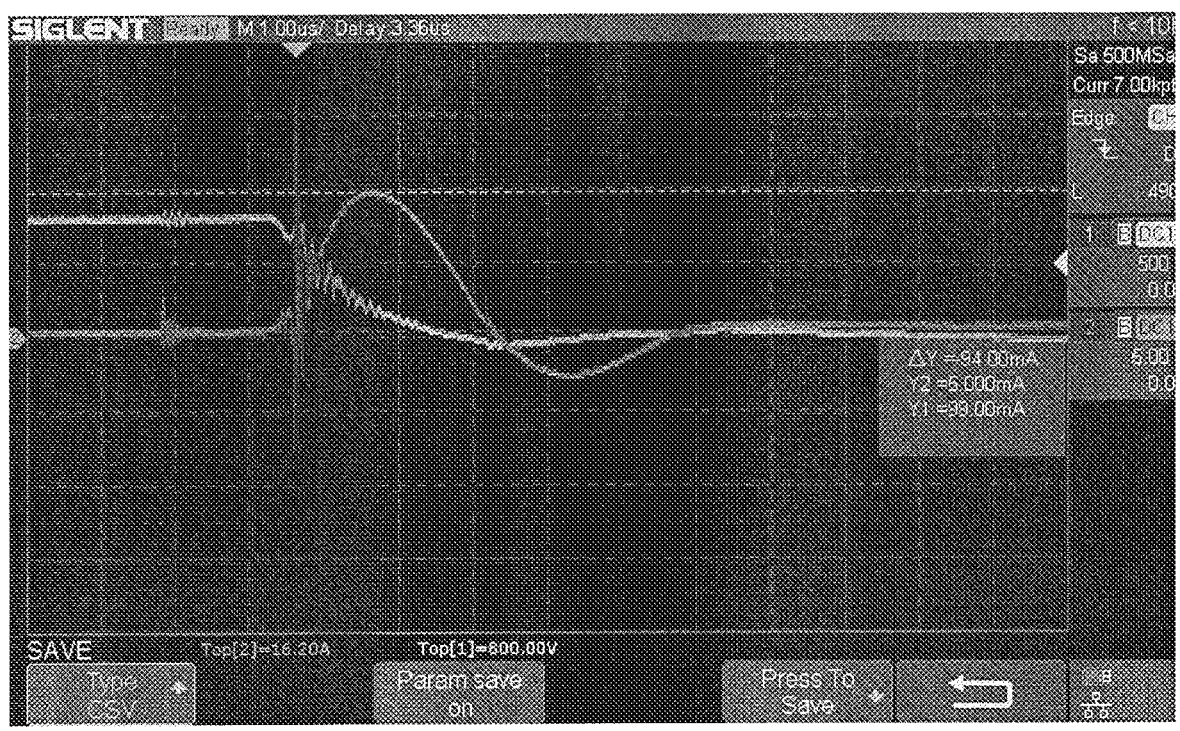
FIG. 16

| Region | Description |
|---|---|
| $0 < \Omega e < 1$ | High pressure, low B field, low ionization, electron current dominates |
| $\Omega e \sim 1$ | Medium pressure, medium B field, both ion and electron current |
| $\Omega e > 1$ | Low pressure, high B field, high ion current, low electron current |
| $\Omega e \gg 1$ | Lowest pressure, highest B field, high ionization, ion current dominates |

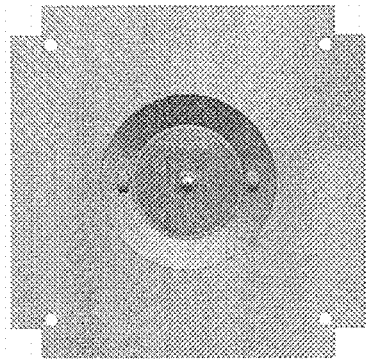 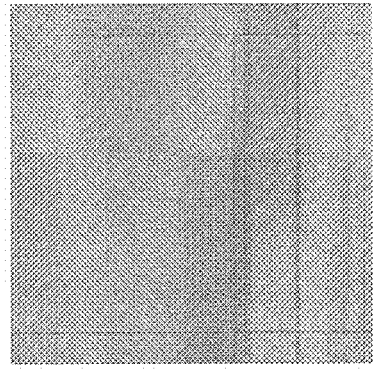 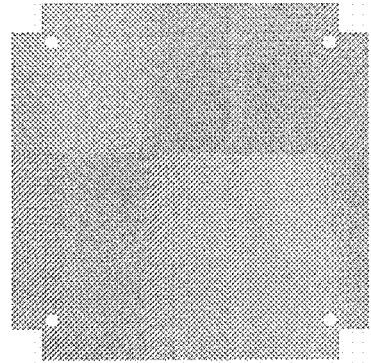
FIG. 26A  FIG. 26B  FIG. 26C
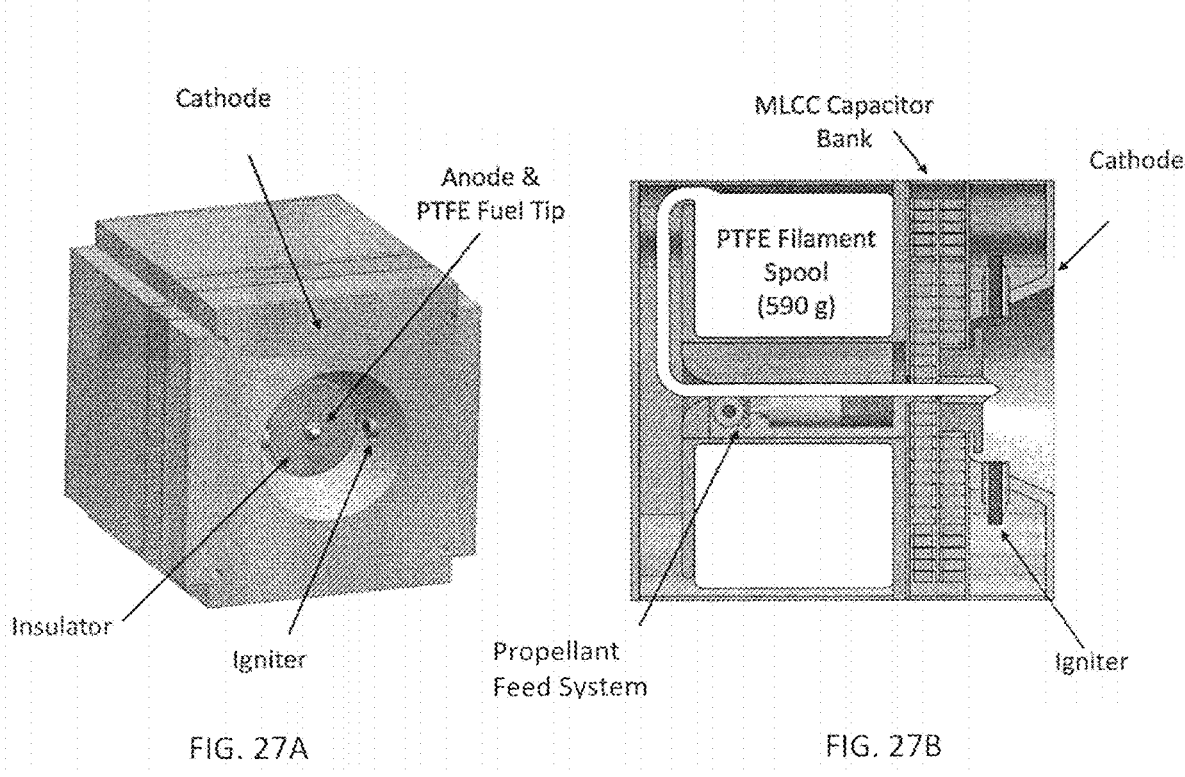
FIG. 27A  FIG. 27B Force Force

FIBER-FED ADVANCED PULSED PLASMA THRUSTER (FPPT)

CROSS-REFERENCE TO RELATED APPLICATIONS

The present invention in a Continuation in Part of U.S. application Ser. No. 16/439,755 filed Jun. 19, 2019 which is a Continuation in Part of U.S. application Ser. No. 16/436,149 filed Jun. 10, 2019 now U.S. Pat. No. 10,570,892 Issued Feb. 25, 2020, which claims priority to U.S. Provisional Application 62/684,275 filed Jun. 13, 2018, all of which are hereby incorporated in their entirety by reference.

STATEMENT OF GOVERNMENT SUPPORT

This invention was made with government support under NNX17CP36P and 80NSSC18C0063 awarded by NASA. The Government has certain rights in the invention.

BACKGROUND OF THE INVENTION

While classic pulsed plasma thruster (hereinafter "PPT") propulsion system technology is mature, it has historically been limited by its high mass and small propellant load to precision pointing and small total impulse applications. The PPT has a technology readiness level (TRL) of 9, having flown on several spacecraft beginning with the Soviet Zond 2 mission in 1964, accumulating over 30 thruster years in space through 1991. The LES 8/9 PPT was not flown but demonstrated $34 \times 10^6$ pulses during development and flight qualification. More recently (2000-2017), the PPT was employed for pitch control on the Earth Observing 1 (EO-1) spacecraft. The principal use of these PPTs has been for attitude control and precision orbital adjustments including station keeping, but not for primary propulsion applications such as orbit change and de-orbiting. Extensive flight experience demonstrates that technical risk areas such as pulse electromagnetic interference, exhaust condensation and system life have been successfully mitigated, supporting a TRL 9 rating.

An attempt at higher impulse PPT applications was an Air Force Rocket Propulsion Laboratory/Fairchild Industries program which concluded in 1977. This project was devoted to developing the PPT for station keeping of 500 kg-class satellites, producing a one-millipound (4.4 mN) PPT with an impulse capability of 166,000 N–s from 10.6 kg of PTFE (Teflon™) propellant (as used herein PTFE refers to polytetrafluoroethylene). The twin rectangular propellant bars were stored as opposed helices, and the pillbox-shaped thruster envelope had a volume of ~85 liters, with a total system mass, including 10 kg of high voltage capacitors, of 24 kg. The self-field $\vec{j} \times \vec{B} \vec{j} \times \vec{B}$ device generated thrust between plane parallel electrodes through a side exhaust nozzle from 450 J pulses at 0.20 Hz, at a mean thruster power of 90 W. System specific mass was $\alpha=210$ kg/kW. The PPU mass was 2.4 kg, and the PPU specific mass was high at ~15 kg/kW. A question remains as to the accuracy of the specific impulse, as $I_{sp}$ was claimed as 2200 seconds and did not include eroded electrode mass in the calculation. The one-millipound thruster demonstrated that the Teflon™ (PTFE) PPT can generate very high total impulse, with a volumetric impulse of 2700 N–s/liter, but did not demonstrate low specific mass [kg/kW].

Historically, pulsed plasma systems have targeted small total impulse applications such as attitude control. With Applicant's Fiber-fed Pulsed Plasma Thruster (hereinafter "FPPT") and its innovative propellant feed and storage system, FPPT is projected to outperform previous state of the art PPT systems, as well as newer technologies. With an anticipated>5,000 N–s total impulse from a 1U system, and a 1U mass of <1.5 kg, 100s of km orbit altitude transfers and inclination changes of tens of degrees are now available to smaller satellites. The intrinsic safety of FPPT and its inert, unpressurized PTFE propellant position it as a prime candidate for secondary payload missions where costs and logistics are dominated by range safety concerns. The solid propellant has no handling, storage, or operational restrictions. The ease of handling and storage for the solid propellant can extend operation to planetary missions with no additional monitoring or controls. FPPT system unit costs are anticipated to be significantly below competing solid, liquid or gas-fed CubeSat propulsion systems.

Specific goals stated in NASA's 2015 Roadmap In-Space Propulsion Technologies Technical Areas 2.1.1, Chemical Propulsion, and 2.1.7, Micropropulsion, are "Enhance current missions and open up new mission opportunities through improvements in performance, manufacturability, durability, and cost", "Develop engines that operate on non-toxic storable propellants", and "Develop compact and lightweight systems with high precision control capability." Applicant's FPPT propulsion system responds directly to these goals with a focus on high total impulse performance with cost reduction through common commercial-off-the-shelf (COTS) materials of construction.

Commercial interest in very small satellites continues to grow in the 1-500 kg satellite sector. Moving forward, it is more important than ever that these satellites have access to propulsion systems to extend their asset time on orbit. The FPPT system offers CubeSats and larger small satellites a significant propulsion capability with high impulse per unit volume. The Teflon™ (or PTFE equivalent) propellant has no handling, storage, and operational restrictions. FPPT will require no safety equipment for storage, transportation, integration, and testing, and place no demanding requirements on the launch provider, making it an ideal low-cost solution for industry, research, and academic small-satellite propulsion needs.

Potential CubeSat and nanosatellite missions with FPPT include low Earth orbit raising and/or deorbiting. FPPT would improve mission affordability for multiple CubeSats, since several CubeSats with FPPT could be launched from a single low-cost booster and maneuvered to other orbits, then later de-orbited. The FPPT thruster will provide a compact, low mass, non-hazardous propulsion technology solution that will be made available in a family of sizes by changing the propellant spool volume to meet the differing needs of users in NASA, DOD, industry, and universities for CubeSat and small-satellite missions.

SUMMARY OF THE INVENTION

While classic PPT technology is mature, it has historically been limited by its size and propellant load, for example Applicant's prior PPT-11 technology, FIG. 1 [as shown and patented in Applicant's U.S. Pat. Nos. 7,530,219 B1, 7,296,257, and 7,926,258—Thruster 10]. Technology advances in the past 20 years can now be applied to the Teflon™ (or PTFE equivalent) PPT to create the innovative FPPT, making several significant improvements to the classic PPT technologies.

The present invention is directed to a Fiber-fed Pulsed Plasma Thruster (FPPT). The thruster replaces the spring-fed state of the art Teflon™ (or PTFE equivalent) feed system with a motor-driven fiber feed system, which pulls a flexible Teflon™ (or PTFE equivalent) fiber from a spool. Additionally, an innovative, highly parallel ceramic capacitor bank dramatically lowers system specific mass. As used herein the fiber propellant can be a Teflon™ or PTFE equivalent.

The Fiber-fed Pulsed Plasma Thruster (FPPT) will enable low orbit, cis-lunar and deep space missions for small satellites. FPPT technology utilizes a motor to feed PTFE fiber to its discharge region, enabling class-leading PPT propellant throughput and variable fuel ablation area. An innovative, highly parallel ceramic capacitor bank dramatically lowers system specific mass. FPPT is inherently safe; its non-pressurized, non-toxic, inert propellant and construction materials minimize range safety concerns. Estimates are that a 1-liter (10 cm×10 cm×10 cm, or 1U) volume FPPT thruster package may provide as much as 10,000 N-s total impulse, enabling 1.4 km/s delta-V for an 8 kg CubeSat. CU Aerospace (Applicant) is presently developing a 1.7U integrated system including the advanced thruster head with igniter system, PTFE fiber feed system, power processing unit, and control electronics.

Numerous other advantages and features of the invention will become readily apparent from the following detailed description of the invention and the embodiments thereof, from the claims, and from the accompanying drawings.

BRIEF DESCRIPTION OF THE FIGURES

FIG. 2A is a representation of an Embodiment of an FPPT concept schematic;

FIGS. 15A and 15B are photographs taken after (FIG. 13A) and during (FIG. 13B) FPPT testing with operating conditions of 14.0 kA, 768 V, 32.4 µF, 0.0022 Torr, 4 Hz pulse rate at 10.7 J/pulse, and a feed rate of ~12 µg/s;

FIG. 16 is an illustration of a 5.5 J, 800-volt FPPT current pulse taken using the Rogowski coil. The purple trace is current with a 103 A/mA calibration factor showing ~10 kA, and the yellow trace is anode voltage in volts;

FIGS. 26A, 26B and 26C are views of an FPPT system in a 1U volume envelope (front, side, and back views);

FIGS. 27A and 27B are 3D perspective and cutaway views of an FPPT system in a 1U volume envelope having sufficient PTFE propellant to achieve>10,000 N-s of total impulse with the unified electronics board (PPU+motor driver) designed to fit in the annular region between the cathode and the capacitor bank.

DETAILED DESCRIPTION OF THE INVENTION

Figure 2B:
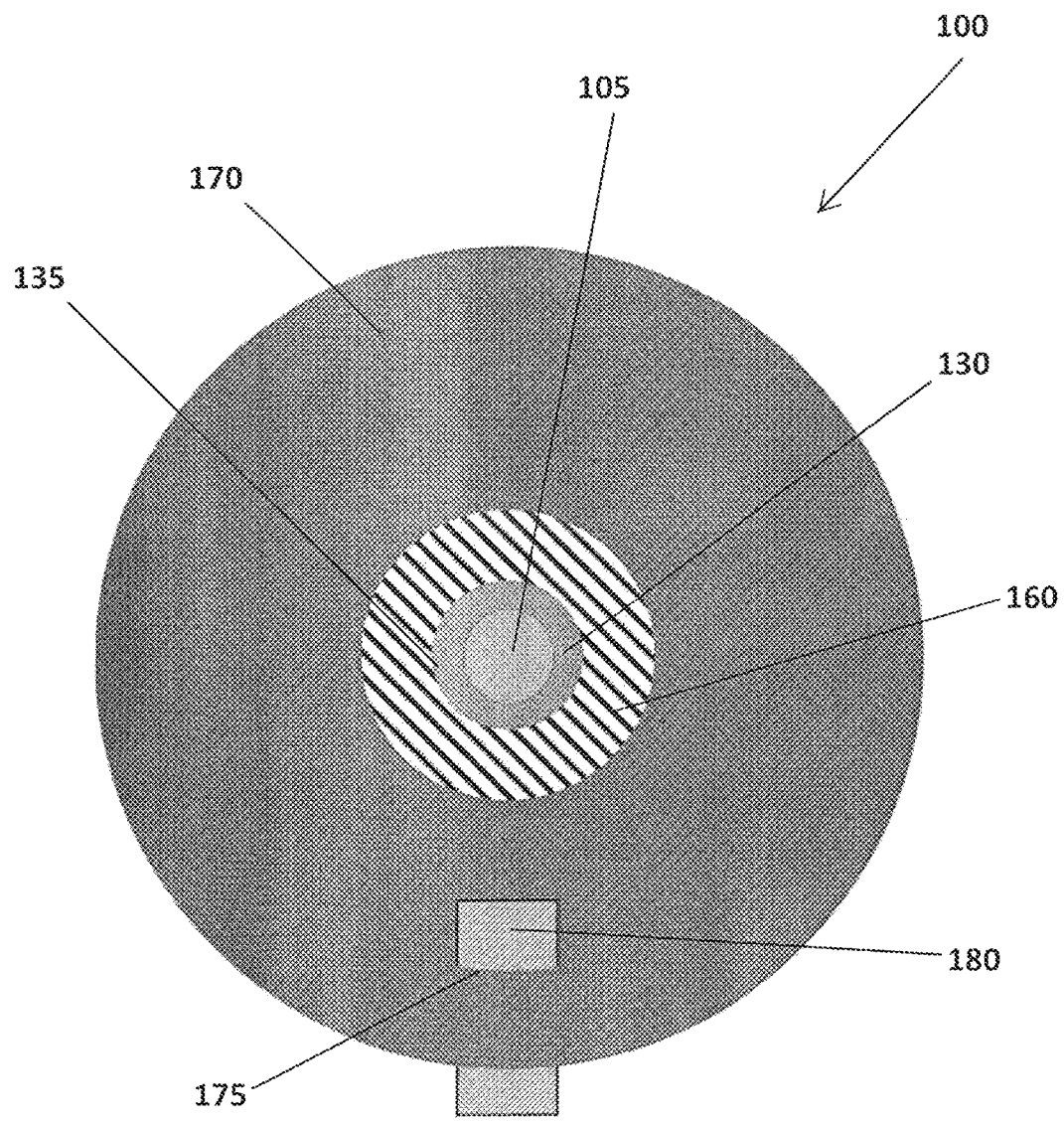
FIG. 2B is a front representation of the embodiment from FIG. 2A.

A schematic of one embodiment of Applicant's Fiber-fed Pulsed Plasma Thruster (FPPT) generally referenced as element 100 is shown in FIGS. 2A and 2B. The thruster 100 replaces the spring-fed state of the art Teflon™ (or PTFE equivalent) feed system with a fiber feed system, which pulls a Teflon™ (or PTFE equivalent) fiber 105 from a spool 110. Prior Art PPT feed systems use a spring to push a propellant bar against a stop without ablation rate control, and this embodiment of the FPPT employs a pulsed stepper motor 120 to drive the fiber 105 against a stop 130 at the tip of a centered anode 135. This system retains a fixed anode/propellant geometry as propellant is consumed. Because of the feed stop 130, it may be necessary to incorporate a slip clutch in the drive mechanism, or to monitor the step motor current for a stall. A stall condition will initiate a pause in the feed command, followed by a resumption in feed after an empirically-determined number of pulses.

In greater detail of FIGS. 2A and 2B, the Teflon™ (or PTFE equivalent) fiber 105 is wound on a spool 110. The feed motor 120 (stepper or other motor) drives or pulls the fiber 105 from the spool 110 into an insulated feed tube 140. The fiber 105 is fed through the feed tube 140 into the tubular centered anode 135. The centered anode 135 is cylindrically shaped and configured against an end 142 of the feed tube 140 to ensure that the fiber 105 properly feeds through the anode 135. The anode 135 is electrically connected to a power processing unit ("PPU") 150. The exit end or tip 137 of the anode 135 includes the stop 130, which may be configured as a radially inward flange. An insulator 160 is positioned near the stop 130 and insulates the anode 135 from a cathode 170. The insulator 160 may contain circumferential labyrinthal grooves in the outer diameter so as to trap solid carbon particles from the dissociated PTFE and prevent surface flashover along the exposed faces of the insulator 160 between the anode and cathode during capacitor charging and before the igniter is fired. The cathode 170 may be connected to the PPU 150, either by direct connection or through a high ohmic value standoff resistor. The cathode 170 also may have a preferred shape as a divergent or convergent nozzle. Lastly, an igniter 180 is fitted through an opening 175 in the cathode, and may be directly connected to the cathode, or may be connected to the cathode through a resistive or inductive standoff impedance.

In operation, the motor pulls fiber fuel from the spool and feeds it through the feed tube into the anode. The fiber fuel will be fed to the end of the anode at the stop 130. When the igniter pulse is triggered it expels electrons into the nozzle region that are attracted to the positively charged anode, consequently triggering the primary high energy discharge to ignite between the anode 137 and cathode 170, thereby creating a radiative plasma that heats and vaporizes the ablation surface of the fiber propellant, allowing the discharge to create a dissociated and partially or fully ionized plasma that will be electromagnetically and electrothermally accelerated outward from the nozzle to produce thrust. As the exposed surface of the fiber fuel ablates away, the motor is controlled to feed more fiber to the stop 130.

Figure 1:
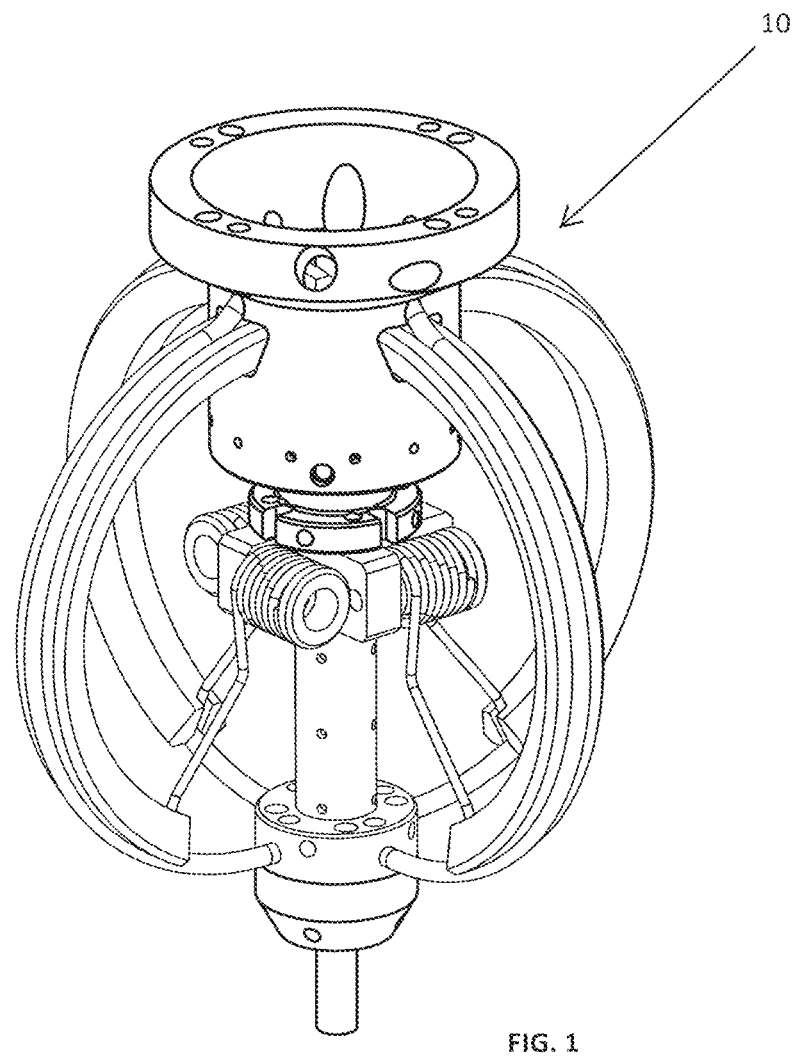
FIG. 1 is a Prior Art photograph of Applicant's PPT-11 coaxial pulsed plasma thruster having $I_{sp}$~1200 s, specific thruster dry mass>100 kg/kW, and relatively low propellant storage mass of 54 grams.

While classic PPT technology is mature, it has historically been limited by its size and propellant load, for example Applicant's prior PPT-11 technology, FIG. 1 [U.S. Pat. Nos. 7,530,219B1, 7,296,257, and 7,926,258]. Technology advances in the past 20 years can now be applied to the Teflon™ (or PTFE equivalent) PPT to create the innovative FPPT, making several significant improvements to the classic PPT technologies:

Coaxial geometry. A high $I_{sp}$ thruster using a cathode design similar to the PPT-11 thruster, FIG. 1, but incorporating a motor-driven fiber-fed feed system that feeds Teflon™ (or PTFE equivalent) fiber through the anode to achieve high throughput, FIGS. 2A and 2B. The coaxial PPT-11, generated 1.7 mN at 1200 s $I_{sp}$, using an axisymmetric discharge with a conical nozzle cathode and central anode, with the propellant fed radially through the cathode. The coaxial geometry collapses the discharge volume and raises the plasma conductivity and thruster efficiency. The thrust is generated 65-75% electromagnetically from $\vec{j}\times\vec{B}$ (high $I_{sp}$), with the remainder being generated electrothermally (lower $I_{sp}$). The cathode locates the igniter plug that sprays electrons toward the central anode to initiate the discharge in a single pulse or at a rate determined by the available electrical power. In one example the discharge was at a rate of 1-20 pulses per second. Applicant has now demonstrated performance similar to the PPT-11 with the FPPT, reaching 87% electromagnetic (EM) thrust.

Figure 3:
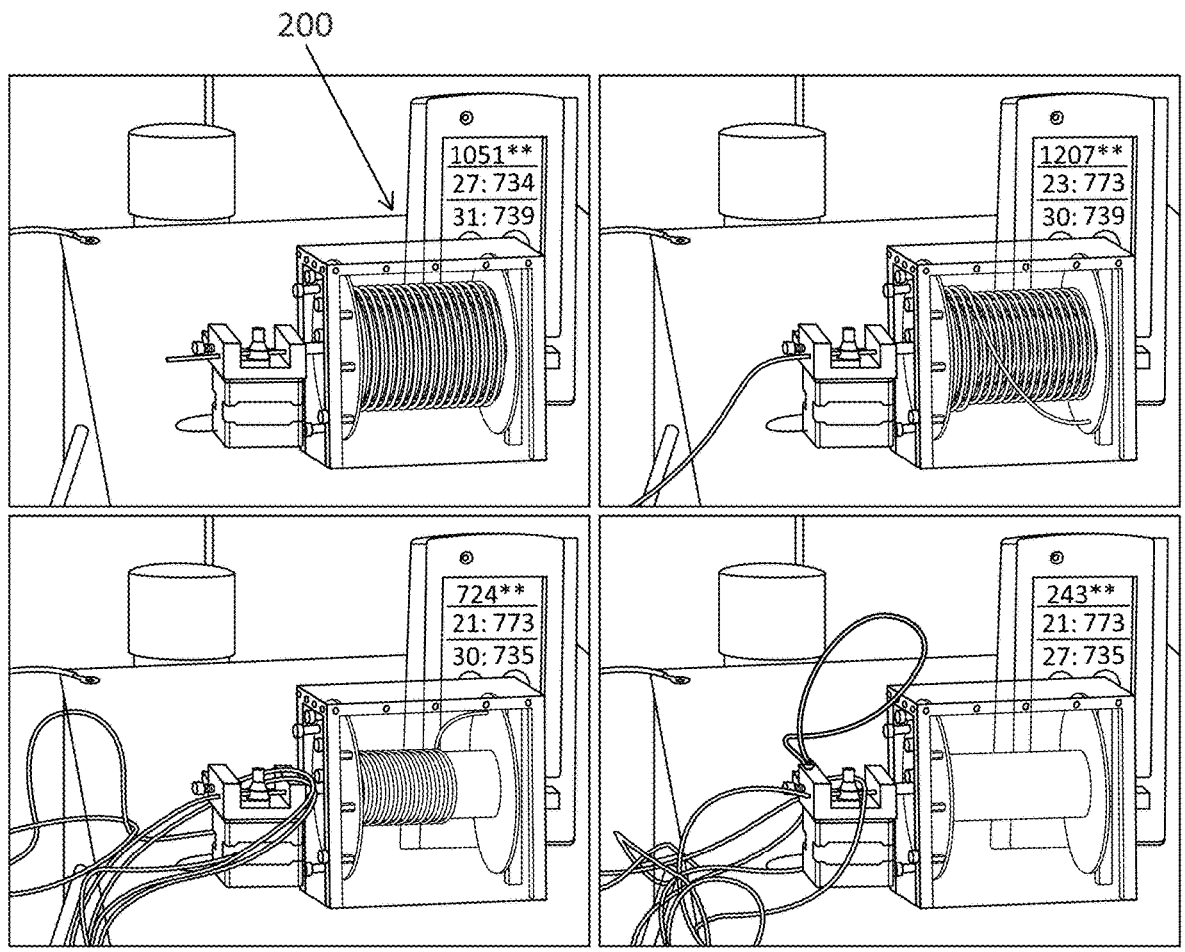
FIG. 3 is a Motor-driven feed system demonstrator and fiber propellant spool placed in a 1U volume thruster system, showing in a sequence of photographs a spooled fiber with a fiber mass of 170 g in upper left to a completely fed (emptied) spool in lower right.

Fiber feed system. The design of the PPT Teflon™ (or PTFE equivalent) feed system has always been a challenge for high throughput PPTs, as observed with the large (85 liter) envelope for the AFRPL/Fairchild millipound (4.4 mN) thruster, and the small geometry-limited propellant mass for the coaxial PPT-11 (FIG. 2). Recent technology developments at Applicant have shown that a propellant fiber can be reliably fed from a high-capacity static spool using a motor-driven fiber feed system adapted from 3D printer technology, FIG. 3, Feed System 200. A commercial off-the shelf (COTS) stepper motor and drive setup (Anycubic MK8 Extruder) was used for testing, and a preliminary flight configuration was designed for implementation that matches its torque and feed rates. (Note that other motors can be used for FPPT.) The same COTS system was used for the FPPT PTFE fiber feed. For the coaxial FPPT, the fiber is fed through the center of the central anode. The packing factor (fuel volume/available volume) for fiber on the spool system was measured at 90%, and with the PTFE density of 2.2 kg/liter, high propellant mass can be stored at higher density and lower mass than can competing gas and liquid propellants using tanks.

High voltage capacitors. Improvements in capacitor technology, specifically the dielectric, have not significantly improved specific mass or volume, but have significantly lowered equivalent series resistance (ESR), with two major benefits: (1) low ESR increases pulse current, raising $\vec{j}\times\vec{B}$ and efficiency; (2) low ESR permits a reduction in capacitance and discharge energy, compensated by as much as an order-of-magnitude increase in pulse rate, with capacitor mass correspondingly reduced. Reductions in capacitor mass also reduce circuit inductance, raising current and also $\vec{j}\times\vec{B}\vec{j}\times\vec{B}$ thrust. A typical PPT-11 current pulse (FIG. 4) was 30 kA with half-period of 8 µs. PPT-11 used a bank of 4×20.5 µF, 1.7 kg, low ESR mica capacitors developed by Unison Industries. Multi-layer ceramic capacitors (MLCC), a more recent development, are a robust, low mass and and low-volume option for primary energy storage.

Ignition system. Prior PPT ignition was based on a fast pulse delivered to a semiconductor igniter plug developed for gas turbine ignition. Igniter circuit switching has improved from vacuum gaps to silicon-controlled rectifiers to MOSFETs, with the latter depending on the availability of higher voltage devices.

Power processing unit (PPU). The PPU for the FPPT will supply a nominal 1 kV charging current source to the capacitors, a pulse to the igniter plug, and low voltage current to the feed system motor. High power electronics technology and higher voltage operation have allowed reductions in PPU specific mass, so that 3 kg/kW (3 g/W) at 94% efficiency was achieved in 2001. Modern PPU specific mass is estimated at <2 kg/kW; for example, Applicant's 40W CHIPS PPU weighs just under 40 grams (1 kg/kW).

PPT physics. The time-dependent heating and sublimation of the Teflon™ (or PTFE equivalent) surface during and after the pulse is now well understood and is used to predict pressure decay time in the inter-electrode region. Experimental PPT measurements of Antonsen were in agreement with the plasma modeling of Keidar and Boyd. The combined effect of mixed $\vec{J}\times\vec{B}\vec{j}\times\vec{B}$ and electrothermal acceleration on PPT performance is now well understood using a two-fluid model as developed by Burton. Unlike all previous PPTs, analysis of the FPPT predicts operation in a $\vec{J}\times\vec{B}\vec{j}\times\vec{B}$ pinch mode near the central anode, resulting in regions of a zero value of electron Hall parameter and high ion current on-axis and high values of electron Hall parameter and axial electric field off-axis, with ion-neutral charge exchange an important aspect of the physics.

Figure 5A:
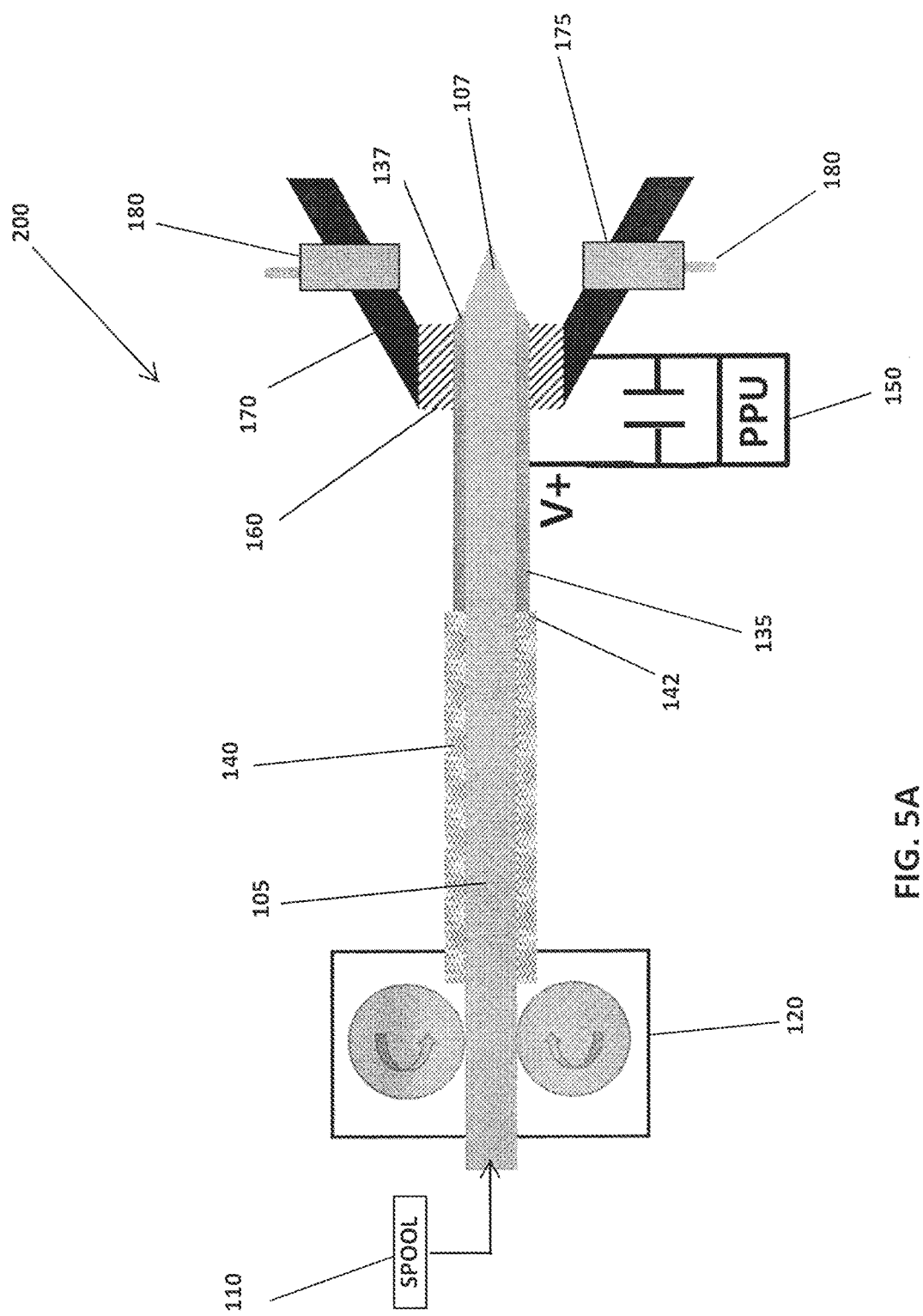
FIG. 5 is another embodiment of a FPPT concept schematic.

A schematic of another embodiment of the Applicant's concept for the Fiber-fed Pulsed Plasma Thruster (FPPT) is shown in FIG. 5. It was found that a feed stop lip on the end of the anode of the first embodiment (FIGS. 2A and 2B) was not required by FPPT as the motor-driven feed system could provide a reliable rate of feed without having the forced stop, in combination with a self-forming conical end tip on the propellant feed that is shaped by sublimation caused by the radiating plasma discharge. It was also found that the axial length of the propellant cone is a function of the feed rate, discussed in detail below. Removing the feed stop allowed performance flexibility by tuning the FPPT to high-$I_{sp}$ operation by varying the feed rate.

In greater detail of FIG. 5 and similar in components and referencing to the prior figures for similar elements, the Teflon™ (or PTFE equivalent) fiber 105 is wound on a spool 110. The stepper motor 120 drives or pulls the fiber 105 from the spool 110 into an insulated feed tube 140. The fiber 105 is fed through the feed tube 140 into the centered anode 135. The centered anode 135 is cylindrically shaped and configured against an end 142 of the feed tube 140 to ensure the fiber 105 properly feeds through the anode 135. The anode 135 is electrically connected to a power processing unit ("PPU") 150. The exit end or tip 137 of the anode 135 does not include a stop (as shown previously). An insulator 160 is positioned near the exit end 137 and insulates the anode 135 from a cathode 170. The cathode 170 may be connected to the PPU 150. The cathode 170 also may have a preferred shape as a divergent or convergent or convergent-divergent nozzle. Lastly, one or more igniters 180 are fitted through openings 175 in the cathode.

In operation, the motor pulls fiber fuel from the spool and feeds it through the feed tube into the anode. The fiber fuel will be fed towards the end 137 of the anode. When an igniter is triggered, electrons are expelled into the nozzle region which consequently triggers the primary high energy discharge to initiate an electron avalanche between the anode 137 and cathode 170, thereby creating a radiating plasma that vaporizes the ablation surface of the fiber propellant, creating a partially or fully ionized plasma that will be ejected electromagnetically and electrothermally outward from the nozzle to produce momentum and thrust. While the surface of the fiber fuel vaporizes away, the motor feeds more fiber. As the fiber propellant ablates a conical tip 107 is formed and thrust is created by accelerating the sublimated and ionized fiber propellant.

Figure 6A:
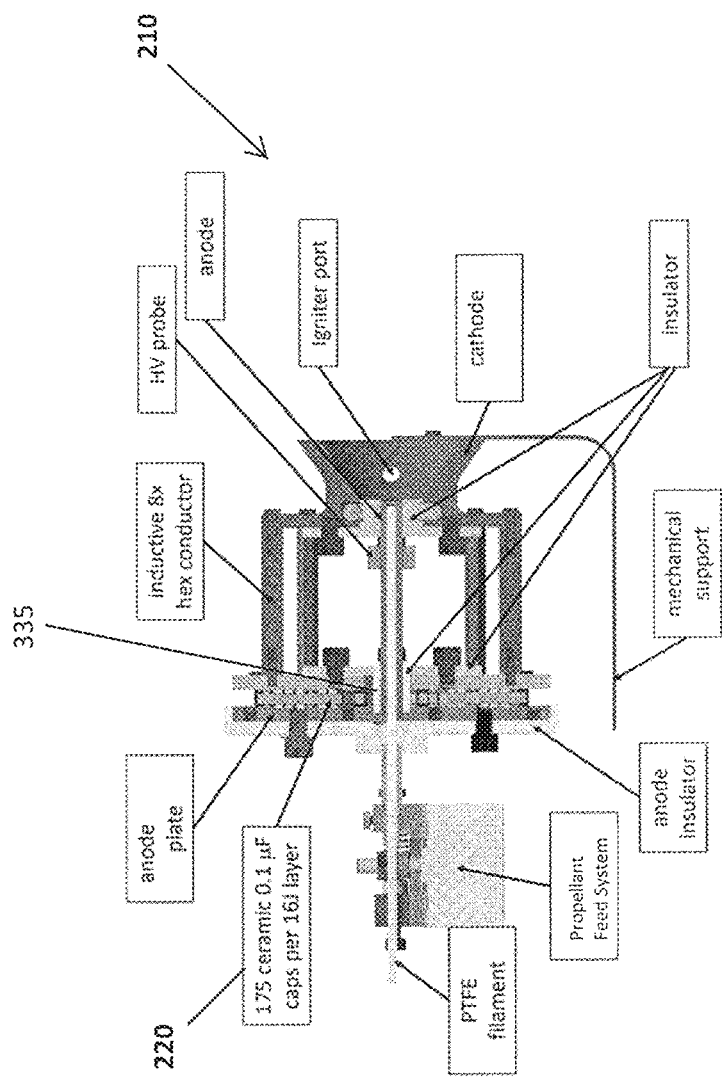
FIG. 6A is a side view of a FPPT breadboard design.
Figure 6B:
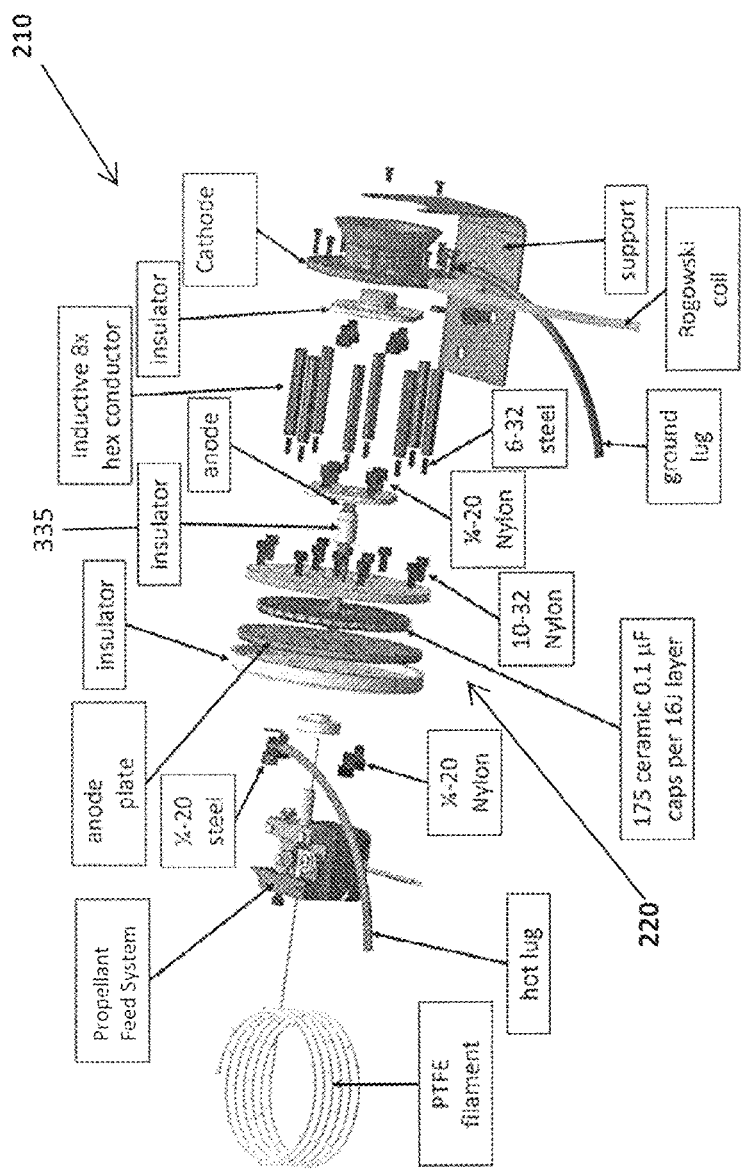
FIG. 6B is a perspective exploded view of the FPPT breadboard.
Figure 6C:
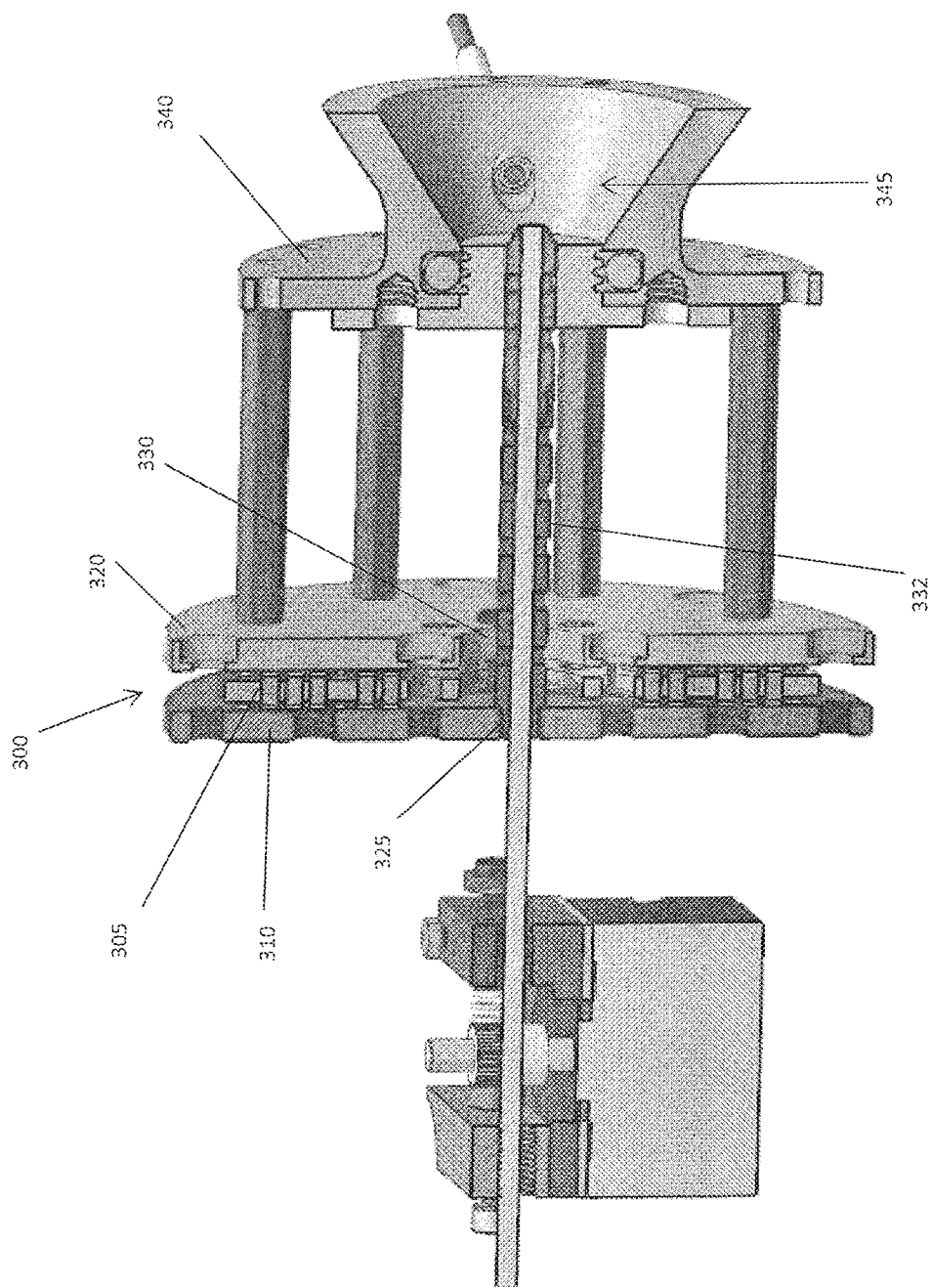
FIG. 6C is a cross section view of the FPPT breadboard.
Figure 7A:
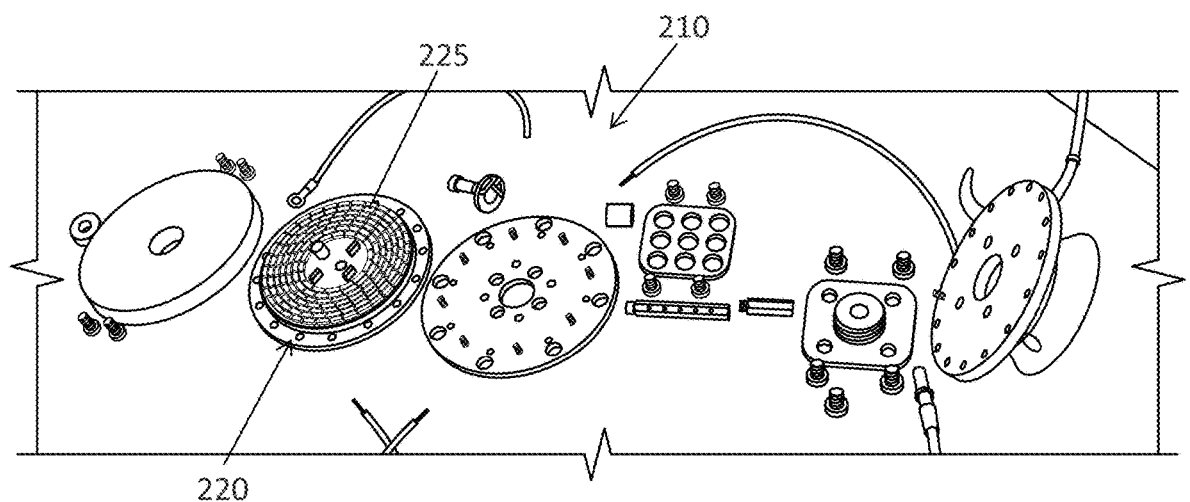
FIG. 7A is a photograph of the unassembled FPPT breadboard components (shown without propellant spool)
Figure 7B:
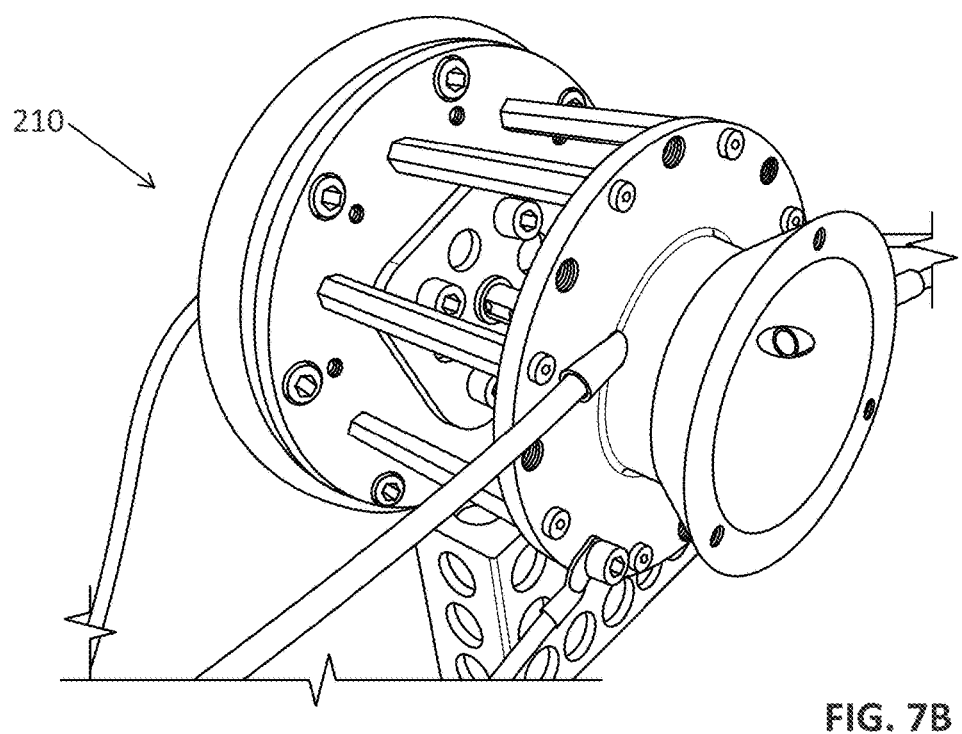
FIG. 7B is an assembled view of the FPPT breadboard propulsion system (shown with assembled capacitor bank at back of thruster, but without propellant spool)

Detailed Description of the Invention
Design and Fabrication of Breadboard FPPT
Design and Fabrication A breadboard thruster 210 was designed, fabricated, and assembled. Key design features include an interchangeable anode with central fiber-feed tube, interchangeable igniters, and 16 joules of ceramic capacitors 220 in an integrated low inductance configuration. FIG. 6A shows the labeled solid model, and FIGS. 6B and 6C shows an exploded view of the first breadboard design. FIG. 7A shows all the hardware laid out before assembly, and FIG. 7B shows the resulting first assembled breadboard thruster. A Rogowski coil, in conjunction with an RC integrator, provides a calibrated current trace easily readable with an oscilloscope.

Capacitor Bank Development

One FPPT breadboard thruster 210 utilized 175× VJ9363Y104KXGAT 2225-size ceramic multi-layer ceramic capacitors (MLCC) stacked vertically in circular rings 220, FIG. 7A. These capacitors are retained via compression, conductive adhesive, or solder, with anode and cathode plates contacting the capacitor terminations. Encapsulation or conformal coating can also be utilized to protect the capacitors.

Several different MLCC options were tested and this option performed most reliably in early trials. Note that other MLCC capacitors may be used. For a capacitance of 20 µF, 200 MLCCs are required, which at a unit mass of 0.434 g amounts to a total mass of only 87 g. A single 20.3 µF mica capacitor pack used for prior PPT-11 work by Applicant had a mass of 1535 g; the MLCC cap bank is only 5.6% of the mass of this prior technology, a near-20-fold decrease. Note that the use of these MLCCs is one of the key implementations of modern electronics into Applicant's FPPT technology, reducing capacitor specific mass from $\alpha_{cap}$>200 kg/kW by approximately two orders of magnitude to ~2 kg/kW.

The MLCCs used in the first breadboard testing were 0.1 µF with a max voltage of 1000 V, giving a 175-cap bank maximum energy of $E_o$=8.8 J at 1000 V. To extend cap life, this bank was reduced to 800V (5.6 J) for the bulk of preliminary tests. The large quantity of small capacitors in parallel was chosen to minimize the ESR and inductance of the capacitor bank. The 175 MLCCs contained in the first breadboard unit shown in FIGS. 7A and 7B weigh only 76 g for 8.8 J, or $\alpha_{cap}$=1.7 kg/kW at 5 Hz. Overall, this dramatic reduction in capacitor bank mass results in a decrease in the overall thruster specific mass $\alpha_{system}$ to <15 kg/kW. The first FPPT assembly shown in FIG. 7B was not optimized with a mass of ~650 g. Current flight designs have significantly lower mass.

Figure 8:
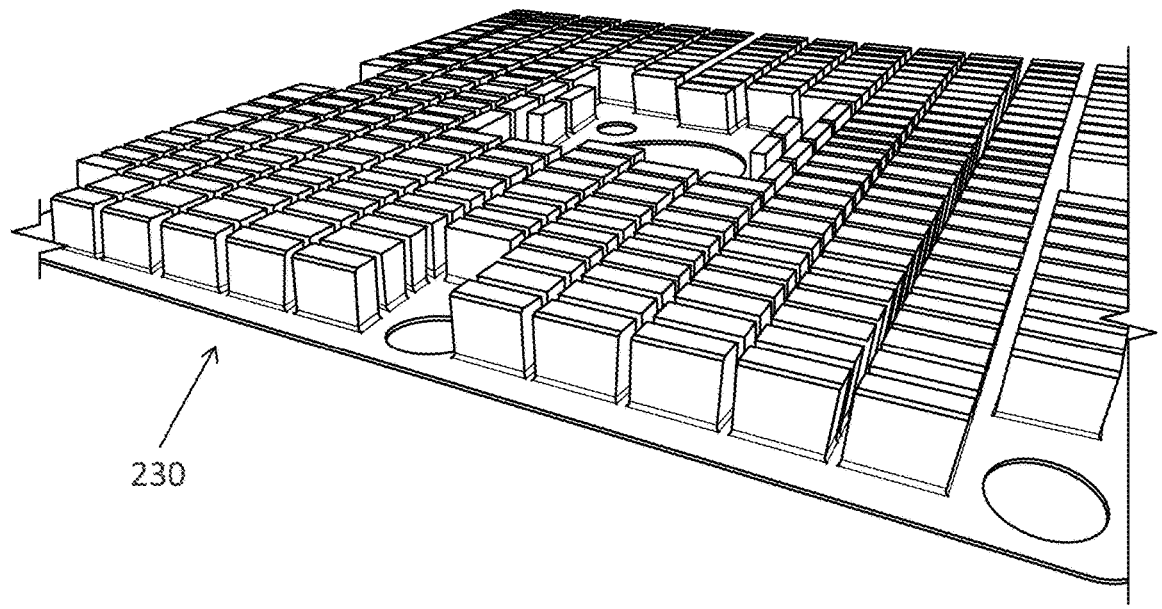
FIG. 8 is a half-assembled multi-layer ceramic capacitor (MLCC) bank with a square footprint.
Figure 9:
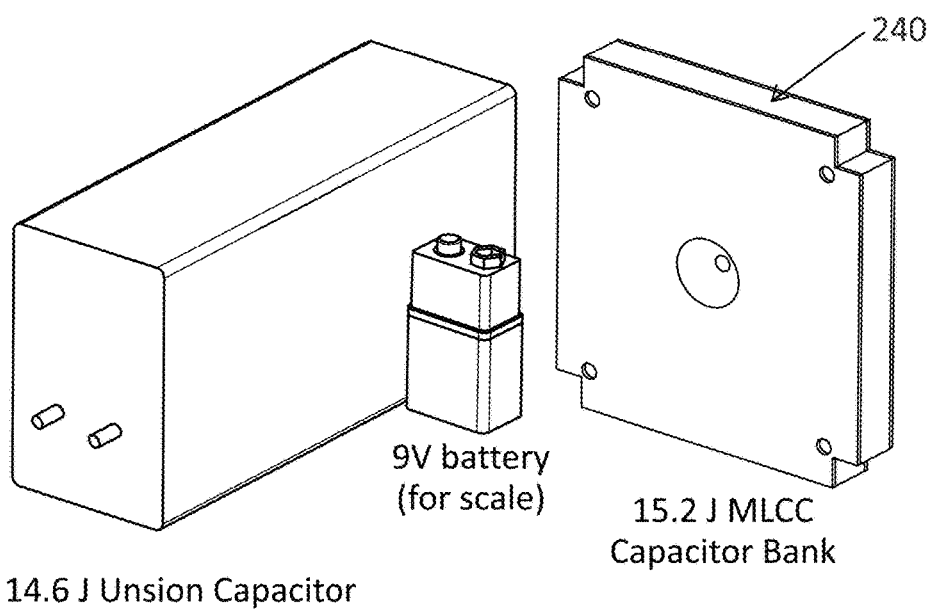
FIG. 9 is an illustration of a two-layer MLCC configuration that provides the same energy storage as a prior Unison Mica Capacitor technology in a compact package having ~18% of the mass.

While the breadboard MLCC capacitor module had a similar capacitance to the Unison mica capacitor, the higher voltage capabilities of the mica caps enabled higher total energy and higher pulse current. As higher energy storage is also desired for FPPT, a more scalable square pattern capacitor module arrangement using the MLCCs was developed and fabricated, conforming well to the 1U CubeSat form factor. Each square module of MLCCs provides up to 10 J. FIG. 8 is a photograph of a partially assembled single layer module 230 containing 33 µF of 1000 V capacitors with a pulse energy of 7.6 J at 800 V. The two-layer module 240 holds 66 µF of 1000 V capacitors for a pulse energy of 15.2 J at an operating point of 800 V, FIG. 9. Note that Applicant derates the 1000 V capacitors to 800 V to ensure the required lifetime of the capacitors. At 15.2 J and 259 g, the two-layer module 240 exceeds the energy storage capabilities of the Unison mica cap technology with 82% less mass. Note that the use of these MLCCs is one of the key implementations of modern electronics into Applicant's FPPT technology, enabling a 10 times reduction in overall specific mass. Four modules (total 33 J capacity) can provide higher performance, as discussed below, and more than four modules are easily added with the trade-off of higher cost, mass and volume.

Figure 10A:
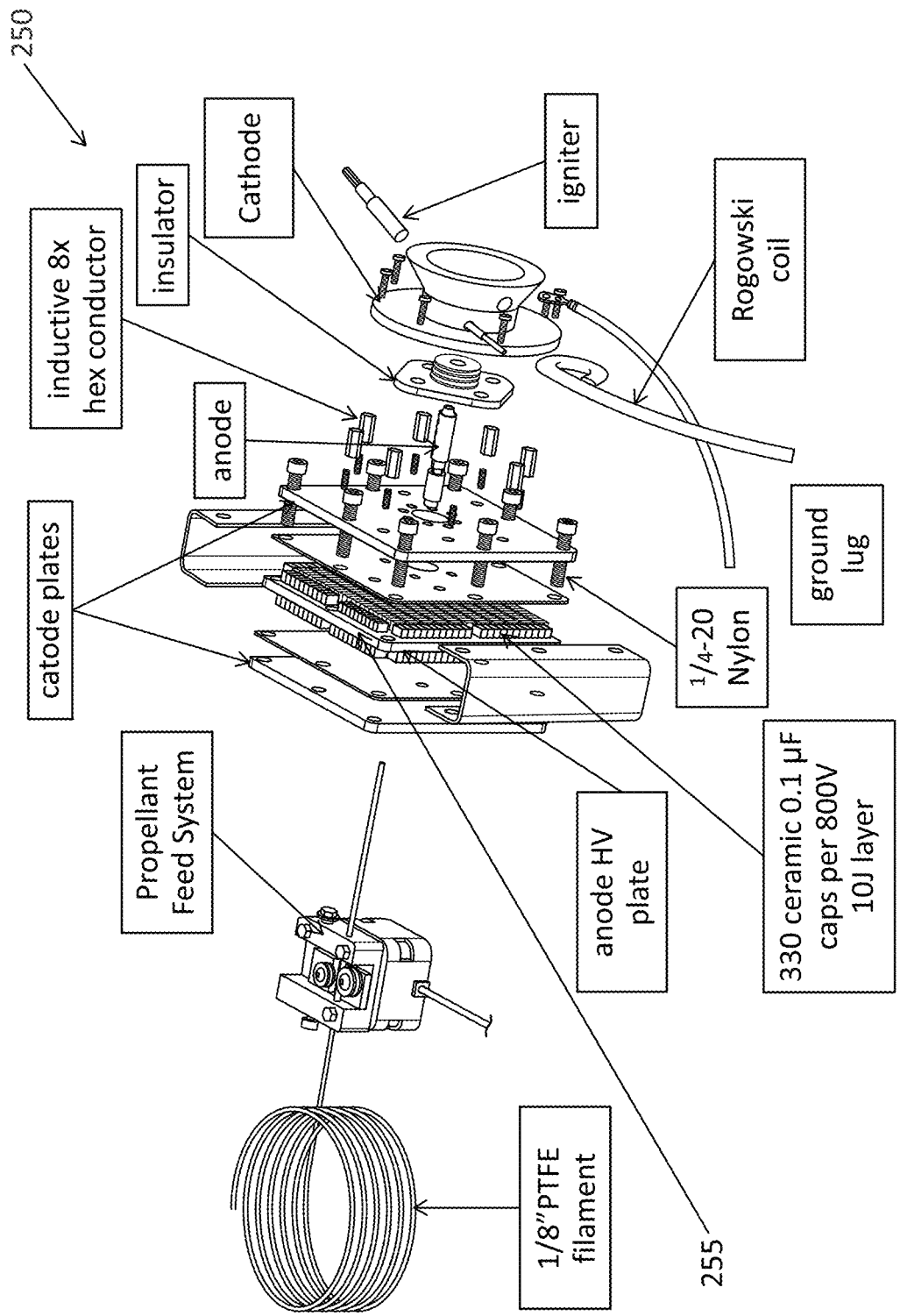
FIGS. 10A, 10B and 10C are FPPT designs with a square two-layer capacitor bank that holds 644 MLCCs for a storage capacity of ~15 kJ of energy storage at 800 V.
Figure 10B:
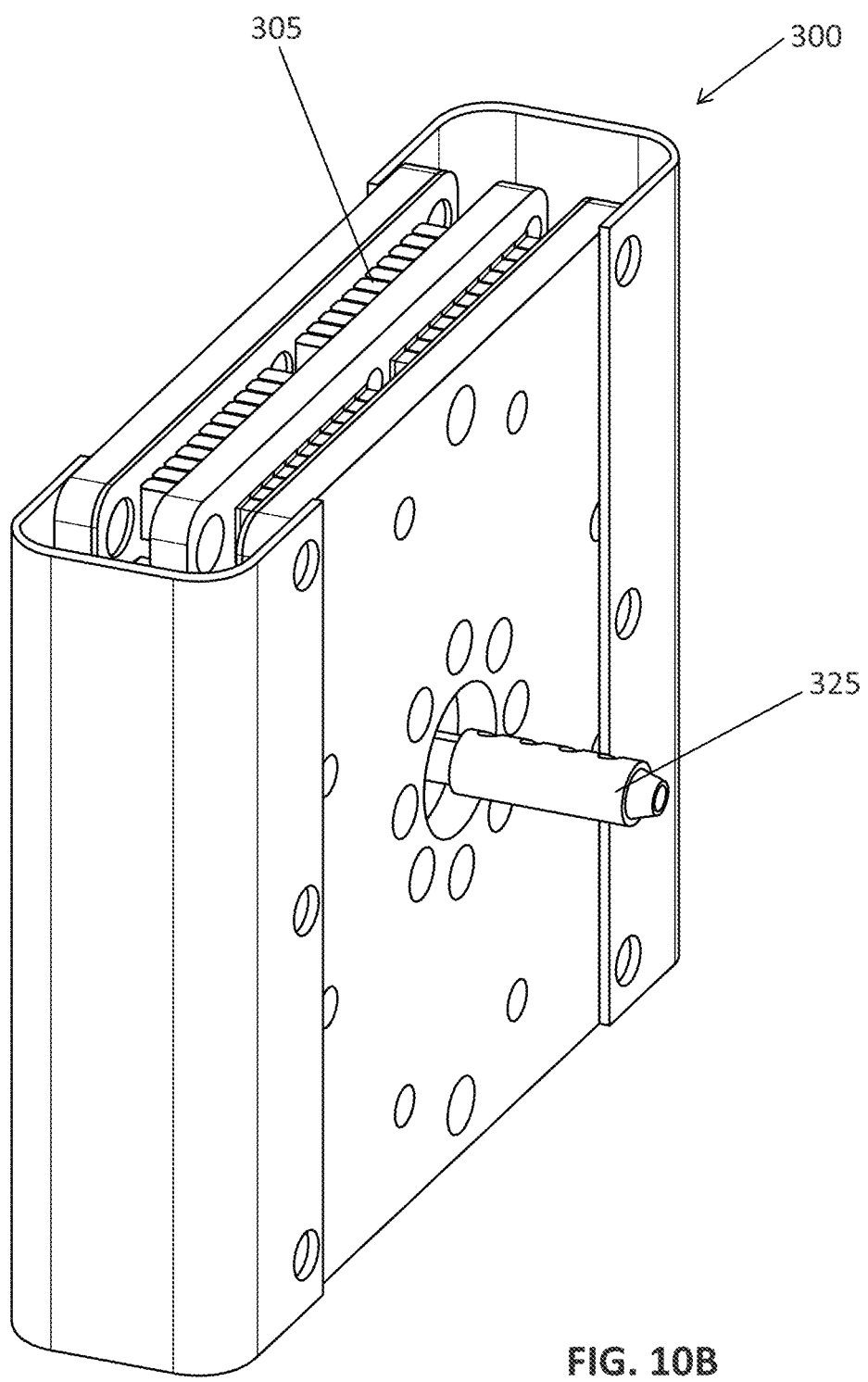
Figure 10C:
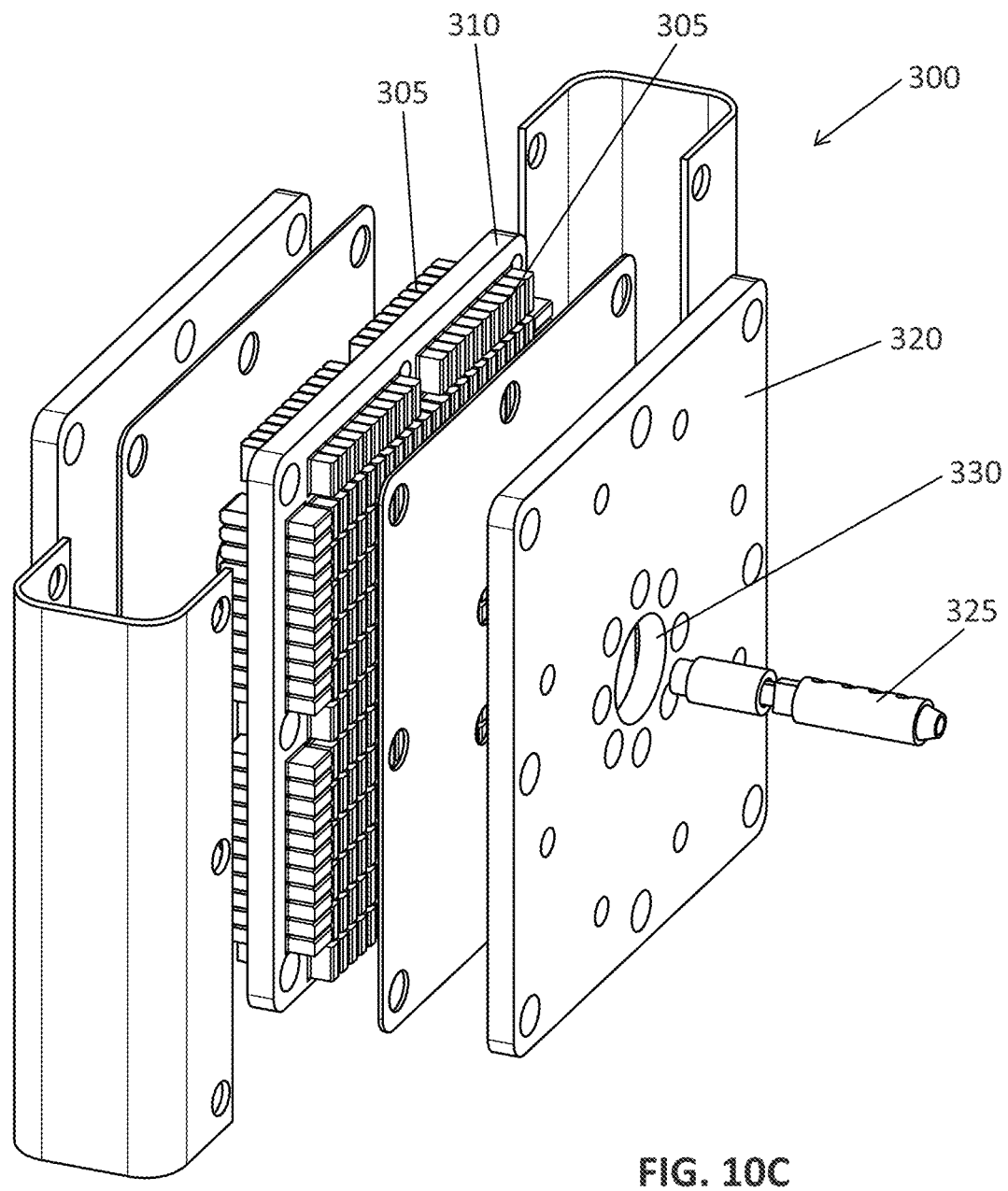
Figure 11:
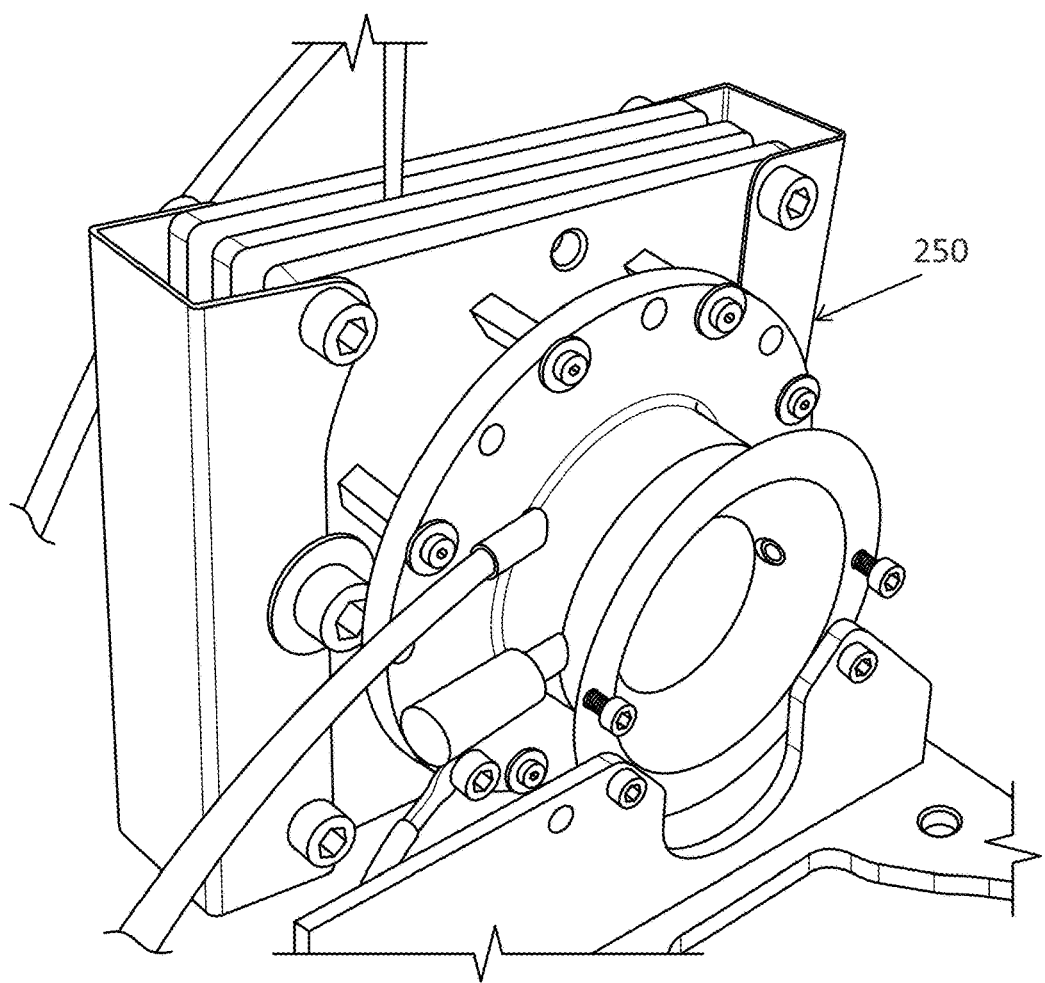
FIG. 11 is a photograph of an FPPT system including capacitor bank with demonstrated $I_{sp}$>2400 s, 279 g MLCC capacitor bank, and specific thruster dry mass<10 kg/kW.

FIGS. 10A, 10B, and 10C show views of the FPPT module 250 including the enhanced capacitor bank 255 in a square pattern that holds 644 MLCCs and also conforms better to the 1U CubeSat form factor. A photograph of the assembled compact FPPT configuration is shown in FIG. 11.

To evaluate the risk of capacitor failure beyond the hundreds of thousands of thruster firings performed during development, accelerated life testing of the ceramic capacitors has been conducted. A cluster of 6 capacitors has been operating 24 hours per day, charging to 800V and discharging through a representative load that matches thruster inductance and resistance at ~50 Hz. Greater than 500 million charge/discharge cycles have been accumulated, which is a strong indicator that capacitor failure risk is low.

In summary and as illustrated in FIGS. 10B and 10C, a capacitor module 300 is made up of a plurality of ceramic capacitors 305 (as described herein) that are mounted on one side or on both sides of a capacitor back plate 310. The configuration of the mounted capacitors is dictated by the shape and profile of the back plate. As illustrated throughout, the configuration may be in concentric circles when the shape of the back plate is circular, or quadrilateral if the shape of the back plate is square or rectangular. In addition, to increase the capacitance, ceramic capacitors may be mounted on front and rear sides of the back plate or sandwiched between layers of back plates. The capacitor module 300 further includes a front plate 320. Both the back plate and the front plate 320 include an opening (back opening 325 and front opening 330) to receive an anode 332

(or a first electrode positively charged by the capacitor bank). A bank insulator 335 is fitted in the front opening to insulate the front plate 320 from the anode 325 and further ensure the front plate 320 does not become charged by the capacitor bank. The front plate 320 is further secured to a cathode 340 (or could alternatively secured to a second electrode negatively charged from the capacitor bank). A capacitor bank consisting of one or more parallel-connected modules 300 is electrically connected to a power processing unit. The capacitor bank being configured to lower an equivalent series resistance and thus raise a $\vec{j} \times \vec{B} \vec{j} \times \vec{B}$ thrust. The anode 325 may further be bored through to receive and expel a propellant, which will be expelled into a region 345 defined by the nozzle.

For purposes of producing thrust, the region is then be exposed to a primary high energy discharge between the anode and cathode thereby creating a radiating plasma that vaporizes the propellant. The vaporizing propellant is dissociated and ionized to create a partially or fully ionized plasma ejected outward from the cathode region to produce momentum and thrust.

Igniter Development

Key FPPT testing and development goals are the minimization of anode erosion, maximization of igniter life, and demonstrated high propellant mass throughput. Anode erosion and propellant throughput are easily measurable. Igniter longevity is recognized as a technical risk by Applicant. The 0.25 inch diameter igniters used by PPT-11, FIG. 1, were custom-made by Unison Industries, and are no longer available for purchase. They utilized a central anode, exterior nickel cathode body, and a semiconductor layer to help initiate breakdown by lowering breakdown voltage. These igniters were designed to spray electrons towards the central high voltage (HV) anode of a coaxial PPT. Carbon from dissociated Teflon™ (or PTFE equivalent) fuel helps to prevent erosion. However, it is known that carbon tracking between the semiconductor and the insulator ultimately causes igniter failure, and one such failure was observed during testing.

Figure 12A:
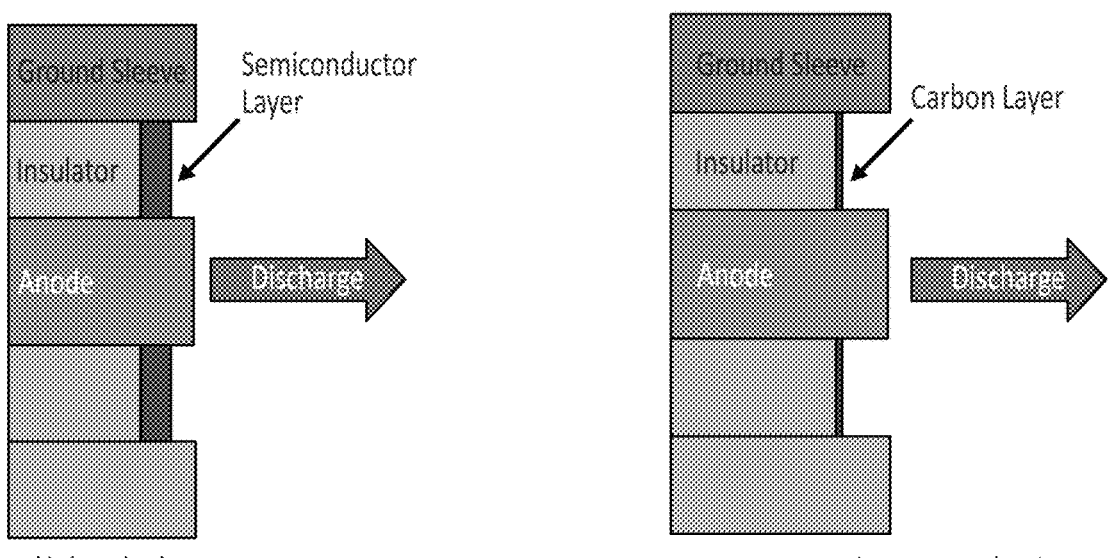
FIG. 12A is an illustrative comparison between a semiconductor gas turbine and PPT Unison igniter and an igniter in accordance with one embodiment of the present invention with a regenerative carbon igniter (RCI) designed for longer lifetime.
Figure 12B:
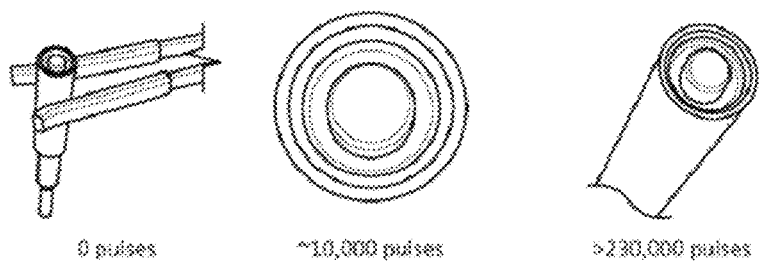
FIG. 12B is a Regenerative Carbon Igniter (RCI) in accordance with one embodiment of the present invention.

Applicant developed a new coaxial regenerative carbon igniter (RCI) plug 260 which relies only on carbon deposits from the PPT for ignition and lacks the semi-conductor layer. FIG. 12A illustrates the difference between the two types of igniters. The Applicant igniter plug has demonstrated reliable operation from atmospheric pressure down to mTorr vacuum levels and provided an ignition plasma for over 1,000,000 pulses. It consists of a stainless-steel positive center electrode, ceramic insulator, and outer nickel body cathode, FIG. 12B (note that the Applicant and Unison igniters look nearly identical, therefore the Unison igniters are not shown for clarity). The principle advantage of the Applicant igniter design is that the stainless-steel central anode ablates slowly, ensuring that the RCI is regeneratively replenished. Multiple igniters can be used if necessary for very high impulse missions. Other metals and insulators may be used for the RCI.

On one occasion during development an igniter failed. This was due to igniter cathode sputtering that created a conducting path across the igniter insulator. The RCI was then cleared simply by application of a 24 VDC pulse for XXXX seconds to the igniter electrodes and remained operational for the duration of the program. Therefore, Applicant claims that the igniters can periodically be cleared as needed through the use of a simple additional DC electronics circuit and software to sense and clear any fouling incidents while thrusting. Applicant believes that these clearing operations can be repeated, with irrecoverable failure only resulting from complete erosion of the device.

Anode Development

Copper 145 (Tellurium Copper) was used for the anode to observe erosion patterns; notably this material is readily available and inexpensive. Results with the anode in the FPPT configuration proved to show far lower erosion rates than anticipated. Compared with prior PPT-11 results, we measured a >10× reduction in anode erosion rate, down to ~0.2 µg/pulse (from a 13,000 pulse, 21 J data set). This measured anode erosion rate, compared to a Teflon ablation rate of ~9.6 µg/pulse, supports an anode that can survive>$10^8$ pulses with common electrode materials. When operating in high-$I_{sp}$ modes, anode erosion is eliminated altogether, with the regenerating carbon fully protecting the anode for the total of >$10^7$ pulses. Anode materials are not limited to Copper 145 and may be composed of other high-conductivity metals and alloys.

FPPT Performance Measurements

Breadboard Operation and Discharge

Figure 13A:
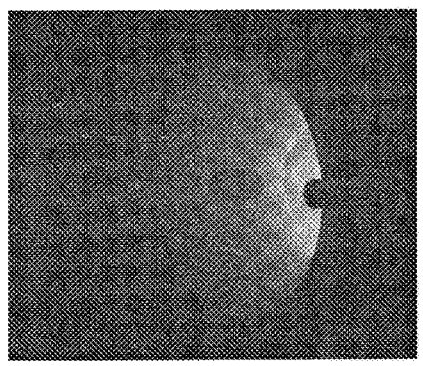
FIGS. 13A and 13B show breadboard FPPTs during operation at ~500 V with ~3 µs pulses.
Figure 13B:
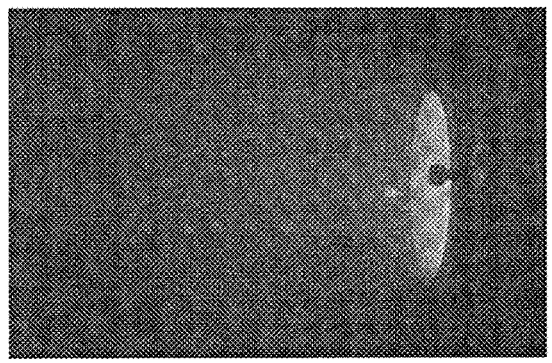

Testing of the breadboard FPPT (FIG. 11) was performed. Hundreds of thousands of pulses at approximately 800 V run were run without failure. The only capacitor failures occurred when the capacitor banks were tested to the rating limit (1000 V) of the individual MLCCs. Testing resulted in a measured PTFE mass loss of 5-13 µg/pulse depending upon pulse energy and feed rate. The metal anode saw a very low mass loss of ~0.1 µg/pulse over the life of the development program. Voltage traces indicated a half-cycle time from ~3 µs to ~15 µs, depending on bank energy and pulse circuit inductance. FIGS. 13A and 13B show photographs of the breadboard FPPT during operation. Based upon the uniformity observed in photographs of the cathode (FIGS. 13A and 13B), Applicant is achieving azimuthal discharge symmetry as expected (as opposed to localized arc spoking operation).

Figure 14A:
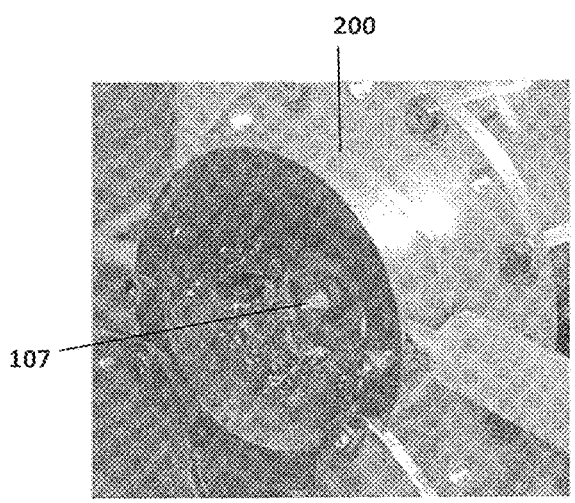
FIGS. 14A and 14B are photographs taken after (FIG. 12A) and during (FIG. 12B) FPPT testing, with operating conditions of ~17 kA, 800 V, 66.1 µF, 5 Hz at 20.6 J/pulse, and a feed rate of 7.7 µg/s.
Figure 14B:
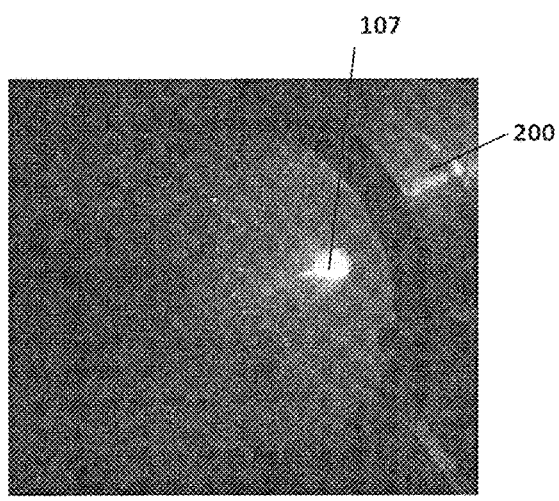

Testing involved several operating conditions. One of the important findings was that the feed system could provide a reliable and variable rate of feed without having the feed stop. This results in the plasma discharge self-forming a shaped (usually conical) end tip to the propellant, a unique development capability with FPPT. FIGS. 14A and 14B shows an operating condition in which the Teflon™ (or PTFE equivalent) fiber is slightly protruding into the discharge region. An important feature to observe is the plasma pinching effect at the fuel tip (discussed below). FIGS. 15A and 15B show how different operating conditions can result in the propellant significantly protruding into the discharge region and forming a stable conical shape.

It was noted that, over a range, the thruster consumes PTFE at the rate fed by the microprocessor-controlled stepper motor. The motor drive is set to advance the fiber ~0.2 mm every 200-500 thruster pulses with the interval chosen by the operator. When not fed quickly enough a fuel-starved condition is entered during which increased anode erosion is observed. Fuel-rich feed results in lower anode erosion rates and lower $I_{sp}$. Control of the PTFE fiber feed rate without a fuel stop provides control of specific impulse and to a lesser extent of thrust, and represents a dramatic advantage of FPPT over prior PPT systems.

A typical waveform of the pulse current is shown in FIG. 16 for a 17.5 µF, 800 V, 5.4 J case with a 10 kA peak and 2.5 µs first half cycle. Higher pulse currents are achieved with increased energy.

Thrust Stand Measurements

Thrust measurements using a 6-second period "Watts pendulum" thrust stand were taken to evaluate FPPT performance (thrust, $I_{sp}$ and efficiency). A single module capacitor bank having a nominal capacitance of 33 µF, a double module capacitor bank with a nominal capacitance of 66 µF, and a quad module bank with a nominal 132 µF were all tested, FIGS. 17-19. Data taken at various energies show thruster efficiency increasing with energy and $I_{sp}$, as expected. The highest efficiency was measured with the quad module 33.3 J capacitor design.

Steady state average thrust while pulsing is measured on the thrust stand by measuring deflection. Before every data set, the thrust stand deflection is calibrated. To obtain specific impulse, the calibrated mass flow rate of the thruster is used. The propellant advance per feed stepper motor pulse is calibrated over 1000s of feed motor pulses at various feed rates and conditions to verify its consistency. For example, one motor feed pulse every 200 thruster pulses yields a mass flow rate of 15.5 µg/pulse for the nominal 3.2 mm PTFE fiber. With an accurate linear density and linear feed rate, the prescribed mass flow rate is consumed by the thruster at high accuracy after an initial burn-in to establish the propellant tip cone. Other ablative mass losses are not considered in these specific impulse determinations, as preliminary testing indicates anode and igniter mass ablation is between 0-2%, depending on operating conditions where higher $I_{sp}$ operation ablates a lower fraction of the total mass expelled.

Figure 17:
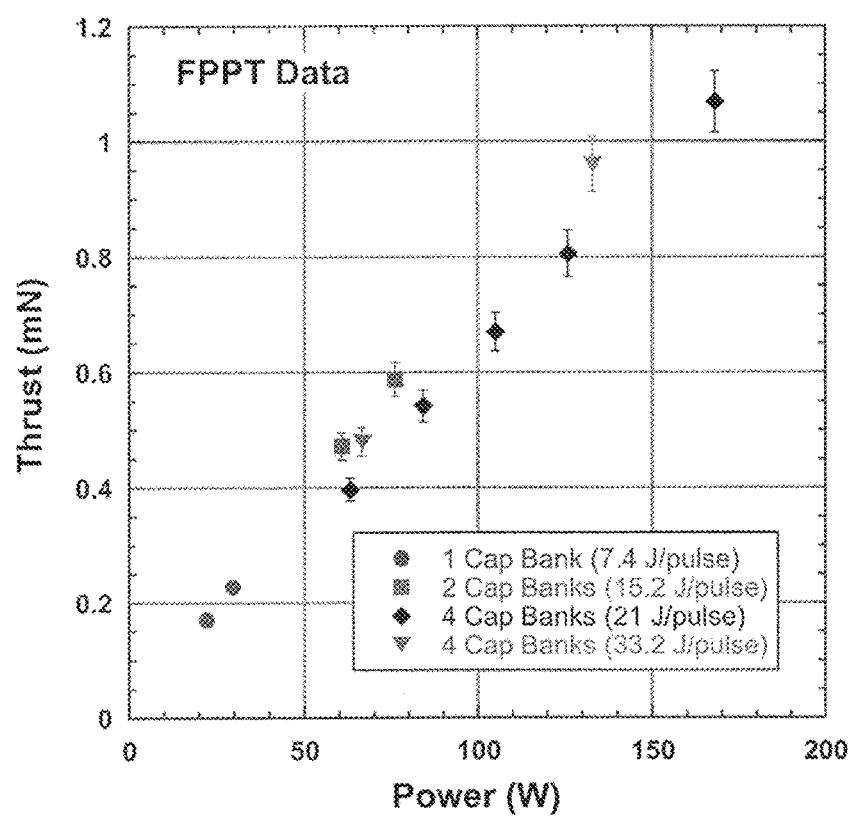
FIG. 17 illustrates total thrust versus input power as a function of four different operating conditions (using three different capacitor banks)

FPPT thrust measurements for continuous pulsing are shown in FIG. 17 as a function of power input and operating conditions. Each set of data represents the same operating conditions at different pulse rates showing that thrust is directly proportional to pulse rate and correspondingly total power input. For the data shown in FIG. 17 the lowest pulse rate was 2 Hz and the highest was 8 Hz; note that lower pulse rate operation is easily done due to the nature of a PPT. Each of the 4 unique operating conditions shown was fired for a minimum of 10,000 shots before taking the thrust measurement to ensure a properly formed propellant cone, thereby ensuring an accurate $I_{sp}$ calculation. FIG. 17 contains 44 unique thrust measurements (for clarity, only a sampling of the total number taken is shown), each of which is an average of the turn-on and turn-off thrust level with a ±5% shot-to-shot repeatability.

Figure 18:
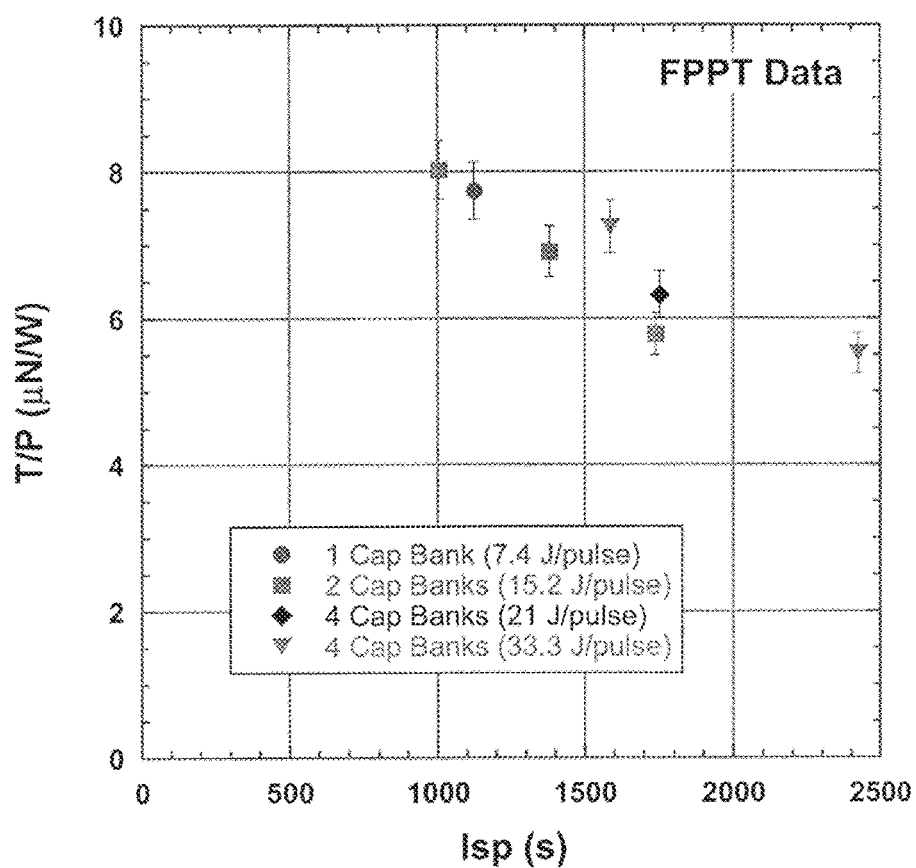
FIG. 18 illustrates specific thrust vs. specific impulse as a function of four different operating conditions (using three different capacitor banks) showing higher performance with increasing bank energy.

FIG. 18 shows specific thrust (µN/W) as a function of the specific impulse for different capacitor banks and energies per pulse. In each case, higher $I_{sp}$ is the result of lower mass per pulse, and higher thrust arises from increased mass per pulse. The original FPPT goal of 1200 s $I_{sp}$ was significantly exceeded, with peak performance surpassing 2400 s. This particular point was measured six times, three at 4 Hz and 2 Hz pulse rates respectively, and as always was preceded by over 10,000 firings to ensure an accurate feed rate determination.

Figure 19:
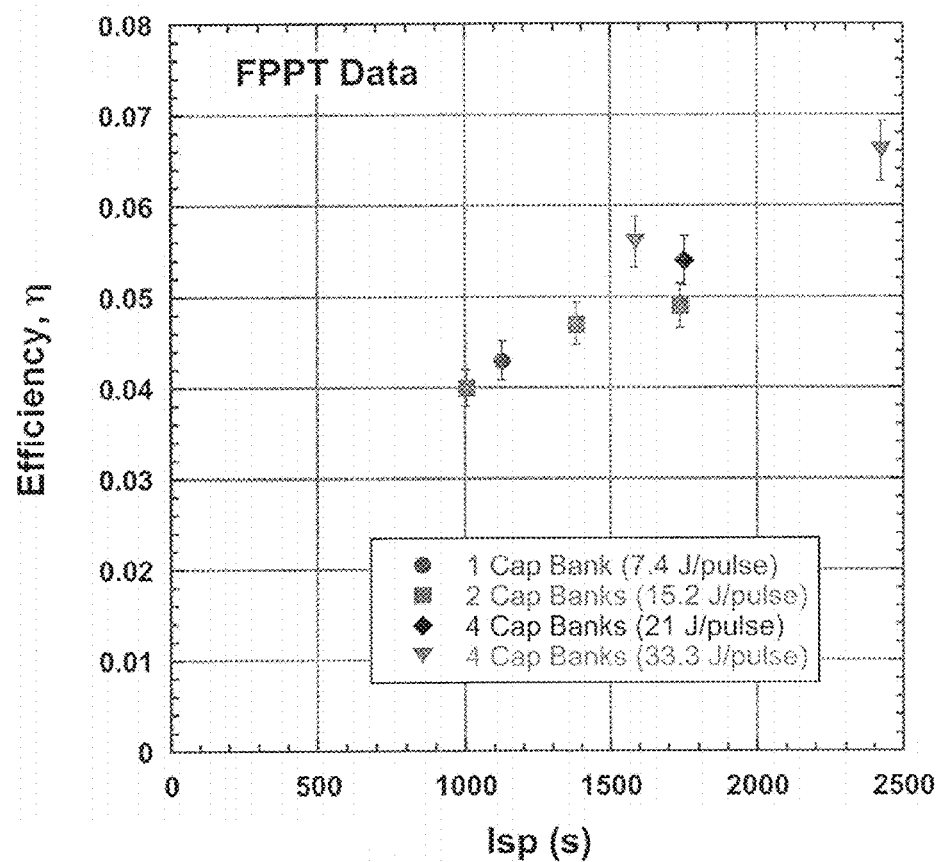
FIG. 19 illustrates thrust efficiency vs. specific impulse as a function of four different operating conditions (using three different capacitor banks)

FIG. 19 shows thruster efficiency as a function of specific impulse, computed by dividing the thrust power (T*$U_e$/2) by supply power. The capacitor charging power supply input is monitored, and its rated efficiency is applied to the measured supply wall power draw when calculating the power into the thruster capacitor bank. The 2400 s condition is the most electrically efficient case at over 6.5% at a slightly reduced specific thrust from the 1750 s condition, indicating that the thrust is mostly electromagnetic with a small electrothermal contribution (FIG. 18). Heritage PPT-11 data show that efficiencies exceeding 12% are possible, and ongoing development has yielded efficiencies exceeding this 12% mark at 3600 s. Efficiency increases have been modest with higher discharge energy and more significant with higher $I_{sp}$, via feeding less propellant per pulse. The reduction in propellant reduces the electrothermal contribution, and provides a corresponding lower thrust, requiring more thruster firings to consume a given propellant load. Conversely, higher thrust operation is less efficient, but requires fewer thruster firings. Ongoing research at Applicant is examining increases in efficiency via optimizations of propellant diameter, anode geometry, cathode geometry, and plasma discharge impedance matching.

FPPT Analyses

Lumped Parameter Circuit Model

From PPT-11 studies, high peak current is desired for $\vec{j} \times \vec{B}$ $\vec{j} \times \vec{B}$ forces to dominate the thrust over electrothermal. A circuit model has guided FPPT development. Further refinement of the modeling follows FPPT current measurements.

Figure 20:
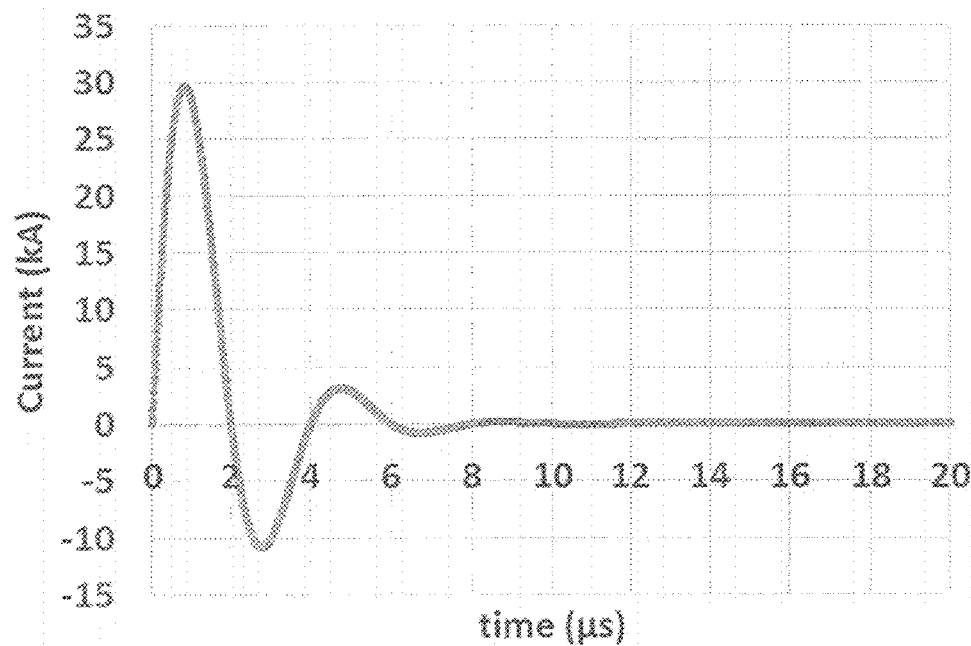
FIG. 20 illustrates the predicted pulse shape from a lumped parameter circuit model for a 30 kA pulse.

A lumped parameter circuit model predicts the experimental waveform with reasonable accuracy by adjusting the model impedance. The model derives from PPT-11 heritage which also showed a close match to experimental data. The FPPT waveform, FIG. 16, is more damped that of FIG. 20 (FIG. 20 is PPT-11 current waveform) as the FPPT operates at a higher impedance than PPT-11. The waveform and inductance model predict electromagnetic contribution to $I_{bit}$ and show close agreement to thrust stand measurements of $I_{bit}$ at high $I_{sp}$.

Electromagnetic Thrust Component Analysis

Figure 21:
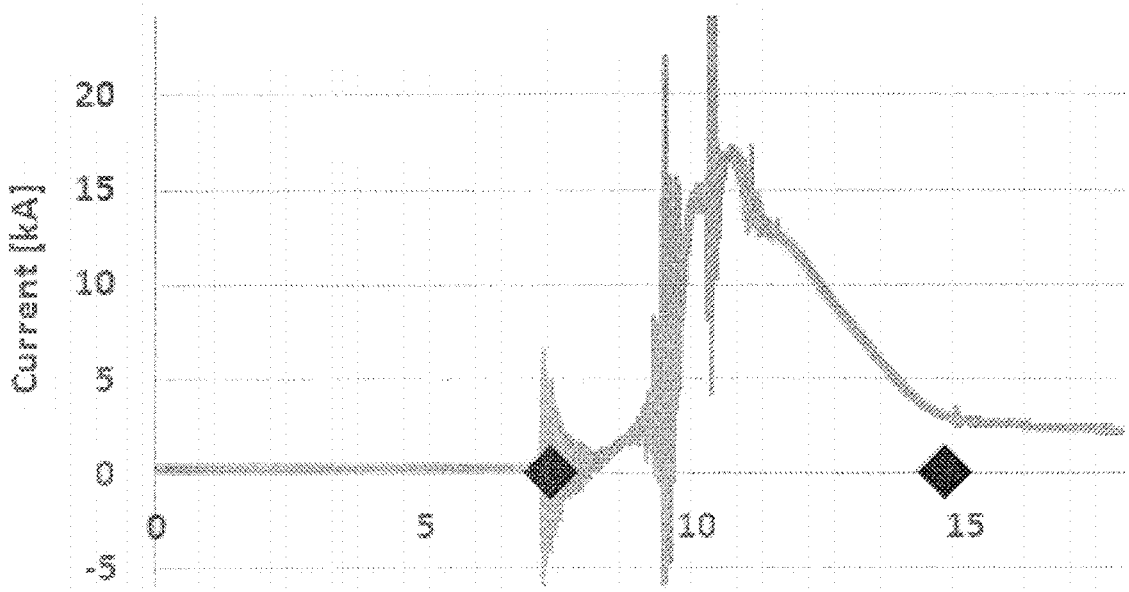
FIG. 21 illustrates a FPPT current pulse trace with a peak current of ~17 kA.

A current pulse trace from the FPPT is shown in FIG. 21. Bank energy is 19 J at 800 V. Peak current is ~17 kA, and pulse duration is ~6 µs. The impedance of the discharge is such that the waveform is approximately critically damped with no current reversal observed, and the circuit model indicates 27 mΩ for the discharge. Circuit impedance matching is essential with reduced reverse current to protect the capacitors.

The total impulse bit resulting from the current pulse must be measured on a thrust stand, but the EM component can be calculated from:

$$I_{bit} = \frac{\mu_0}{4\pi} \int I^2 dt \left[ \ln\left(\frac{r_c}{r_a}\right) + \frac{1}{2} \right]$$

where $r_c$ is the radius of the annular cathode and $r_a$ is the radius of the central anode. The current-squared "action integral" over the pulse length is measured as $\Psi$=591 A$^2$-s, and the resulting EM impulse bit is 0.092 mN–s. The measured total impulse bit at the equivalent mass flow rate of 31.0 µg/s is 0.105 mN–s, therefore the electromagnetic thrust fraction β is 0.092/0.105=87%. While the EM contribution to FPPT thrust is already high, further increases in $I_{sp}$ will increase thruster efficiency and the percent EM contribution.

FPPT Acceleration Mechanism

Figure 22:
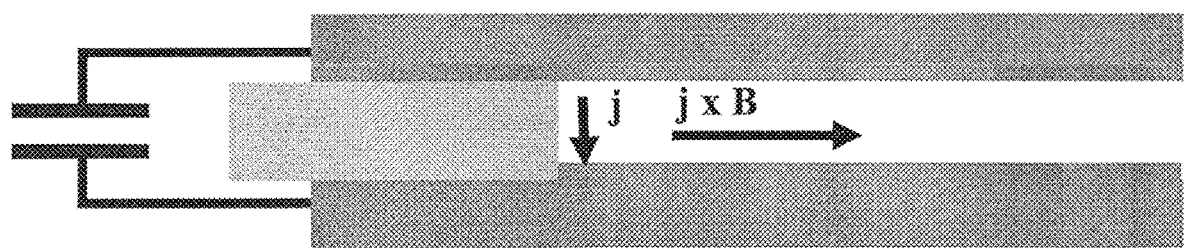
FIG. 22 is an illustration of the classic parallel-plate PPT design with current and acceleration directions.

The coaxial FPPT operates in a different $\vec{j} \times \vec{B}$ mode than the classic parallel-plate PPT. For both the spring-fed parallel plate and coaxial versions of the classic PPT (FIG. 22) the current flows from anode to cathode parallel to the Teflon™ (PTFE) propellant face, inducing a high B field parallel to the face, both in the electrode gap and in the propellant, and a normal $\vec{j} \times \vec{B}$ force is directed away from the face in the flow direction. For this mode, it is well established that the PTFE solid surface is heated to 860 K by radiation, sublimates, and becomes dissociated, ionized and accelerated by $\vec{j} \times \vec{B}$.

Figure 23:
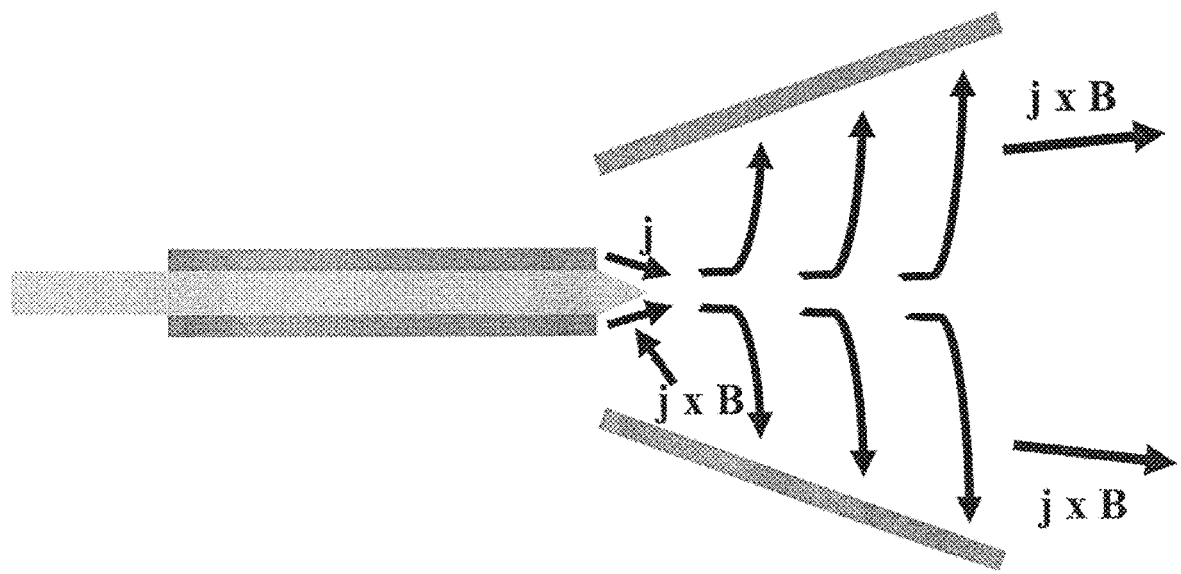
FIG. 23 is an illustration of the FPPT design with current and acceleration directions.

The FPPT uses a coaxial geometry with the PTFE propellant located on the centerline inside the central anode, as shown in FIG. 23. The self-magnetic field B is in the azimuthal or θ direction. For FPPT, the propellant diameter is typically 3.2 mm, or smaller to remain flexible, and is fed continuously through the anode. The downstream conical shape of the propellant tip is a result of continuous propellant feed, with the cone length increasing with increasing feed rate. A typical cone half angle is 15-30 deg.

Figure 24:
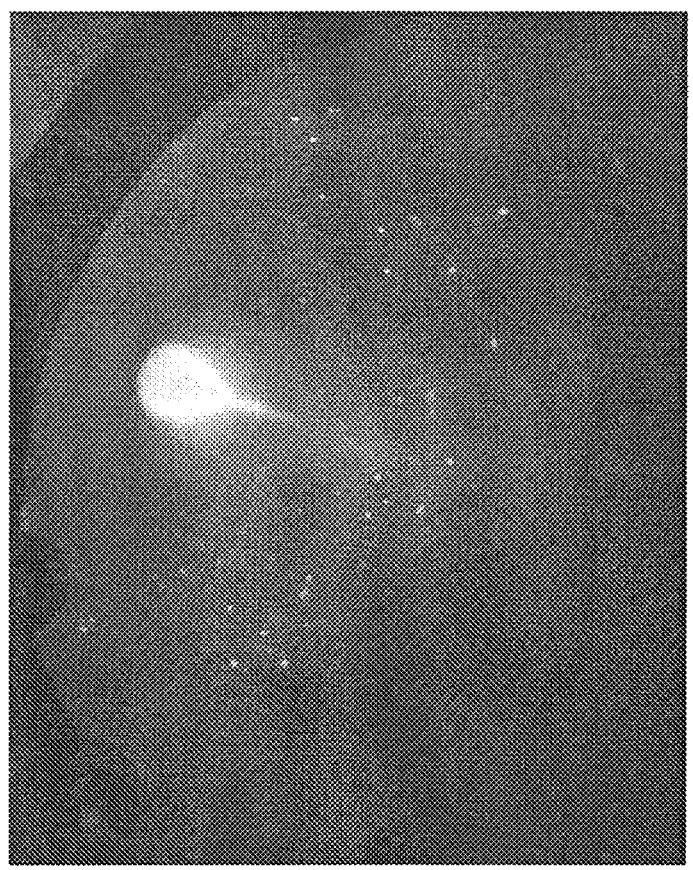
FIG. 24 is a close-up photograph of the FPPT plasma region showing pulse discharge symmetry and plasma pinching on the Teflon™ (or PTFE equivalent) fuel cone and downstream on the axis.

Compared to the classic PPT, the conical geometry directs $\vec{j} \times \vec{B}$ radially inward and toward the Teflon™ (or PTFE equivalent) face. Evaporated PTFE plasma, once dissociated and ionized in the discharge, is the primary current carrier. Peak currents in the discharge of 10 s of kA at small radius implies high $B_e$, which results in a strong plasma pinching effect and a centerline pressure of several atmospheres. Evidence for this can be seen in FIG. 24 where the core plasma appears to be both pinched and symmetric. For an anode axial current radius of 3 mm and peak current of 30 kA, the resulting $B_e$ is 2 T, which corresponds to a magnetic pinch pressure of 16 atm, producing axial thrust on the anode.

The physics of the pinch plasma in the anode tip region is unique for pulsed electric thrusters. The region bears a resemblance to that of the magnetoplasmadynamic (MPD) thruster with a conical tip cathode, with significant differences in that the electrode polarities are reversed, reversing the direction of $\vec{j} \times \vec{B}$ at the anode tip, and the cone tip is non-conducting PTFE which is the source of mass injection from surface sublimation. Because the magnetic field is zero and the pressure is high on the PTFE surface, the sublimation, dissociation, expansion and ionization processes will experience different physics in comparison to the classic PPT.

Figure 25:
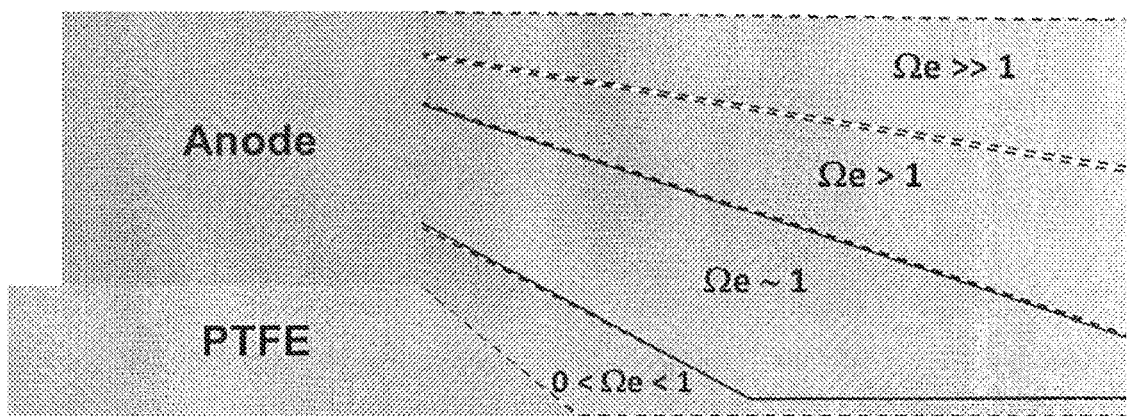
FIG. 25 is an Illustration of the predicted Hall parameter $\Omega_e$ variation in the FPPT anode region.

The unique distribution of the electron Hall parameter $\Omega_e$ near the anode is shown in FIG. 25. With $\vec{B}$ and $\Omega_e$ both zero along the PTFE surface, the electron conductivity is scalar in that region, allowing electron current conduction, joule heating near the surface, and dissociation with partial ionization of the sublimating PTFE. Downstream from the anode and at the edge of the axial current column the B field strengthens and the density decreases, so that $\Omega_e$ becomes >1, and axial current is conducted mostly by ions. The $\vec{j} \times \vec{B}$ force near the anode is radially inward, keeping the ions near the axis. To complete the circuit, electrons are emitted from cathode spots or created in the discharge gap volume, subsequently migrating downstream toward the thruster exit by $\vec{E} \times \vec{B}$ drift.

It is anticipated that charge exchange collisions play an important role in the ion conduction process on axis. Typically, the degree of ionization α is 30-70%, implying a significant population of neutrals (which must be accelerated electrothermally). Because the heavy particle elastic and charge exchange collision cross sections are of comparable magnitude, the E-field acceleration process is one where the ions acquire a drift velocity but then experience charge exchange, and drift for some distance as a neutral. A second charge exchange collision allows the newborn ion to accelerate again to a higher drift velocity, a process that continues as long as radial $\vec{j} \times \vec{B}$ is present. This process partially explains why higher discharge energies, accompanied by higher α, result in higher specific impulse. The variation of the Hall parameter near the anode is shown in FIG. 25.

Flight-like FPPT Model and Design

Figure 28A:
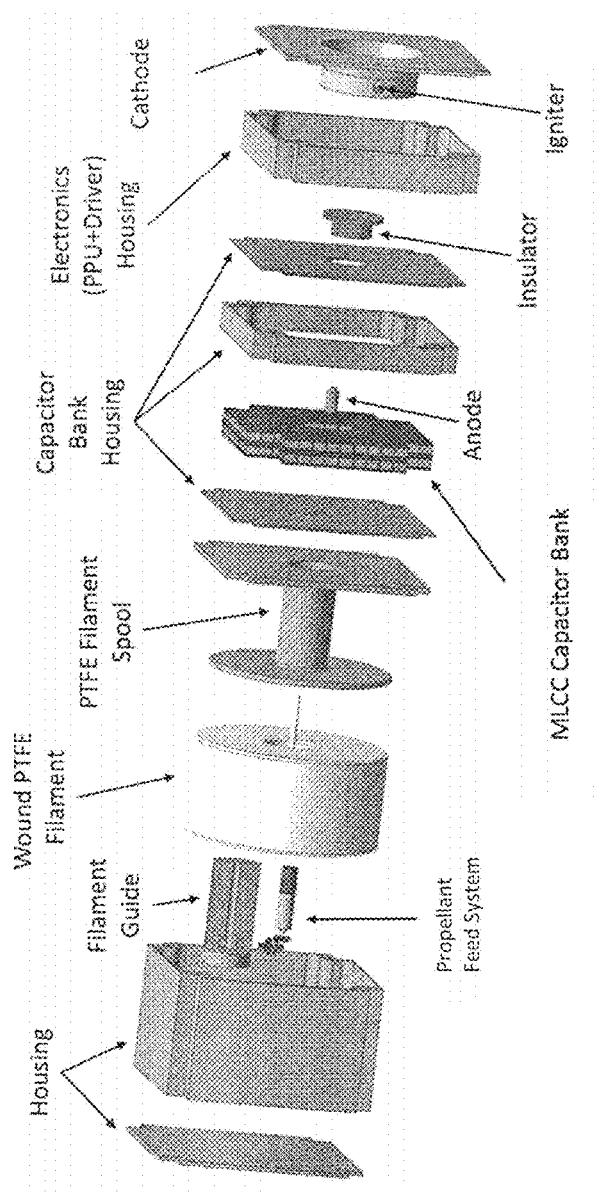
FIGS. 28A, 28B and 28C are views of an FPPT system in a 1U volume envelope having sufficient PTFE propellant to achieve 10,000 N-s of total impulse.
Figure 28B:
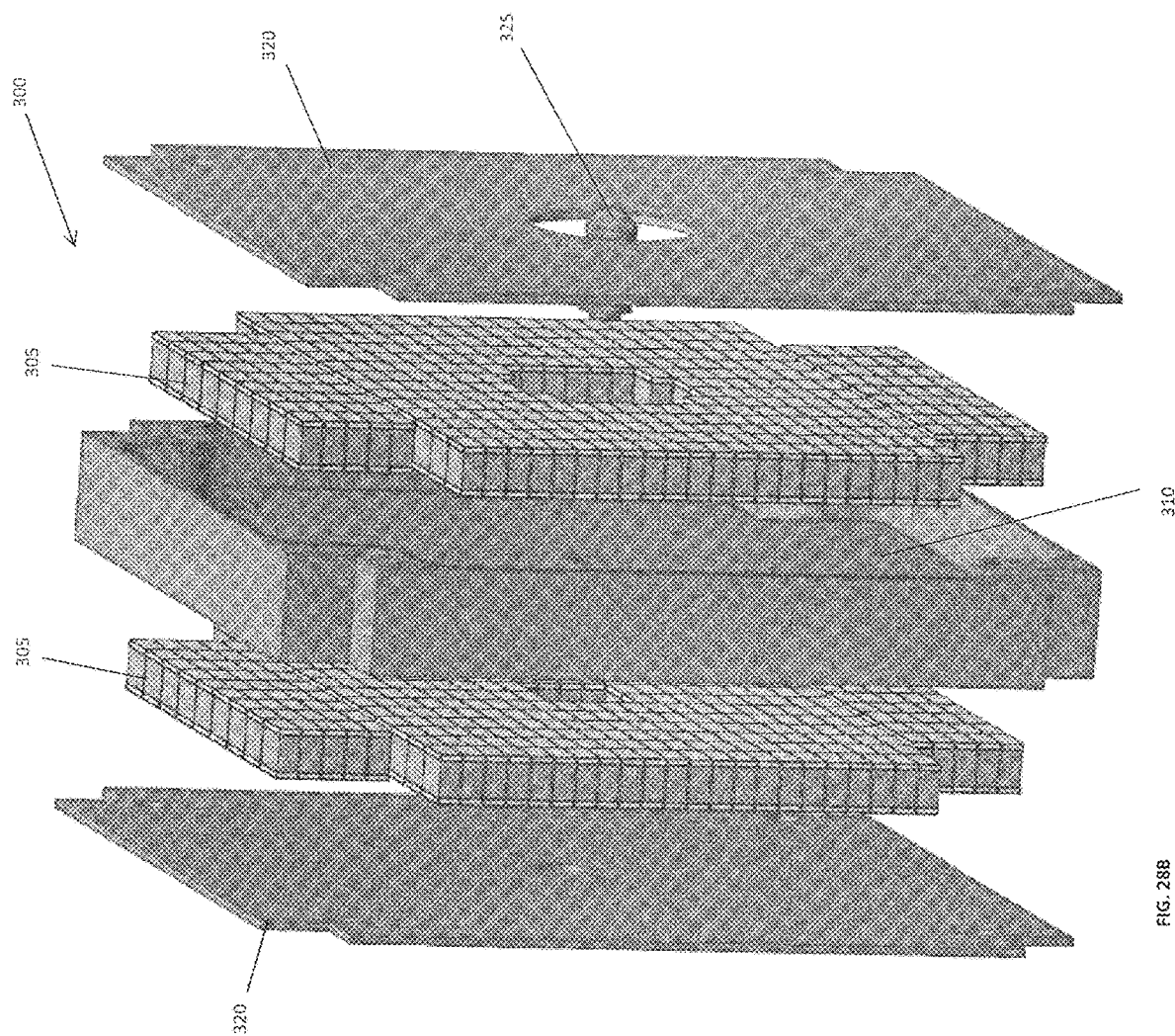
Figure 28C:
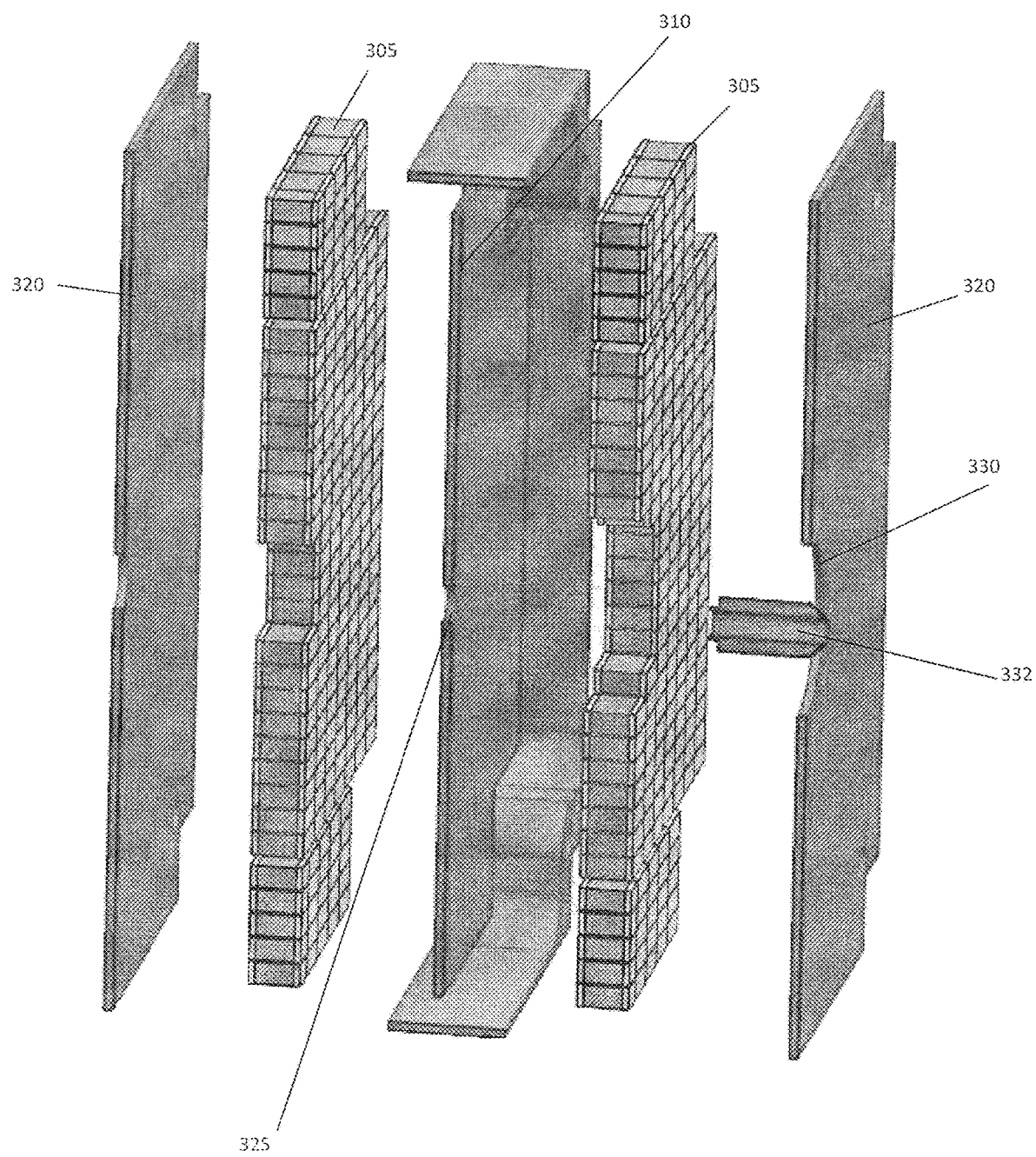
Figure 29B:
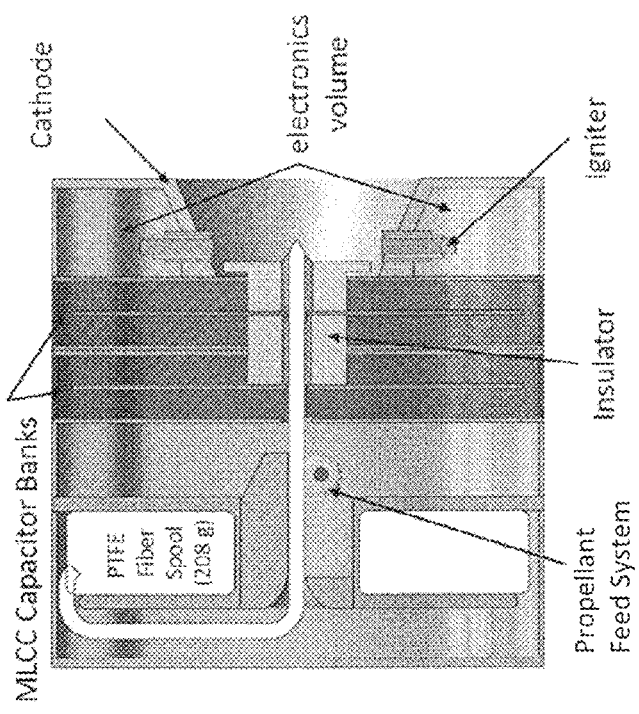
FIGS. 29A and 29B are 3D perspective and cutaway views of an FPPT system in a 1U volume envelope featuring 40 J of capacitors with a partial propellant load having sufficient PTFE propellant to achieve 4900 N-s of total impulse @ peak $I_{sp}$ operation.
Figure 29A:
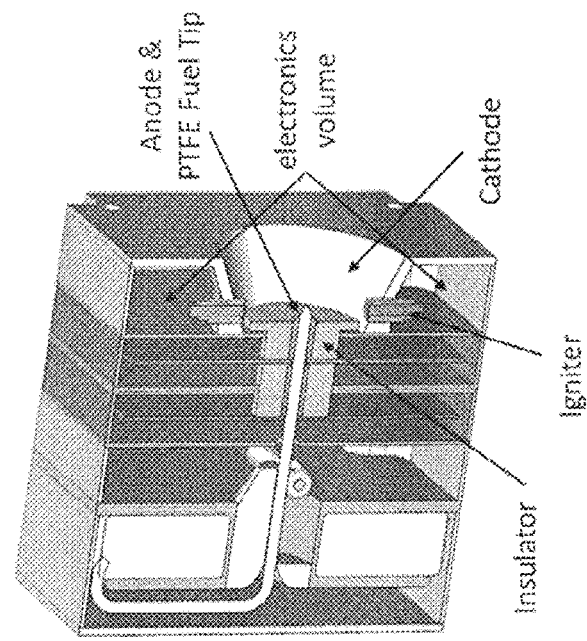
Figure 30A:
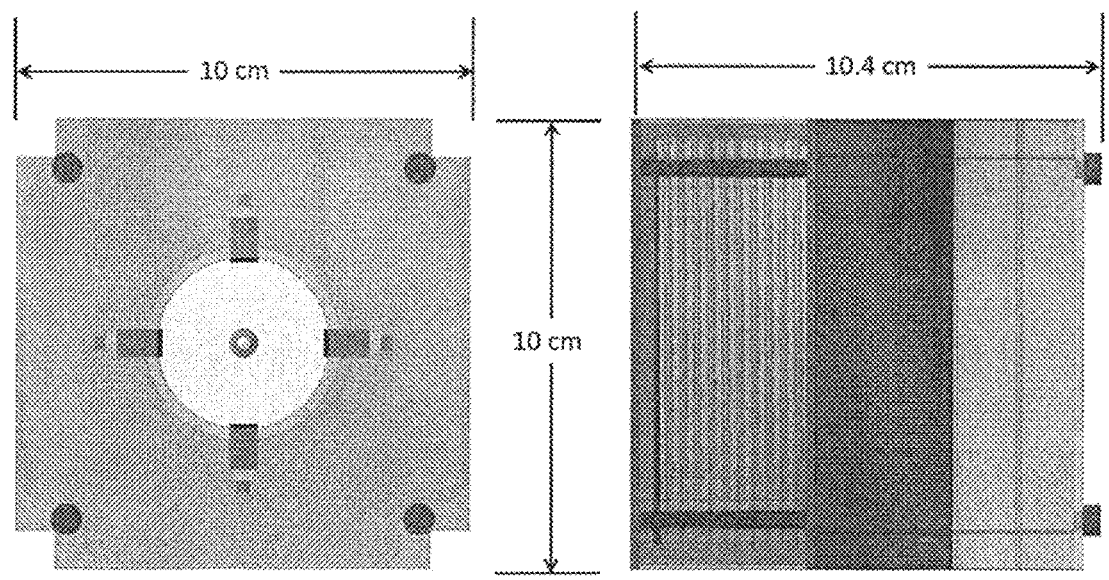
FIG. 30A illustrates 2D front and side illustrations of a 1U embodiment having four (4) igniters and a cylindrical ring-shaped cathode.
Figure 30B:
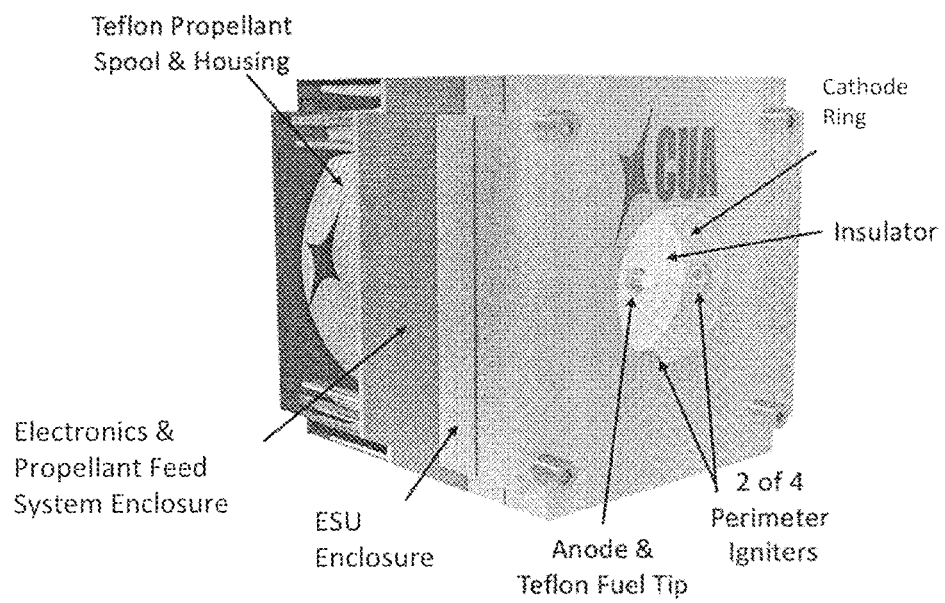
FIG. 30B illustrates a 3D perspective of a 1U embodiment having four (4) igniters and a cylindrical ring-shaped cathode.

Flight-like FPPT CAD models were created to demonstrate that it is possible to package enough fuel for a 10,000 N–s thruster in a 1U-sized (1 liter) volume. FIGS. 26A-C illustrates the basic 1U package from the front, side, and back. FIGS. 27A-B shows a 3D perspective along with a cutaway view for a 10,000 N–s spool of PTFE. An exploded view of the design showing all of the different primary parts is shown in FIGS. 28A-28C. Note that the PPU and motor drive electronics package (circuit boards) are designed to fit in the volume between the cathode and the MLCC capacitor bank. While FIGS. 24A-B shows a tightly packed configuration in which it should be possible to achieve the ambitious goal of 10,000 N–s in a 1U volume envelope, an alternative design will trade fuel volume in a 2,000 N–s design for increased capacitor energy storage to increase thruster efficiency, FIGS. 29A-B. Another embodiment of the 1U package design is shown in FIGS. 30A-B in which there are four (4) igniters and the ring-shaped cathode is cylindrical rather than conical in shape.

Flight-Like FPPT PPU and Motor Board Design

Figure 31A:
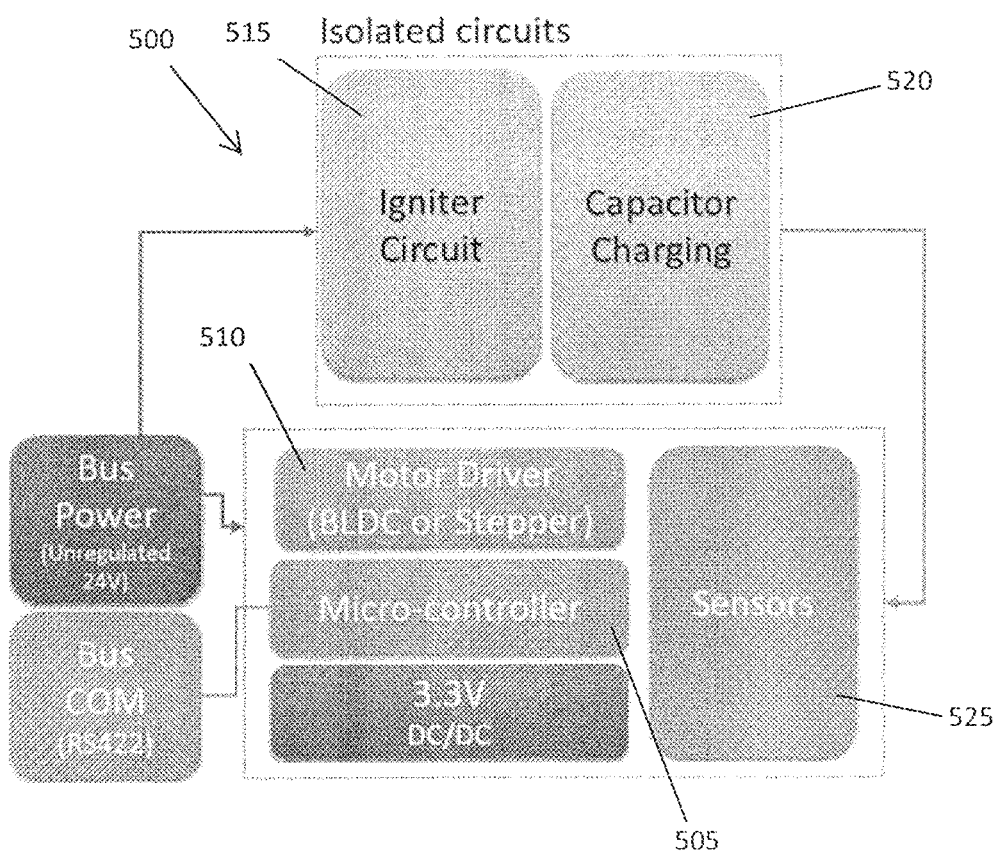
FIGS. 31A and 31B are schematics of a unified circuit board design containing a PPU, motor driver, and microprocessor controller electronics.
Figure 31B:
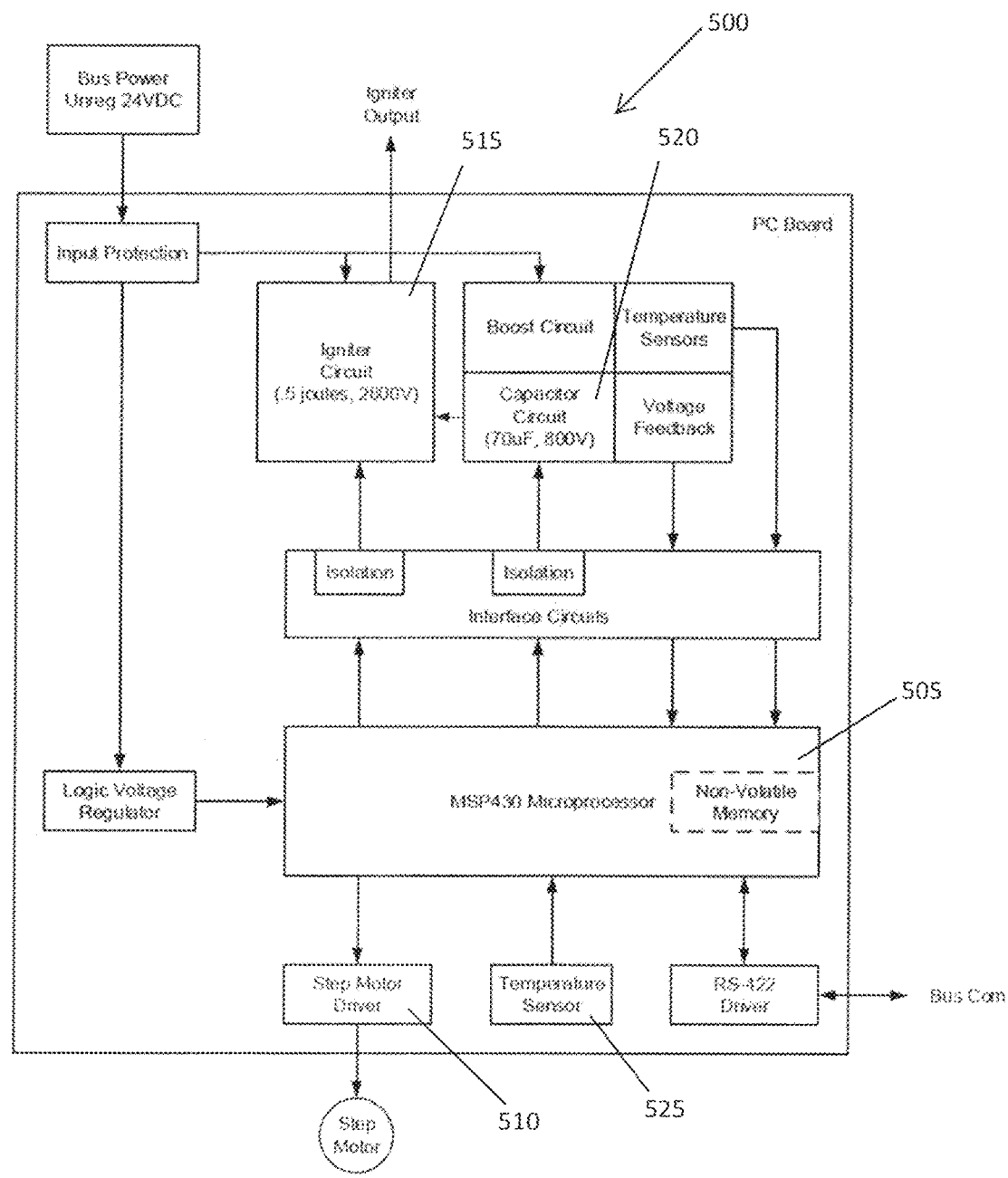

A unified electronics board containing both the PPU and motor driver circuit is required to drive the FPPT system. FIGS. 31A and 31B show block diagrams 500 of the unified electronics board with PPU, motor driver, and microprocessor controller electronics. The current design utilizes a 24V to 120V DC boost converter, and a 20:1 transformer for the igniter pulse from a 120V DC output that results in 2400 V ignition. A Dickson charge pump topology is anticipated for the main capacitor bank charging because it eliminates the need for a massive high-power flyback transformer. Compared to other voltage multipliers, fewer diodes are used in exchange for the requirement of high voltage capacitors. Simulations were performed on the charging circuit that resulted in 86% electrical efficiency with a full charge in under 0.02 s, allowing a 50 Hz pulse rate. COTS PPU options are also available in slightly larger volume configurations. As shown in FIGS. 31A and 31B, the on-board electronics 500 are situated in the FPPT 200 with a dedicated microcontroller 505. Commands to the stepper motor 510 to feed propellant, the igniter circuit 515 to fire, and capacitor bank circuit 520 for charging are controlled by the FPPT on-board 500 and not necessarily by the satellite. Sensors 525 may also be employed to monitor temperature in case an emergency shut off is required to allow the system to cool.

Figure 32:
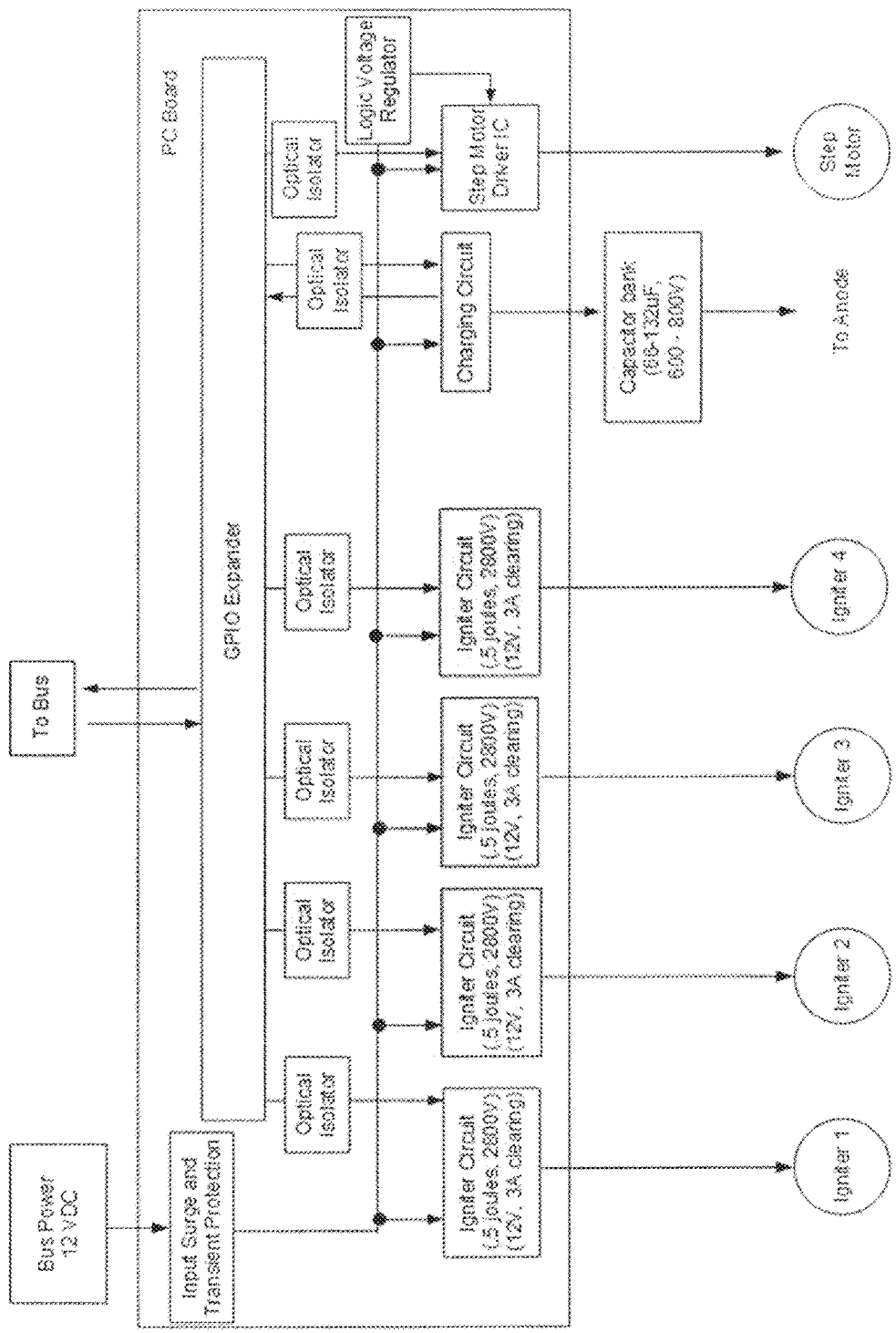
FIG. 32 is a schematic of a more robust unified circuit board design containing electronics for a PPU and motor driver, but without a microprocessor controller.

FIG. 32 shows a schematic of a second possible unified electronics board with PPU and motor driver. This is a more robust circuit design that offloads some control to the bus in exchange for operating without an onboard microcontroller. All operation is controlled with GPIO and some simple counters. This board will utilize a GPIO expander and a simple command list to operate, saving cost, complexity, and software development. COTS PPU options are also available in slightly larger volume configurations. Instead of having the dedicated microcontroller on the FPPT, in this example, the stepper motor and firing operations are controlled through the GPIO to the FPPT.

Thrust Vectoring (Steering) with FPPT Igniters

Figure 33:
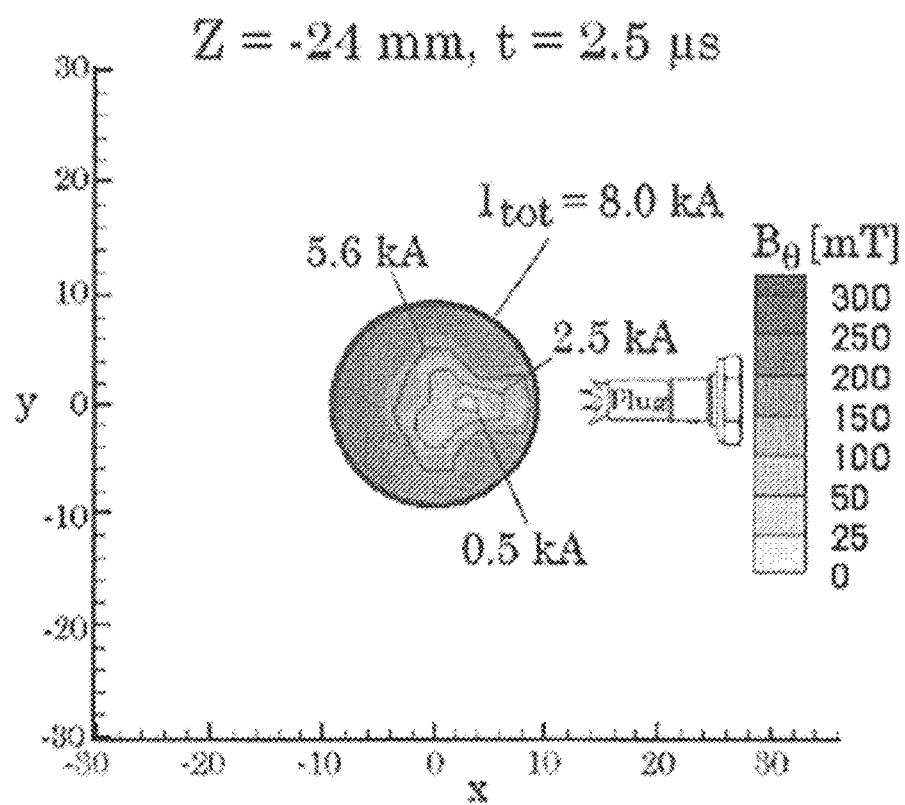
FIG. 33 illustrates B-probe measurements inside the nozzle of the asymmetric discharge produced in a coaxial PPT with side-mounted igniter in terms of magnetic field contour plots and enclosed current (from FIG. 15), implying off-axis electromagnetic thrust.

Achievement of pitch and yaw thrust vectoring (and backup ACS) with FPPT takes advantage of the four igniters equally spaced at 0, 90, 180 and 270° around the base of the thruster discharge chamber. In normal operation these igniters are operated sequentially to equalize component life. For thrust vector operation a single igniter is used. The origin of thrust vectoring comes from PPT discharge asymmetry as shown in FIG. 33 for an earlier coaxial PPT design. The distinct asymmetry produces reduced magnetic field $B_\theta$ in the vicinity of the igniter, and maximum $B_\theta$ at 180° from the igniter.

The $B_\theta$ asymmetry will produce a small radial thrust component in addition to the primary axial component, and with the spacecraft center of gravity on the thrust centerline, will create a rotational torque on the spacecraft. During normal operations the sequential operation of the four igniters will average out this radial thrust component. As there is no reliable approach for a calculation, a series of thrust stand tests will be required to quantify FPPT thrust vectoring, that have not been performed to date.

Summary and Future Directions

With these technology advancements, Applicant has now demonstrated the innovative use of a motor-driven system to feed spooled high-density PTFE propellant fiber combined with a cathode design similar to Applicant's prior PPT-11 technology and modern MLCC capacitor electronics packaged into a compact FPPT configuration, FIG. 11; this enables an order of magnitude (or more) improvement in volumetric impulse [N–s/liter] and specific mass for nano-to-small-satellite thruster performance. Using wound solid propellant filament spooled in a 1U package, the FPPT eliminates fluid leakage and pressurization systems, leading to reduced range safety concerns and significantly reduced recurring costs. Applicant's long-term goal is to establish the FPPT as a mature integrated system solution.

Experiments have proven stable, reliable operation of a breadboard high-throughput FPPT system. The FPPT thruster is currently at Technology Readiness Level (TRL) 5. A baseline system has been designed with well-defined operational conditions for power (both losses and requirements), propellant feed rate, and related hardware designs. Hardware designs employed simple machining and manufacturing techniques, allowing Applicant to implement engineering mitigation techniques that have dramatically retired risk of this innovative thruster technology. Future development will jump to TRL 6 and higher. The FPPT thruster system supports the NASA Roadmap for In-Space Propulsion Systems, nonchemical propulsion.

Achievements and risk reduction experiments conducted to date include: (a) Fabricated a PPT thruster head modified for PTFE fiber feed; (b) Demonstrated reliable and accurate metering of the propellant feed; (C) Designed, assembled, and demonstrated reliable highly-parallel ceramic capacitor banks (>500,000 pulses); (D) Demonstrated extended life through bench-testing of six (6) MLCC capacitors to >500,000,000 pulses at 800V, or 80% of the rated voltage (1000 V); (E) Designed, assembled, and demonstrated reliable regenerative carbon igniters from COTS materials and components (>500,000 pulses); (F) Demonstrated reliable discharge ignition and evaporation of PTFE fiber in a continuous fashion; (G) Experimentally demonstrated variable specific impulse, thrust and efficiency in a simulated space environment; (H) Designed a high-throughput 1U FPPT flight-like system with low specific mass; and (I) Refined system models of discharge pulse and performance from thrust stand results to guide future development.

Future demonstrations and risk reduction to be conducted include: (A) Improved ceramic capacitor bank (higher energy and current, ~40 J and ~30 kA); (B) Performance optimization trade studies (current, feed rate, with thrust stand testing); (C) Flight-like circuit boards (PPU+feed stepper driver); (D) Igniter system development and life testing (>100% life of a 1U system); (E) Material and electrode geometry optimization (with thrust stand testing); (F) Improved anode designs to reduce discharge impedance and increase efficiency; (G) Full system design refinements (maintain goal of $\alpha$<10 kg/kW); (H) Full system fabrication and integration; (I) Acceptance testing (thrust stand, vibration, TVAC, life); (J) FPPT TRL increase to TRL 6; and (K) Flight-like FPPT unit delivered to a government agency or customer.

Several factors result in increasing system performance:

Pulse energy. Higher pulse energy and current raises efficiency. A robust 40 J or higher design is desired.

Total thruster power available. Using an energy storage battery, high power small satellite thruster systems appear possible. We consider a nominal FPPT power level to be 40-80 W at a pulse rate of a few Hertz. This is a power level comparable to the Busek Bit-3 ion thruster.

Pulse shape. Pulse shape is controlled through capacitance, inductance, and circuit resistance. The design goal is 30 kA peak current at reduced discharge impedance and a several µs pulse half-period.

Capacitor life. PPT-11 used a 6.8 kg bank of Unison Industries mica capacitors rated at Vmax=1850 V but only charged to 1300 V. The life of ceramic caps scales inversely as the nth power of charging voltage [L~(Vmax/V)$^n$] where n is typically 10±3. Appropriate voltage ratings for ceramic caps are chosen through testing to ensure a high life cycle safety factor in capacitor operation. The Applicant's MLCC capacitor banks only encountered failure when driven at maximum voltage rating; when operating at ~80% of max voltage, the MLCC capacitor banks operated without issue for >580,000 pulses (~200,000 in compression-connected 175-MLCC circles, the remainder in soldered 320-MLCC square packs). Vishay Intertechnology forecasts in the VJ9363Y104KXGAT datasheet an aging rate of −2.5% capacitance in 10,000 hours. At 3 Hz, this is $1.1 \times 10^8$ pulses.

Pulse rate and throttling. The breadboard FPPT was operated up to 10 pulses per second (pps), but typically ran at 4 pps. By controlling pulse rate, energy per pulse, and propellant feed rate, the 1U FPPT system is fully throttleable over 0-100% thrust.

ESR. Equivalent series resistance becomes a limiting factor as the size of the capacitor bank is reduced. An efficient PPT needs to operate at a total impedance of ~10-15 m$\Omega$, so that ESR<<1 m$\Omega$ is needed to keep capacitor heating to a few percent of the power input. An ESR of ~1.4 m$\Omega$ has been demonstrated.

Figure 4:
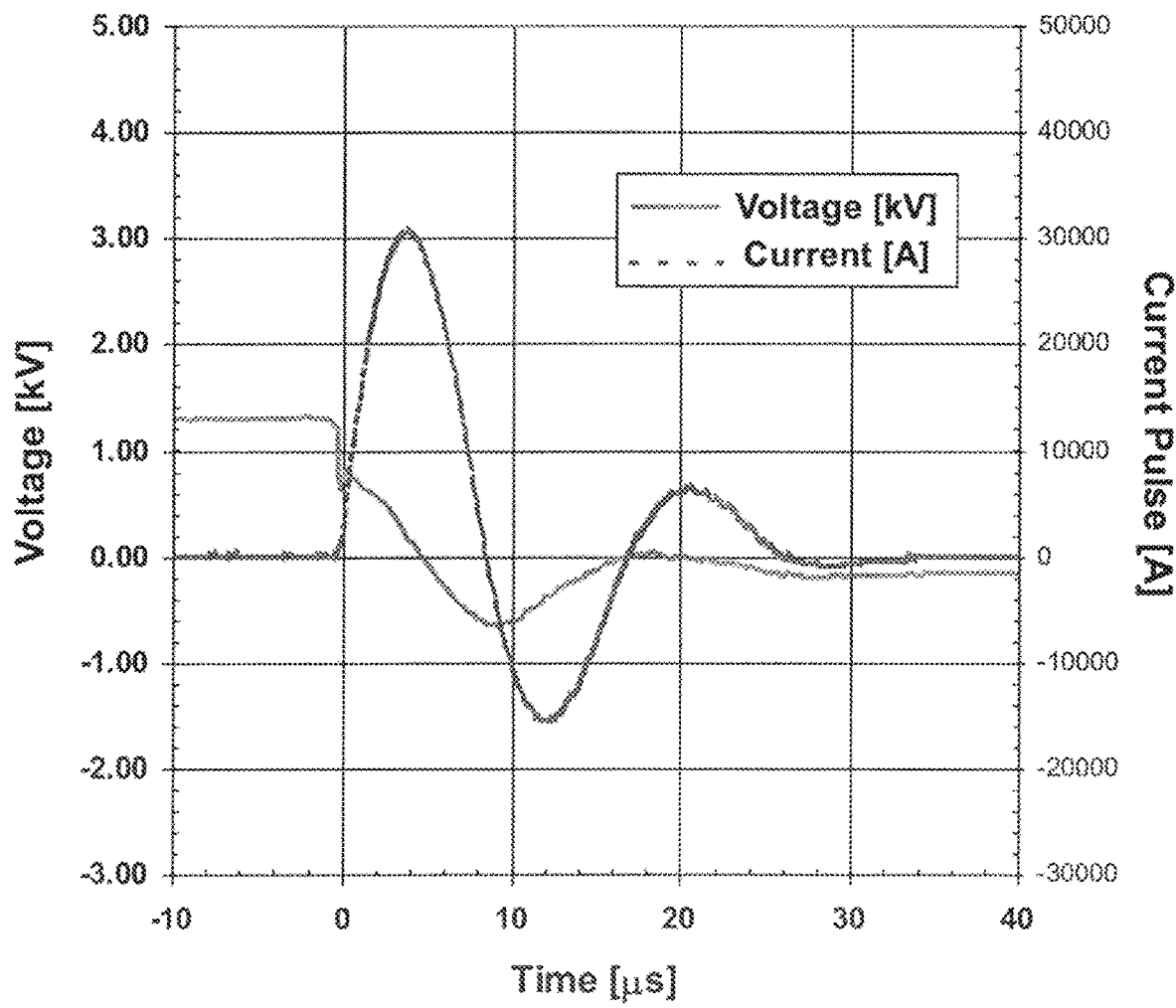
FIG. 4. Typical PPT-11 30 kA current pulse.

Peak current. PPT-11 peak current was 30 kA, with thrust having both a major electromagnetic and a minor electrothermal component, quantified by $\beta$=electromagnetic thrust/total thrust. It has been determined theoretically and experimentally that PPT efficiency increases as $\beta$ increases. The electromagnetic impulse bit is given by $$I_{bit} = \frac{\mu_0}{4\pi} \int I^2 dt \left[\ln\left(\frac{r_c}{r_a}\right) + \frac{1}{2}\right] I_{bit} = \frac{\mu_0}{4\pi} \int I^2 dt \left[\ln\left(\frac{r_c}{r_a}\right) + \frac{1}{2}\right]$$

and total thrust impulse is measured on the thrust stand. The pulse current scales as V/Z, where the circuit impedance is matched to the discharge impedance Z to minimize waveform ringing (FIG. 4).

Ambient pressure. PPT operation requires low pressure in the electrode gap at the time that cap voltage is applied to prevent an unwanted breakdown. Post-pulse sublimation from the propellant face produces a decaying pressure profile, which requires several milliseconds to disperse. This time constant places an upper limit on pulse rate of the order of 100 pps.

Igniters. The existing regenerative carbon igniter (RCI) design achieved a lifetime of >500,000 pulses. The igniter materials and possible geometry design adjustments can be implemented to achieve a goal of greater than 10,000,000 pulses with a single or multiple igniter. If a single igniter cannot achieve this goal, then multiple igniters can be used in an alternating firing sequence. A >100% life cycle test is desired to reduce risk and clearly demonstrate reliable long-term operation; this corresponds to >10 million pulses with a single FPPT unit. Multiple igniters can also be implemented for redundancy, and to reduce required pulse count per igniter by at least a factor of 2. Testing is used to determine the appropriate path towards developing igniters with the capability of several tens of millions of pulses.

delta-V of 1.0 km/s for a 5 kg CubeSat. Increasing the FPPT form factor to 1.7U increases propellant mass to 827 g, and allows higher capacitance and pulse energy resulting in high $I_{sp}$ of 3500 s which increases the total impulse to >28,000 N–s and raises the delta-V to 3.7 km/s for an 8 kg CubeSat. Improved efficiency electronics along with tighter packing would enable higher energy shots with higher efficiency. Optimized impedance matching, propellant diameter, and anode geometry should also enhance efficiency. It may be possible to improve the performance listed in Table 1 by as much as 25-50% with a fully optimized design and system.

TABLE 1

Estimated FPPT performance for a 1U FPPT system with different operating modes.

| Item | Estimated FPPT Performance: 1U | | | 1.7U |
| --- | --- | --- | --- | --- |
| Operating mode | Medium thrust | High thrust | Medium $I_{sp}$ | High $I_{sp}$ |
| Propulsion system volume | | 1,000 cc | | 1,700 cc |
| Propellant storage volume | | 150 cc | | 394 cc |
| Propellant | | PTFE Teflon™ | | |
| Propellant mass (usable) | | 331 g | | 827 g |
| Total FPPT wet mass | | 1,540 g | | 2,802 g |
| Energy per Pulse from capacitors | 15.2 J | 15.2 J | 15.2 J | 32.0 J |
| Pulse Rate | 2.0 Hz | 7.8 Hz | 2.0 Hz | 1.5 Hz |
| Spacecraft propulsion power input | 36 W | 140 W | 36 W | 48 W |
| Specific Impulse | 900 s | 900 s | 1,500 s | 3,500 s |
| Primary thrust | 0.26 mN | 1.02 mN | 0.20 mN | 0.33 mN |
| Impulse Bit (I-bit) | 0.131 mN-s | 0.131 mN-s | 0.101 mN-s | 0.200 mN-s |
| Mass flow rate of propellant | 0.030 mg/s | 0.116 mg/s | 0.014 mg/s | 0.010 mg/s |
| Total pulses | $2.23 \times 10^7$ | $2.23 \times 10^7$ | $4.81 \times 10^7$ | $1.24 \times 10^8$ |
| Total thrust time | 3,080 hr | 793 hr | 6,640 hr | 22,970 hr |
| Total impulse | 2,920 N-s | 2,920 N-s | 4,870 N-s | 28,400 N-s |
| Volumetric impulse for 1 liter | 2,920 N-s/liter | 2,920 N-s/liter | 4,870 N-s/liter | 16,600 N-s/liter |
| Spacecraft ΔV, 5 kg s/c | 605 m/s | 605 m/s | 1,010 m/s | 6,208 m/s |
| Spacecraft ΔV, 8 kg s/c | 373 m/s | 373 m/s | 622 m/s | 3,747 m/s |
| Spacecraft ΔV, 15 kg s/c | 197 m/s | 197 m/s | 328 m/s | 1,947 m/s |

Materials and Geometry Optimization. Multiple anode materials can be tested to minimize anode erosion without comprising performance. Anode development is critical, because the desired anode has a small diameter, yet must contain the fiber, expose the fiber to the discharge, and be sufficiently robust to tolerate erosion. Feed configurations and materials will continue to be tested for reliability and electrode loss. Two or more different geometries of the cathode cone will be investigated to minimize the volume envelope of the thruster-head and optimize the EM thrust term [In $(r_c/r_a)+1/2$] while maintaining (or improving) overall thruster performance. A cylindrical ring cathode can be implemented instead of a cone shape. Careful consideration is being given to the manufacturability of the anode material and cone geometry. To verify comparison and evaluation, thrust stand testing is being performed.

Performance Estimates

Table 1 shows the estimated packaged performance parameters for a typical 1U FPPT system using different operating modes. The 1U values are based on current measurements and design. Impulse bits $I_{bit}$'s from 0.057-0.241 mN–s have been measured on a thrust stand with a specific impulse ($I_{sp}$) of 900-3600 s, representing a dramatic enhancement from state-of-art PPT technology. A 1-U (10 cm×10 cm×10 cm, 1 liter) volume FPPT thruster package will provide 2900-4870 N–s total impulse, enabling 0.6-1.0 km/s delta-V for a 5 kg CubeSat. A 1U design variation with 331 g propellant enables as much as ~4,870 N–s and a In summary, the present invention provides for a number of different embodiments. In one embodiment there is provided a pulsed plasma thruster. The PPT includes a spool having a fiber propellant wound thereon. A stepper motor in communication with the fiber propellant is provided to pull the fiber propellant from the spool. An insulated tube is configured to have one end in communication with the stepper motor such that the fiber propellant is fed into the insulated tube. An anode is provided with a bore therethrough and it has one end in communication with the insulated tube, such that the fiber propellant travels through the anode. The anode has an exit end, opposite the insulated tube, where the fiber propellant fed through the anode exits. The PPT further includes a power processing unit electrically connected in parallel to a capacitor bank. The capacitor bank has a positive electrical connection to the anode and a negative electrical connection to a cathode. The capacitor bank is further configured to lower the equivalent series resistance to raise a pulse current and raise a $\vec{j} \times \vec{B} \vec{j} \times \vec{B}$ thrust that is generated by the pulsed plasma thruster. The PPT further includes a coaxial insulator positioned about the exit end of the anode. The cathode is positioned about the insulator and has an interior profile shaped into a nozzle region. The PPT has an igniter fitted through an opening in the cathode, wherein when the igniter is pulsed, the igniter is configured to expel electrons toward the anode region to ignite a primary high current, high magnetic field discharge between the anode and cathode thereby creating a plasma that vaporizes the fiber propellant at the anode exit end. And wherein the vaporizing fiber propellant combines with the high current discharge to create a partially or fully ionized plasma electromagnetically and electrothermally accelerated outward from the nozzle region to produce the predominantly $\vec{j} \times \vec{B} \vec{j} \times \vec{B}$ thrust. In addition, as the fiber propellant vaporizes, the stepper motor feeds more fiber propellant from the spool to the exit end.

In other embodiments, the capacitor bank may include a plurality of low mass multi-layer ceramic capacitors formed in a parallel configuration to increase capacitance while maintaining low equivalent series resistance.

The PPT may also utilize a plurality of low mass multi-layer ceramic capacitors mounted in a parallel configuration to a plate that is electrically connected to the anode. In addition, the plate may have a centered aperture sized to receive and mount to the anode. In yet other embodiments, the plate may be circular, and the plurality of ceramic capacitors are arranged in concentric rings around the centered aperture; or alternatively, the plate may be a quadrilateral shape, and the plurality of ceramic capacitors are arranged around the centered aperture.

It is also possible to mount the plurality of ceramic capacitors on both sides of the plate. Conversely, the plurality of ceramic capacitors may be mounted on both sides of multiple plates.

In this embodiment the propellant fiber is made of polytetrafluoroethylene (Teflon™).

In other embodiments, the PPT could include more than one igniter. Each igniter being fitted through a corresponding opening in the cathode. The igniters could then be operated preferably sequentially.

In another embodiment, there is provided a PPT that includes a fiber propellant feed system. The fiber propellant feed system includes a motor configured to pull a fiber propellant from a spool and feed the fiber propellant into a centrally located anode and towards an exit end defined at an end of the anode. The PPT includes a capacitor bank having a back plate electrically connected to the anode. The capacitor bank has a plurality of low mass multi-layer ceramic capacitors formed in a parallel configuration. The back plate would further include an opening to receive the anode. A cathode is insulated from the anode and is connected to the capacitor bank. One or more igniters is provided and fitted through a corresponding opening in the cathode. When the one or more igniters are triggered, each igniter is configured to expel electrons toward the anode region to ignite a primary high energy discharge between the anode and cathode thereby creating a plasma that vaporizes the fiber propellant at the exit end, and wherein the vaporizing fiber propellant combines with the high current discharge to create a dissociated partially or fully ionized plasma electromagnetically and electrothermally accelerated outward from the discharge to produce a predominantly $\vec{j} \times \vec{B} \vec{j} \times \vec{B}$ thrust, and wherein as the fiber propellant vaporizes, the motor feeds more fiber propellant from the spool to the exit end.

The PPT of this embodiment may further include a power processing unit electrically connected to the capacitor bank. In addition, the capacitor bank may be further configured to lower its equivalent series resistance to cause an increase in a discharge current and an increase in the $\vec{j} \times \vec{B} \vec{j} \times \vec{B}$ thrust. In yet other aspects of this embodiment, an insulated tube can be configured between the motor and the anode and further configured to communicate the fiber propellant from the motor to the anode. In addition, the cathode is secured to an insulator positioned about an exit end of the anode.

The capacitor bank in this embodiment may be configured in a circular shape such that the plurality of low mass multi-layer ceramic capacitors is configured in concentric rings around a centered aperture sized to receive the centrally located anode.

As noted herein, the present invention is also directed to a uniquely created capacitor bank module capable of being configured for various uses and used in connection with other capacitor bank modules. In one embodiment there is provided a capacitor bank module that has (a) an anode-bank plate and a first cathode-bank plate; (b) a first plurality of multi-layer ceramic capacitors mounted to a front side on the anode-bank plate and connected to each other in a parallel configuration, and wherein the front side faces the first cathode-bank plate; (c) an opening defined through both the anode-bank plate and the first cathode-bank plate; and (d) an anode positioned through the openings in both the anode-bank plate and the first cathode-bank plate, wherein the anode is electrically connected to the anode-bank plate and insulated from the first cathode-bank plate by an insulator, and wherein the anode has a predetermined length such that a portion of the anode extends from the first cathode-bank plate.

The capacitor bank module may have the insulator fitted in the opening of the cathode-bank plate such that the anode is prevented from charging the first cathode-bank plate. In addition, the anode may be further configured to have a bore there-through to receive and expel a propellant. In various configurations, the anode-bank plate may be circular, and the plurality of ceramic capacitors are stacked in concentric rings around the opening in the center of the anode-bank plate. Alternatively, the anode-bank plate may be a quadrilateral shape, and the plurality of ceramic capacitors are stacked around the opening in the anode-bank plate.

The capacitor bank module may also include a second cathode-bank plate being positioned to sandwich the anode-bank plate between the second cathode-bank plate and the first cathode-bank plate, and the second cathode-bank plate having an opening. In this configuration a second insulator is positioned in the opening of the second cathode-bank to insulate the second cathode-bank plate when the anode is positioned through the opening of the second cathode-bank plate. A second plurality of multi-layer ceramic capacitors would then be mounted to a back side on the anode-bank plate that, and wherein the back side faces the second cathode-bank plate.

As noted, a second capacitor bank module may be similarly configured and be connected in a parallel configuration to a first capacitor bank module. In this configuration, an anode extension is positioned between the first and second capacitor bank modules to electrically connect the capacitor bank modules to each other.

In yet another embodiment of the present invention, a PPT circuit can be provided. The PPT circuit can be configured as a dedicated microprocessor on the pulsed plasma thruster. The microprocessor having programming instructions to control the following: (a) a motor to feed fiber propellant from a spool into a centrality located anode towards an exit end defined at an end of the anode; (b) a capacitor bank having a plate electrically connected to the anode, the capacitor bank having a plurality of low mass and low volume multi-layer ceramic capacitors formed in a parallel configuration, and wherein the plate includes an opening to receive the anode; and (c) one or more igniters, each igniter fitted through a corresponding opening in a cathode insulated from the anode and connected to the capacitor bank, wherein when the one or more igniters are triggered, each igniter is configured to expel electrons towards the anode region to ignite a primary high current discharge between the anode and cathode thereby creating a plasma that vaporizes the fiber propellant at the exit end, and wherein the vaporizing fiber propellant combines with the high current discharge to create a partially or fully ionized plasma electromagnetically and electrothermally accelerated outward from the discharge to produce a predominantly $\vec{j} \times \vec{B} \vec{j} \times \vec{B}$ thrust, and wherein as the fiber propellant vaporizes, the dedicated microprocessor further controls the feed of more fiber propellant from the spool to the exit end such that a conical end tip is formed on the end of the fiber propellant exposed in the cathode, and wherein the conical end tip being shaped by sublimation caused by the primary high current discharge, and wherein a height of the conical end tip is a function of a rate the propellant is fed to the exit end and the energy of the high current discharge.

In yet other aspects of the invention, various embodiments are outlined to a coaxial carbon igniter that can be used with a pulsed plasma thruster. The igniter would have a stainless-steel center electrode or other common electrode material, a ceramic insulator surrounding the stainless-steel center electrode, and an electrically conducting sleeve surrounding the ceramic insulator. The stainless-steel center electrode lacks a semiconductor layer over the insulator since during operation with a carbon-containing propellant or fuel, firing the igniter produces a carbon layer over the insulator thereby being configured to regenerate for subsequent firing.

As provided herein, there are also various methods utilized to create a pulsed plasma thruster. One particular method involves the steps of providing a centered cylindrical anode electrically connected to a capacitor bank; connecting a cathode to a capacitor bank; feeding a fiber propellant by a controlled motor from a spool through the centered cylindrical anode to an entrance opening in the cathode; providing a plurality of low mass ceramic capacitors formed in a parallel configuration to define the capacitor bank, and electrically connecting the capacitor bank to the anode and to the cathode and to the power processing unit, and further configuring the capacitor back with an opening such that the centered cylindrical anode is received through the capacitor bank; producing thrust by expelling electrons into the cathode towards the anode to ignite a primary high current, high magnetic field discharge between the anode and the cathode creating a plasma vaporizing the fiber propellant at the entrance opening such that the vaporizing fiber propellant combines with the high current discharge to create a partially or fully ionized plasma electromagnetically and electrothermally accelerated outward from the primary high energy discharge; controlling the motor to feed fiber propellant from the spool as the fiber propellant vaporizes such that the control of the fiber propellant continuously forms a conical end tip on an end of the fiber propellant protruding from the tubular anode and exposed inside the cathode region, and wherein the conical end tip being shaped by sublimation caused by the primary high current discharge, and wherein a length of the conical end tip being a function of a rate the propellant is fed to the exit end.

As noted, the coaxial Fiber-fed Pulsed Plasma Thruster (FPPT) for small spacecraft can enable high impulse primary propulsion missions by the combination of a user-controlled PTFE (Teflon™) fiber feed system employing a different propellant j×B topology from that of classic PPT configurations, regenerative-carbon igniters, and low specific mass ceramic capacitors. A major enhancement of the FPPT technology is the ability to control both the propellant feed rate and the pulse energy, thereby providing control of both specific impulse and thrust.

Thrust vectoring/steering with the FPPT system has emerged as a highly desirable capability for the purposes of spacecraft attitude control and for desaturating attitude control reaction wheels, particularly for deep space missions where a spacecraft is beyond Earth's electromagnetic field so that magnetic torque rods or coils can no longer be used for wheel desaturation. Potential users of the FPPT technology have indicated that the vectoring/steering capability is of critical importance for certain missions (especially deep space), and as a result possible options were explored. The descriptions below comprise three improvements to the FPPT: (i) two methods for thrust vectoring, including roll control, for thrust steering or reaction wheel desaturation; (ii) two methods to improve FPPT central anode performance by reducing resistive impedance; and (iii) methods for cathode masking to increase thrust and efficiency.

FPPT Thrust Vectoring

The FPPT produces thrust through the interaction of a pulse current of tens of kiloamperes with the azimuthal magnetic field self-generated by that current. FPPT thrust vectoring for control of pitch, yaw and roll, and the desaturation of reaction wheels, is achieved in two ways: a) distortion of the azimuthal symmetry of the plasma current to produce a thrust component that is normal to the thruster axis of symmetry; or b) selective introduction of axial magnetic field ($B_z$) patterns to create $j_rB_z$ force components normal to the thruster axis.

Multi-Cathode Thrust Vectoring

Figure 34:
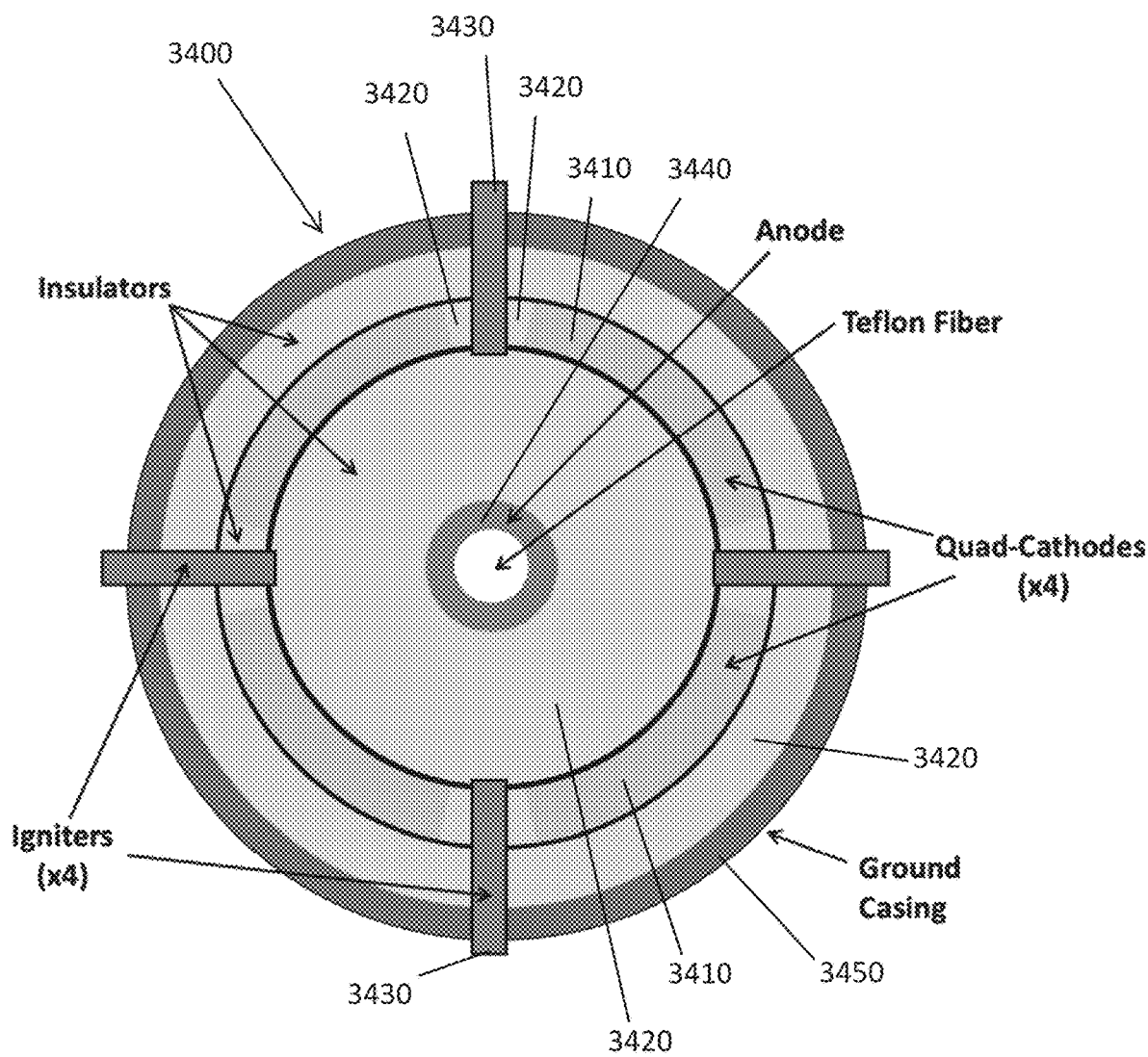
FIG. 34 is a Quad-Cathode Vectoring approach using four segmented cathodes to control which cathodes fire and deflect the j×B vector off-axis.
Figure 35:
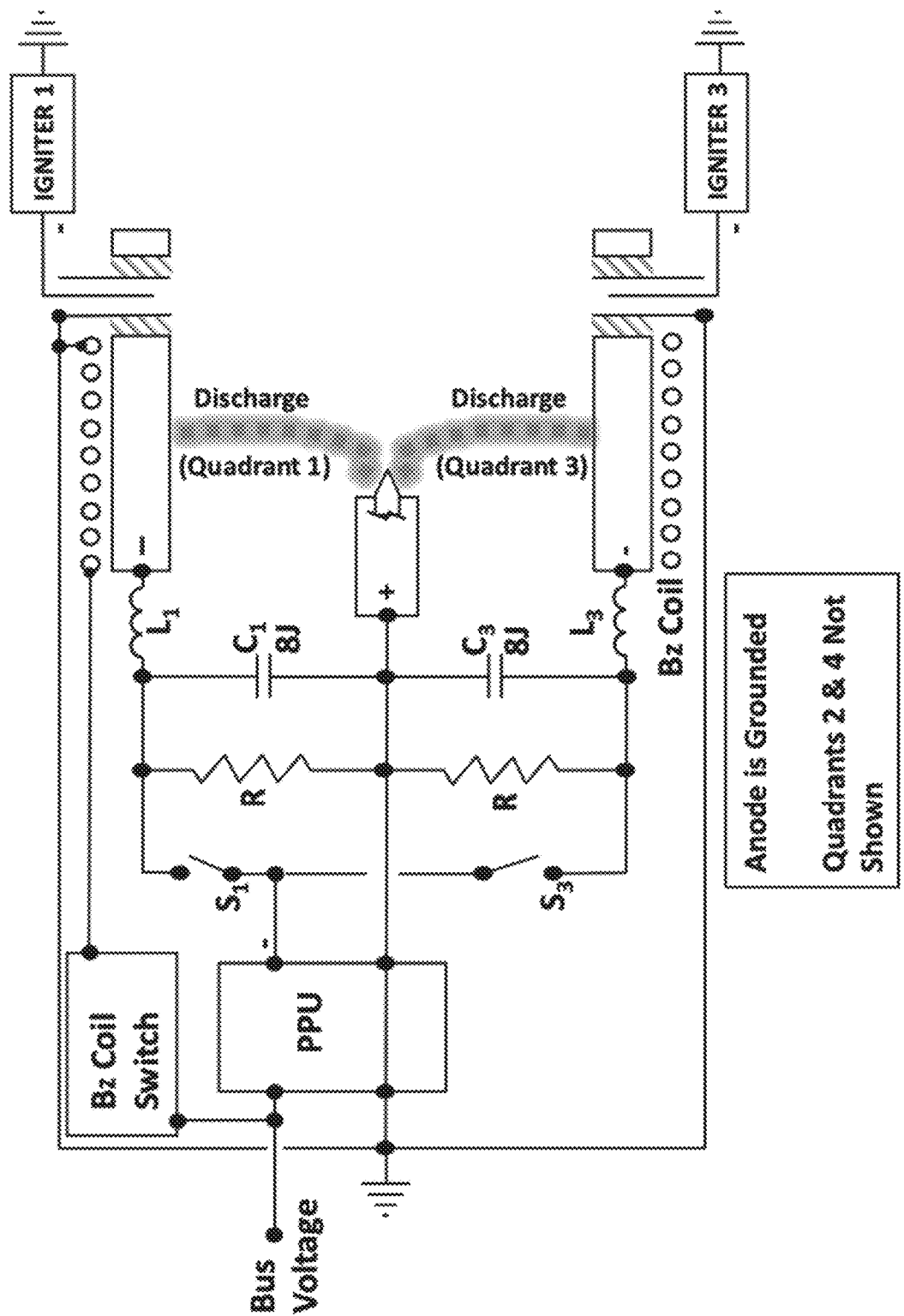
FIG. 35 is a Quad Cathode circuit schematic for quadrants 1 and 3 with a $B_z$ coil for roll control.

Multi-Cathode Vectoring creates spacecraft pitch, yaw and roll control with a segmented cathode supplemented by an auxiliary low power $B_z$ field circuit. Off-axis thrust produces pitch and yaw from the azimuthal asymmetry achieved by distorting the primary azimuthally-symmetric $B_\theta$ field, as was discovered at the University of Illinois at Urbana-Champaign (UIUC) with the coaxial PPT-4 thruster. A Quad-Cathode vectoring approach achieves this distortion by segmenting the FPPT cathode into 4 quadrants, FIG. 34, and providing a separate capacitor bank and charging switch for each quadrant. FIG. 35 illustrates a Quad Cathode circuit schematic for quadrants 1 and 3 with a $B_z$ coil for roll control. The FPPT is grounded to the anode, and the igniters are insulated from the cathode. The safety resistor R time constant is 20-40 seconds. The $B_z$ field is 0.064 Tesla and the coil duty cycle is 0.0001. An alternative circuit (not shown) uses 1 charging PPU for each Quad controlled by a low voltage switch. The pulse is initiated in one of the quadrants by firing the quadrant's associated igniter plug. For full symmetric thrust 4 quadrants are fired, but for vectoring operation, firing only 1, 2, or 3 quadrants creates an asymmetric current and j×B pattern, and the resulting j×B vector is deflected off-axis to produce thrust vectoring. Quad-Cathode Vectoring also achieves roll control from a $B_z$ coil surrounding the cathode to create a $(j \times B)_\theta$ torque. Quad-Cathode Vectoring requires 4 independent primary circuits and 1 coil circuit.

The FPPT with Quad Cathode can be used on spacecraft to desaturate onboard reaction wheels. The Quad Cathode is used directly for pitch and yaw desaturation, and also provides roll desaturation with the applied $B_z$ solenoid coil.

The operating principle of the Quad Cathode was first observed on an electrothermal coaxial PPT, where it was discovered that the azimuthal magnetic field $B_\theta$, and therefore the $j \times B_\theta$ force vector, could be distorted in the radial direction, thereby deflecting the axial thrust vector away from the axis. By doing so, the $j \times B$ force can induce a torque about the spacecraft center of gravity (CG) allowing desaturation of pitch and yaw reaction wheels.

Figure 36:
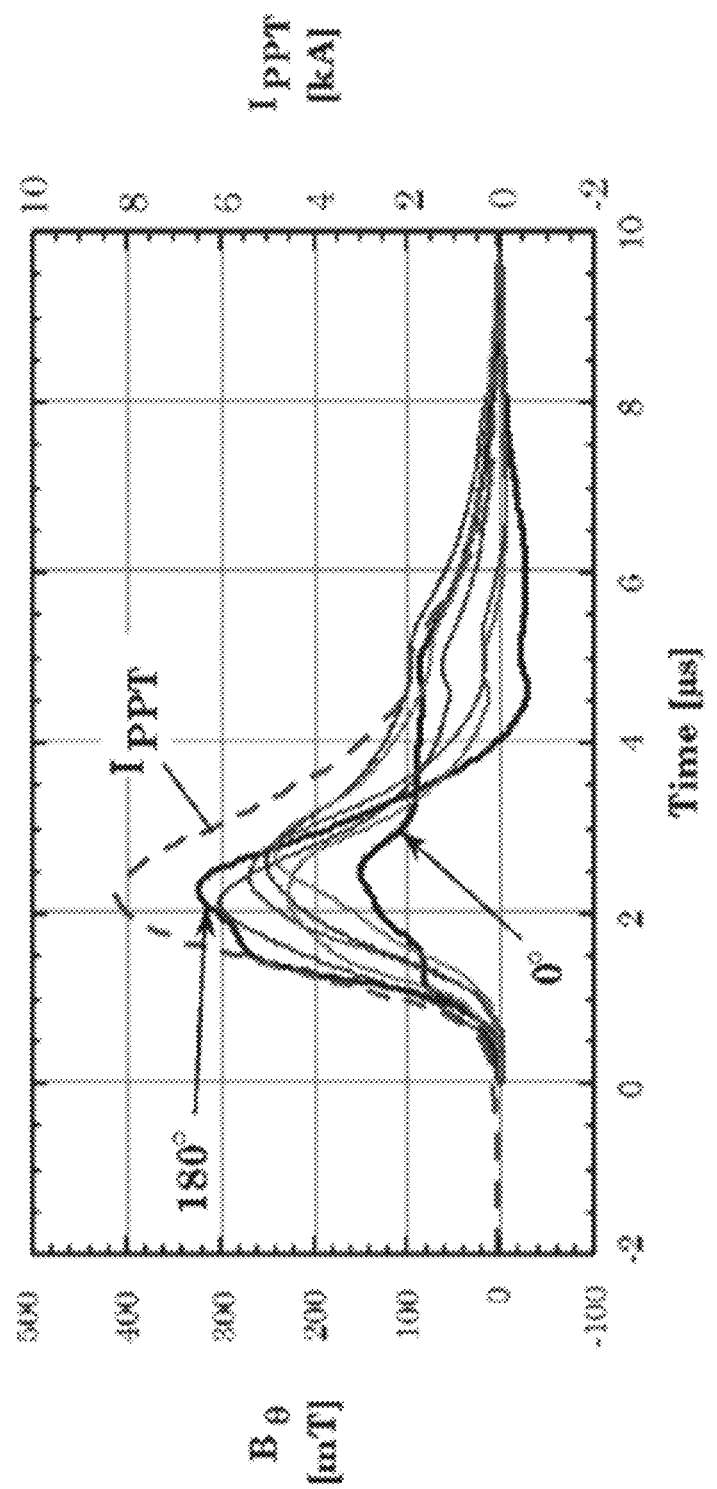
FIG. 36 is a distortion of $B_\theta$ field in a coaxial PPT, deflecting the $j_r B_\theta$ thrust vector.

The distortion of the $B_\theta$ field in a coaxial PPT is shown in FIG. 36. In this case, the field distortion was caused by the off-axis location of the igniter plug. For the FPPT, which has at least one off-axis igniter in the cathode, precision thrust stand measurements showed that off-axis thrust was too small to measure, implying minimal $j \times B_\theta$ field distortion caused by the off-axis igniter.

The Quad-Cathode version of the FPPT intentionally creates a strong distortion of $B_\theta$ by segmenting the cathode radially and supplying each quadrant with a separate capacitor bank, HV charger and igniter. A four-pole switch allows 1, 2, 3 or 4 quadrants to be charged and fired, although only a single igniter is required to fire multiple quadrants.

Several modifications to the standard FPPT circuit are required for a Quad Cathode 3400 operation. The segmented cathode 3410 requires insulating segments 3420 between quadrants. These insulating segments 3420 also provide locations for igniters 3430. The cathode can no longer serve as bus ground, so the central anode 3440 is grounded. The single capacitor bank is divided into four separate equally sized banks, each with a separate charging circuit. An outer shield 3450 is connected to ground to provide safety protection against the high voltage cathode quadrants. Four independent charging switches are required to select which quadrants to fire. These four switches are shown on the high voltage side of the single PPU in FIG. 35. Alternatively, four switches can be provided on the bus voltage side connected to 4 separate charging PPUs. The igniter plugs 3430 are connected to the outer grounded shield 3432 and insulated 3420 by the high voltage cathode quadrant insulators. Four safety resistors R are connected across the four capacitor banks, with a typical RC decay time of 20-40 seconds. A $B_z$ solenoid coil, with a typical current of 100 amperes, is located inside the outer shield to provide an axial magnetic field throughout the discharge control for roll control or roll reaction wheel desaturation. Note that the radial insulators between cathode segments disrupt eddy currents and allow the $B_z$ field to penetrate the discharge volume. This low power solenoid coil is switched on several tens of microseconds before each pulse, with a typical power-saving duty cycle of 0.0001.

In a typical application, a nanosatellite (such as a CubeSat) with Quad-Cathode FPPT employs 3 reaction wheels for pitch, yaw and roll control, each wheel having a maximum stored angular momentum of 0.011 N-m-s. The Quad-Cathode FPPT has four equal capacitor banks, each storing 8 joules of energy, fired at a rate of 2 Hz. The solenoid coil produces an axial $B_z$ field from 100 amperes coil current of 0.064 Tesla and desaturates the roll reaction wheel in 50,000 pulses or 7 hours. The quad cathodes, fired in pairs at 16 joules per pulse, deflect the thrust vector to create a 5 mm long lever arm about the spacecraft center of gravity and desaturate a pitch or yaw reaction wheel in 18,000 pulses, or 2.5 hours.

Roll: To achieve roll desaturation all quad cathodes are used (32 J), and a $B_z$ coil is energized during the primary current pulse. A typical $B_z$ coil, protected by a grounded outer aluminum shroud, is 25 turns of 14 gauge (1.63 mm) insulated copper wire with a coil ID of 3 cm, coil length of 5 cm and wire length of 2.4 m. The calculated resistance is 20 mΩ, the wire mass is 45 grams and the calculated internal $B_z$ field is 0.064 Tesla at a coil current of 100 amperes. Assuming a coil duty cycle of 0.0001 (50 μs coil pulse at 2 Hz), average coil power consumption is 0.02 W.

The roll torque created from the azimuthal component of $j \times B$ force $(j_r B_z)$ is found by integrating torque from the discharge anode radius $r_a$ to the outer radius $r_c$. We assume a non-reversing current pulse, so that $\int I dt = CVo = 0.080$ coulombs. The instantaneous torque in a tube of plasma of radius r and thickness dr is $dT = IB_z r dr$, and integrating from anode to cathode and over the time of the pulse gives:

$$T_{bit} = (0.5)(CVo)Bz(r_c^2 - r_a^2) \text{ N-m-s/pulse}$$

The calculated value of $T_{bit}$ for the values given above is 2.2e-7 N-m-s/pulse. The total number of pulses to desaturate roll in the Mag-Gyro AD is then 50,000 pulses, or 7 hours at 2 Hz. Note that roll disturbance torques on a spacecraft are typically smaller than pitch and yaw disturbances, so that roll desaturation could be accomplished during normal thrusting operations.

Proper experimental implementation of the quad-cathode concept will require modifications to existing hardware and electronics before the viability of the approach can be thoroughly investigated.

Multi-Coil Thrust Vectoring

Multi-Coil Vectoring is distinguished from Multi-Cathode Vectoring in that, instead of using the thruster self-magnetic field, Multi-Coil Vectoring uses applied magnetic fields from multiple auxiliary solenoid coils located in the FPPT insulator. Because the FPPT thrust is predominantly electromagnetic (EM), thrust vectoring is achieved by deflecting the $\vec{j} \times \vec{B}$ force vector off-axis to achieve pitch and yaw control, and by creating a swirl flow in the exhaust with a $(j_r B_z)_\theta$ force to provide roll control torque.

Figure 37:
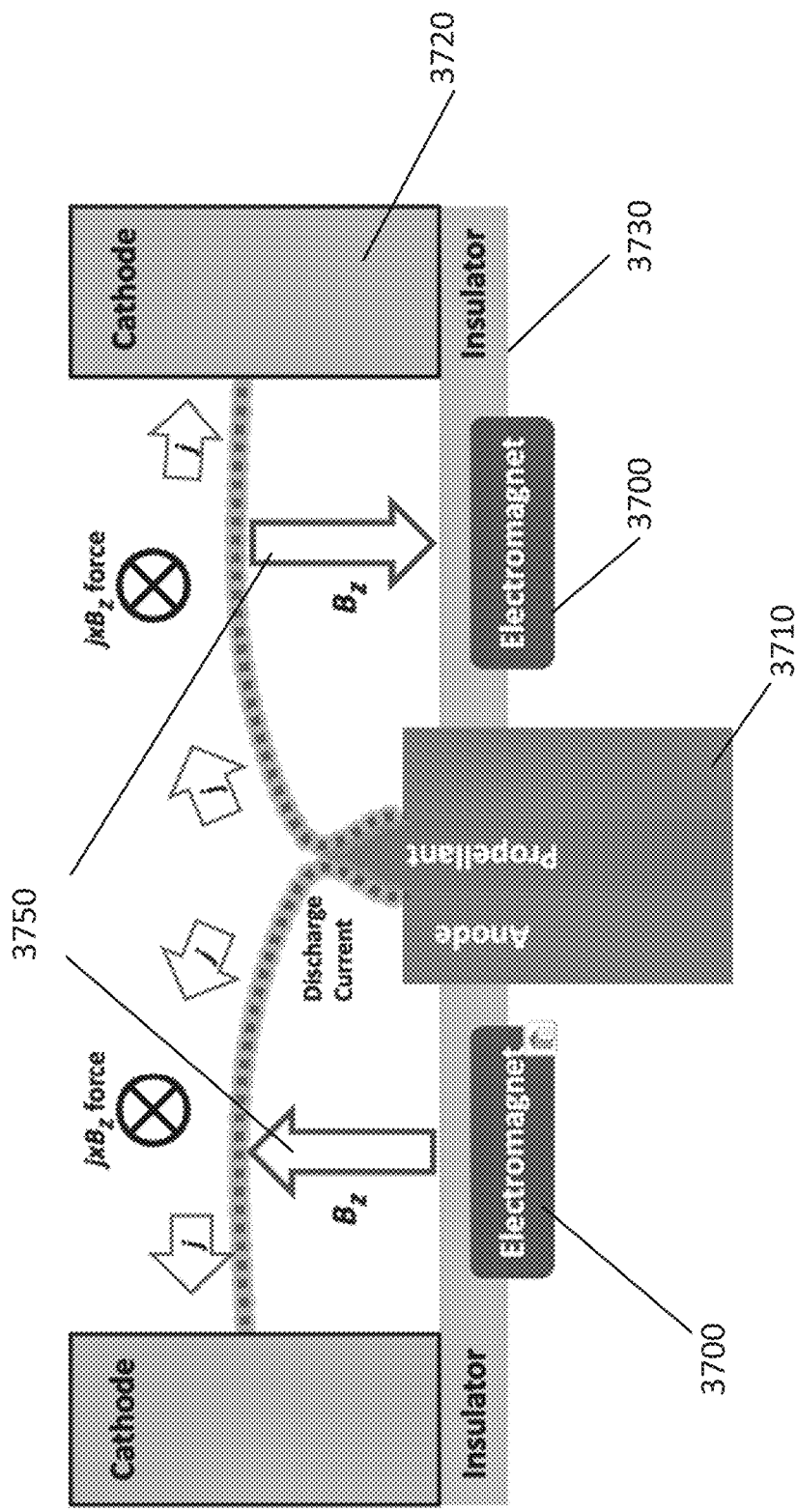
FIG. 37 is a schematic of an electromagnetic Quad-Coil Vectoring approach using EM coils to induce pitch or yaw depending on the directions of current flow through the coils and the corresponding induced B-field.
Figure 38:
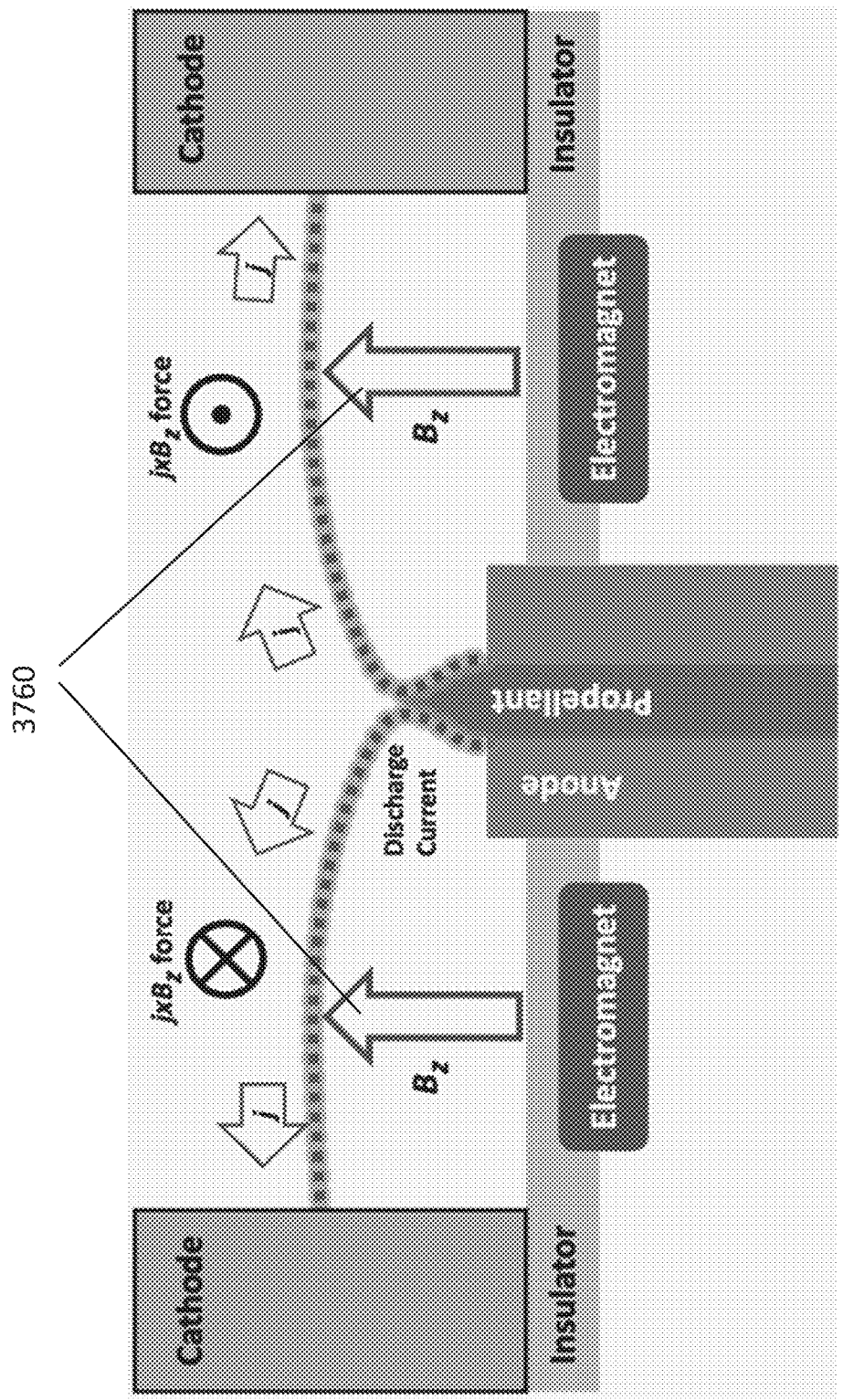
FIG. 38 is a schematic of an Electromagnetic Quad-Coil Vectoring approach using 2 or 4 EM coils to induce roll by controlling the directions of the current flow through the coils and the corresponding induced B-field.

In FIG. 37, Quad-Coil Vectoring is implemented by imbedding four independently-controlled and reversible $B_z$ electromagnets 3700, radially positioned between the anode 3710 and cathode 3720 and insulated 3730 from the discharge. The coil material, size and location are optimized to maximize the magnetic $B_z$ field volume in the discharge region. These fields couple selectively with the radial thruster plasma discharge current to provide off-axis thrust in order to provide positive or negative pitch or yaw motion 3750 to the spacecraft. If two opposite coils or all four coils are energized with matched polarity the $(j_r B_z)_\theta$ force imparts a rotational torque to the plasma flow to generate spacecraft roll 3760 (FIG. 38). Torque in the reverse direction is created by controlling the electromagnets to reverse the direction of the active coil $B_z$ fields.

Figure 39:
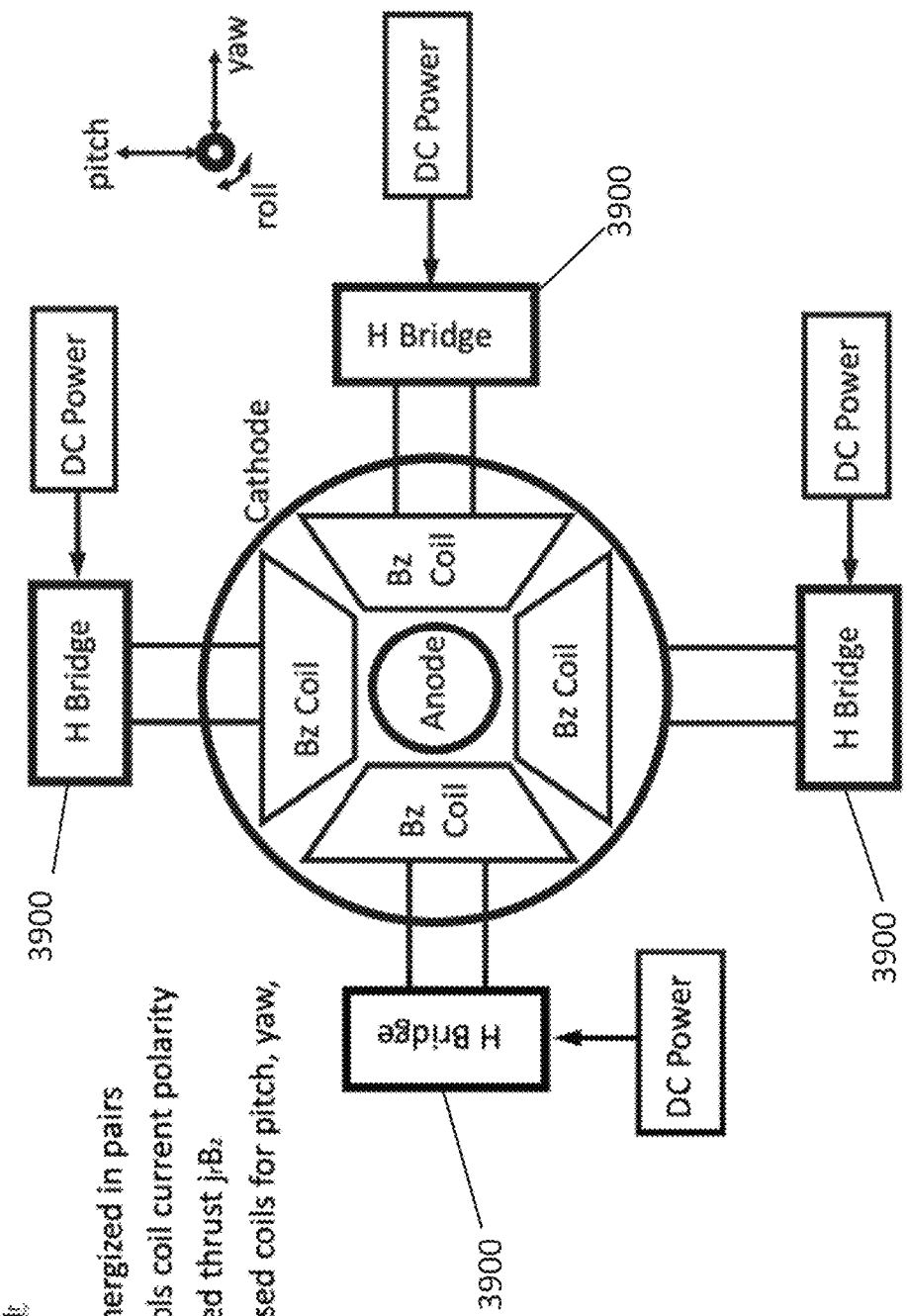
FIG. 39 is a schematic of a Quad Coil Thrust Vectoring with applied Bz field from a four-coil system to create $j_r B_z$ force components normal to the primary axial thrust vector.

The coil currents are supplied from a common supply, and each can be fed through an H-bridge MOSFET 3900 (FIG. 39). The function of each H-bridge is to reverse the coil current when desired and therefore the applied Bz field.

The self-induced azimuthal $(B_\theta)$ magnetic field near the anode from a 20 kA FPPT primary discharge is on the order of 0.25 Tesla. With Quad-Coil Vectoring, each EM coil is designed to produce a mean axial $(B_r)$ magnetic field in the primary discharge region of 0.05-0.10 Tesla. Because the FPPT is a pulsed device with a pulse duration of tens of microseconds and a pulse repetition rate of several Hertz, the duty cycle when a coil may be energized is $10^{-4}$--$10^{-5}$, minimizing power consumption and coil heating.

The applied $B_z$ field is perpendicular to the radial discharge current and provides a local azimuthal force $(j \times B)_\theta$ on the accelerating thruster plasma in addition to the primary $j_r B_\theta$ force. Two such coils located 180 degrees apart but with opposed $B_z$ fields then provide a net thrust perpendicular to the thruster axis. A total of four coils driven by positive or negative current provide both positive and negative pitch and yaw control. Two of the coils spaced 180 degrees apart, or all four coils having parallel matching +z or −z $B_z$ fields provide an azimuthal torque to initiate positive or negative roll. Quad-Coil Vectoring requires 1 primary discharge circuit-and 4 coil circuits.

Early Experimental Results Demonstrating Multi-Coil Thrust Vectoring

It is estimated that 0.05-0.10 Tesla field strength is required to alter the B-field enough to vector thrust. Kovar rods for core material were chosen for preliminary testing, as they have high relative permeability (~2000 depending on heat treatment). Furthermore, it is likely that they will be imbedded in the thruster insulator for a final design, and Kovar has favorable thermal expansion properties. The coil parameters are shown in Table 2 below.

TABLE 2

Electromagnet sizing.
Electromagnet Parameters

| | | |
|---|---|---|
| Core Material | Kovar | |
| Core Diameter | 0.25 | in |
| Core Length | 1 | in |
| Winding Gauge | 26 | AWG |
| Coil Turns | 300 | |
| Coil Resistance | 1 | Ohm |
| Coil Inductance | 1.2 | mH |

A fully operational system would have 4 of these coils, although for simulated testing only 2 were used for yaw axis vectoring. As the thruster has radial symmetry, the additional axis should function similarly if installed and tested. FIG. 37 shows the original diagram of the electromagnet locations and their assumed interactions on the thrust.

Figure 40:
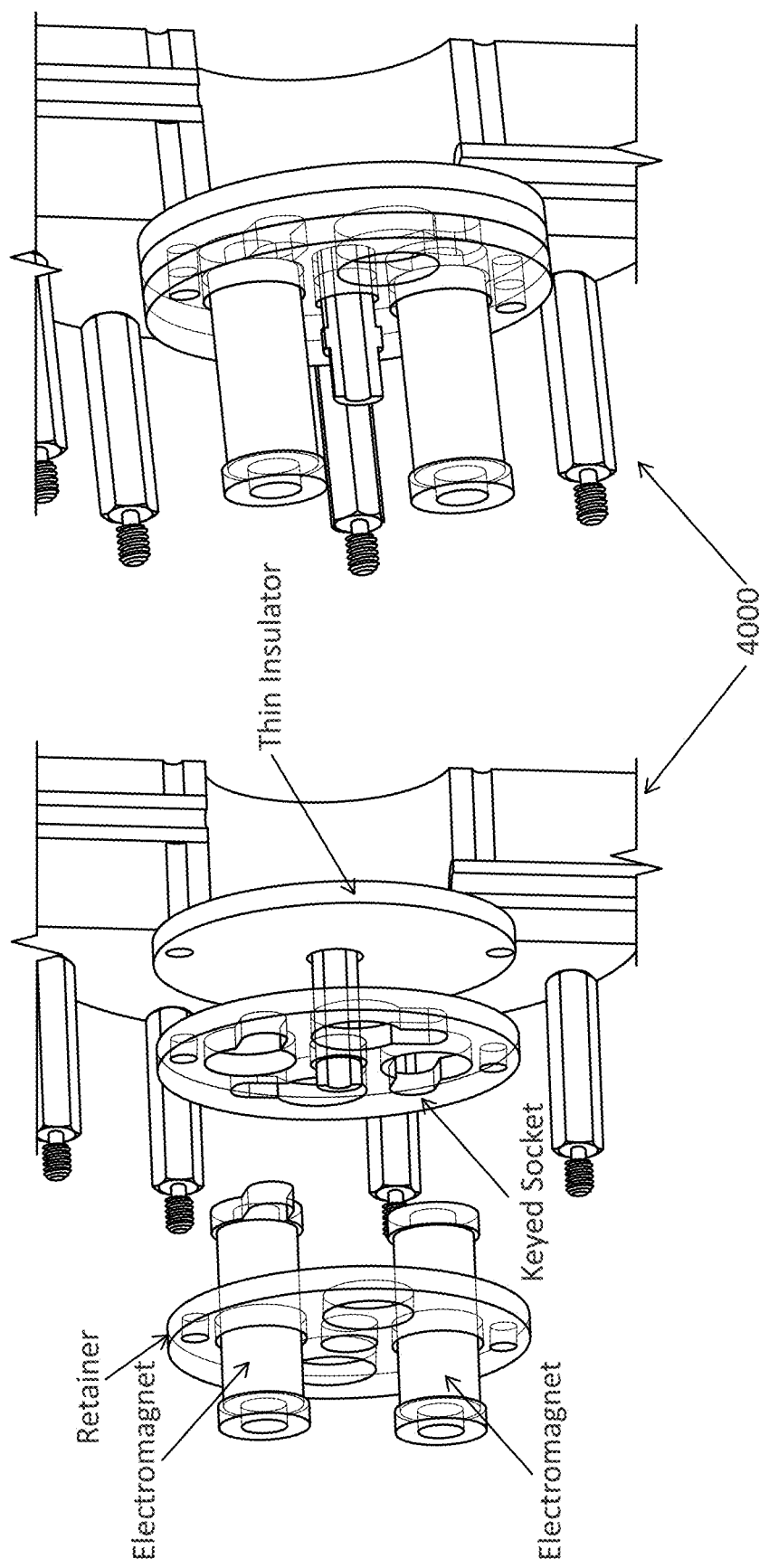
FIG. 40 is an Exploded view (left) and assembled view (right) of EM thrust vectoring configuration.

The modifications to a breadboard thruster 4000, including electromagnets and mounting scheme are shown in FIG. 40. A thinner insulator was used for this testing to decrease distance between the magnets and the main thruster discharge to mitigate the $1/x^3$ decay in electromagnetic field over distance. With 6 amps current, these magnets are capable of producing over 0.15 Tesla at their surface, decaying with distance. The magnets have Kovar cores and a keyed socket was developed to position them as close as possible to the thrust chamber (see FIG. 40). A slowly rising overdamped electromagnet current pulse with a pulse width of several hundred microseconds is supplied by the same switch circuit used to fire the igniters and is timed such that the peak current occurs at the same time as the thruster discharge.

Figure 41:
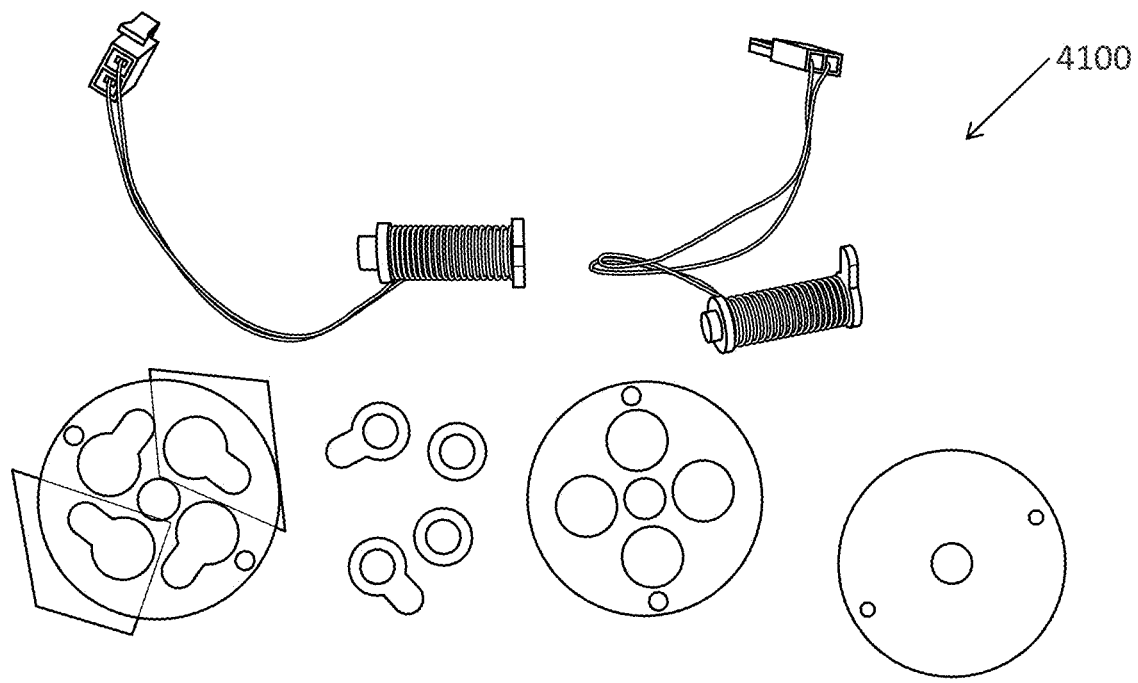
FIG. 41 is an illustration of components for EM quad coil thrust vectoring.
Figure 42:
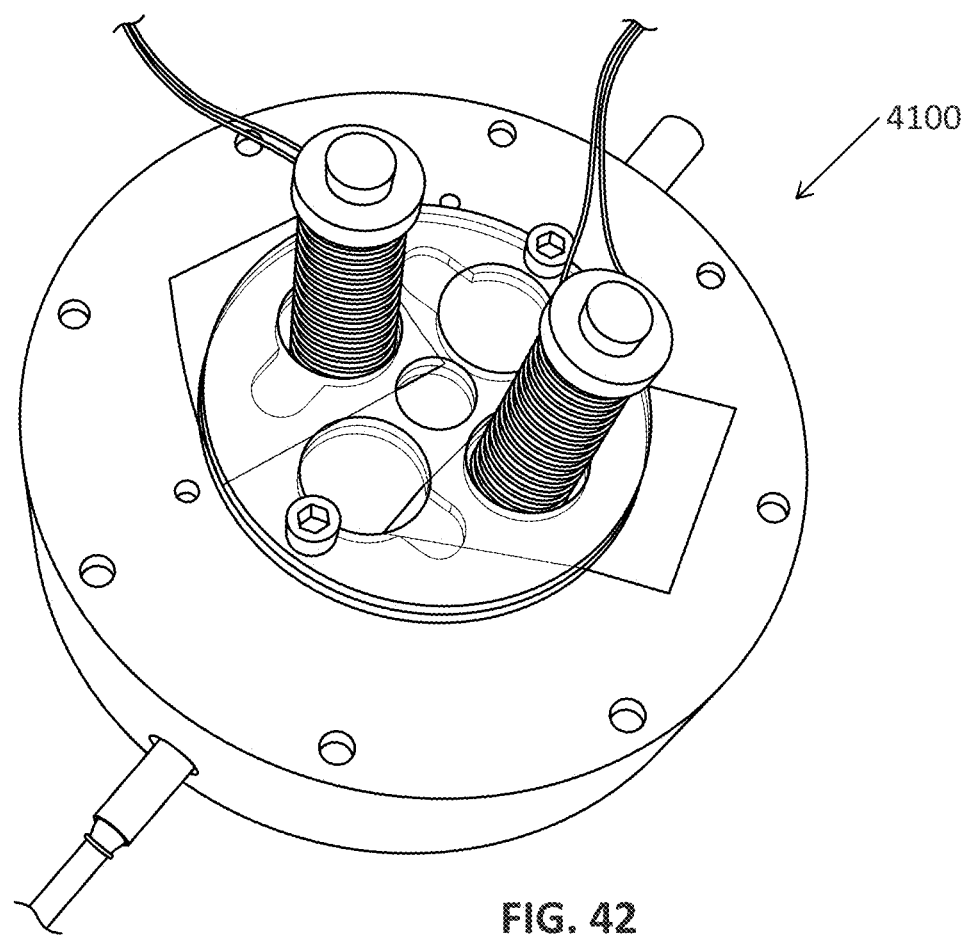
FIG. 42 is an illustration of the assembled unit with electromagnets installed.

With the electromagnets in a vertical plane as shown, thrust vectoring occurs in the horizontal plane and is measurable on the thrust stand. FIG. 41 shows the test hardware 4100 implemented, but disassembled, and FIG. 42 shows the back of the cathode with magnets installed, and a crossover, series connector in place. This allows a single supply to drive both coils in the directions favorable for yaw control. If the coils are connected to create parallel fields, roll would be produced, which cannot be measured on a conventional thrust stand.

To ensure enough field strength to vector the thrust, as well as minimize heating of the magnets, a pulsed system was implemented using the high-voltage switched igniter circuit. This allowed tens of joules to be discharged through the coils, limited by maximum voltage (1.2 kV). The pulse configuration is shown in Table 3 and can be compared to the energy in the main thruster discharge, Table 4.

TABLE 3

Thrust Vector Current
EM Vector Current Pulse

| | | |
|---|---|---|
| Total Capacitance | 89 | μF |
| Voltage | 300 | V |
| Total Energy | 4.0 | J |
| Energy Per Coil | 2.0 | J |
| Peak Current | 76 | A |
| Time to Peak Current | 264 | μs |

TABLE 4

Primary Thruster Current
EM Vector Current Pulse

| | | |
|---|---|---|
| Total Capacitance | 89 | μF |
| Voltage | 300 | V |
| Total Energy | 4.0 | J |
| Energy Per Coil | 2.0 | J |
| Peak Current | 76 | A |
| Time to Peak Current | 264 | μs |

Figure 43:
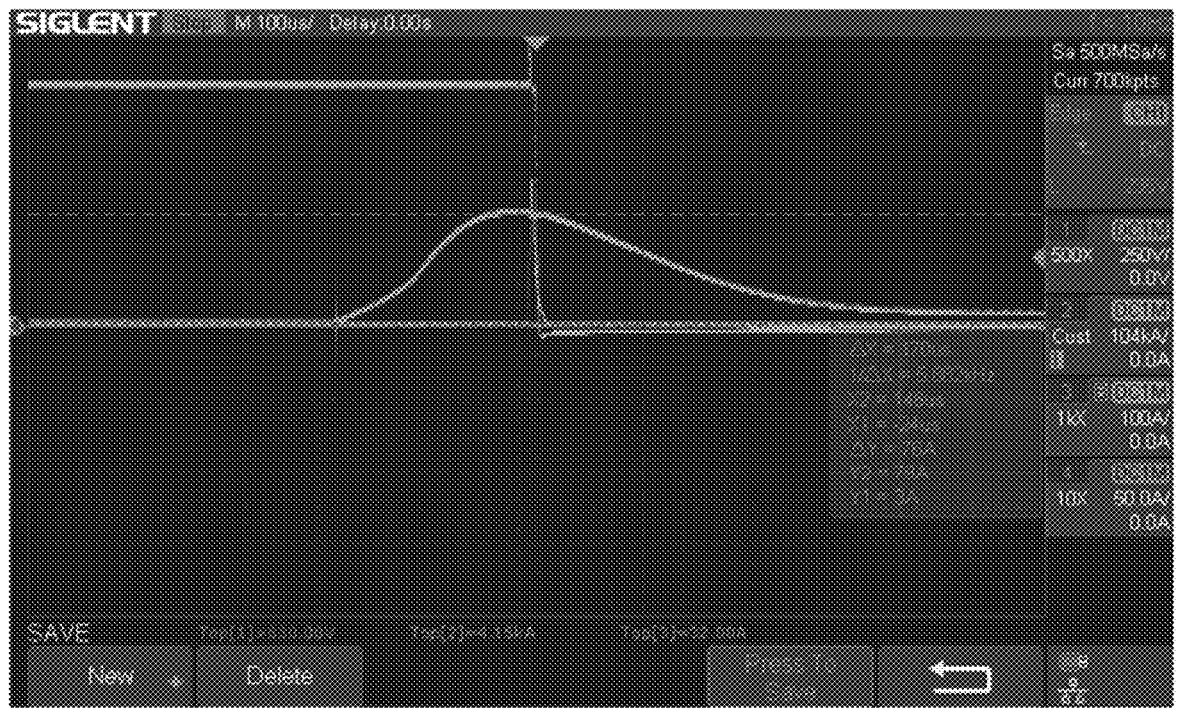
FIG. 43 is a chart showing Magnet Current (green) aligned with thruster firing. Yellow is thruster voltage and Cyan is igniter current.
Figure 44:
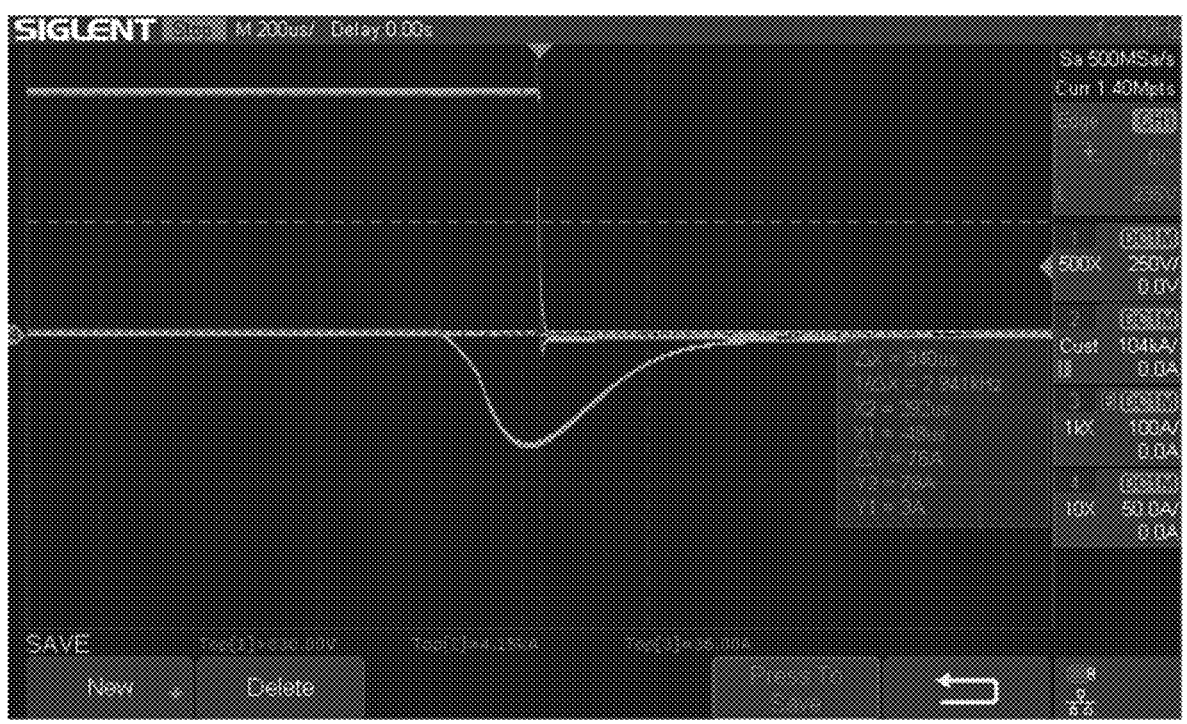
FIG. 44 is a chart showing Reversed electromagnet current.

The coil current pulse is timed to the thruster current pulse. Fortunately, the thruster fires within a few microseconds of the igniter firing, but peak magnet current occurs approximately 260 microseconds after firing. Thus, the thruster firing is delayed by the same 260 microseconds in order to encounter maximum B-field. FIG. 43 shows a scope trace of the timing system pulses; Magnet Current (green) aligned with thruster firing. Yellow is thruster voltage and Cyan is igniter current. FIG. 44 shows the same setup, but with magnet current reversed, vectoring in the opposite direction. The primary concern with this test series was generating enough $B_z$ field to show a noticeable change in thrust. By reducing the insulator thickness, fields of ~0.1 Tesla were measured against the cathode side of the insulator in line with the magnet with the thruster off.

Figure 45:
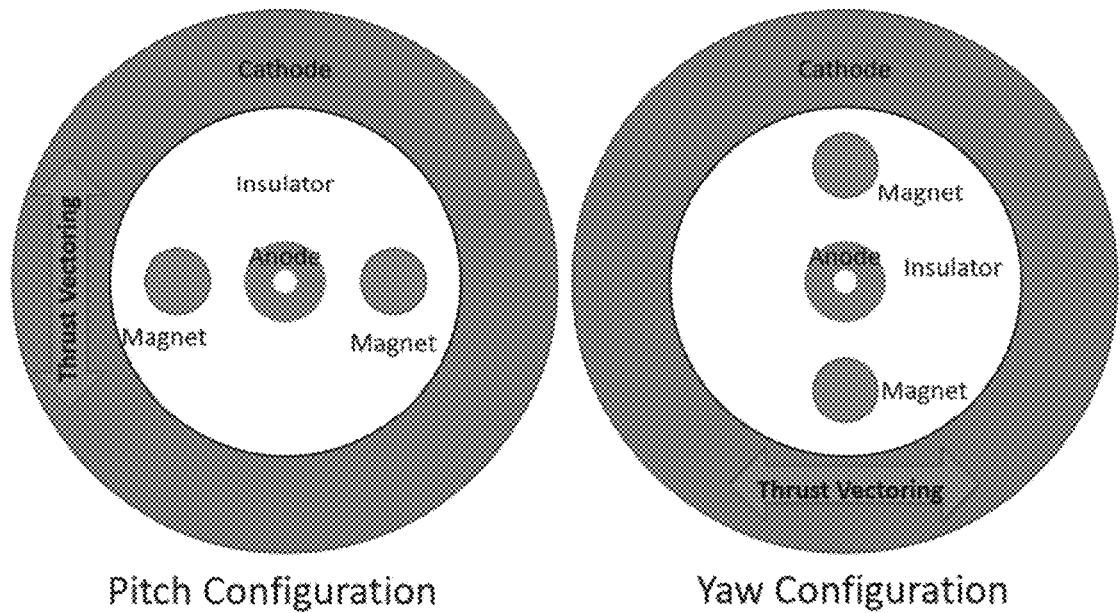
FIG. 45 is an illustration of the Orientation of two electromagnets and corresponding direction anticipated for thrust vectoring. Thrust stand motion is normal to the pitch vector and is parallel to the yaw vector.

Thrust vectoring was tested on a thrust stand with a horizontally-moving platform. FIG. 44 illustrates how the two electromagnets were positioned for the thrust stand measurements and the corresponding directions of pitch and yaw control. The thruster axis was aligned at 45 degrees to the thrust stand motion (FIG. 45). With the thruster in the plus or minus pitch configuration the detected thrust with pitch vectoring is reduced by $\cos(\beta)$, where $\beta$ is the angle of thrust deflection, inducing a small and similar effect for the two polarities. With the thruster in the plus or minus yaw configuration the thrust stands detects a thrust proportional to $\cos(45\pm\beta)$, an easily detectable variation on the thrust stand.

Figure 46:
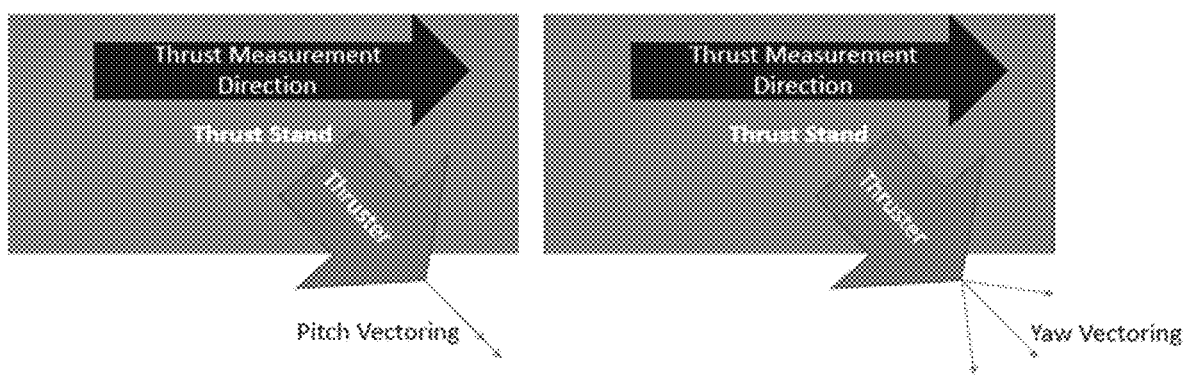
FIG. 46 is an illustration of a thruster positioned at 45-degrees to the thrust stand motion. Pitch vectoring slightly decreases the thrust measurement. Yaw vectoring significantly increases or decreases the thrust measurement depending on magnet polarity.
Figure 47:
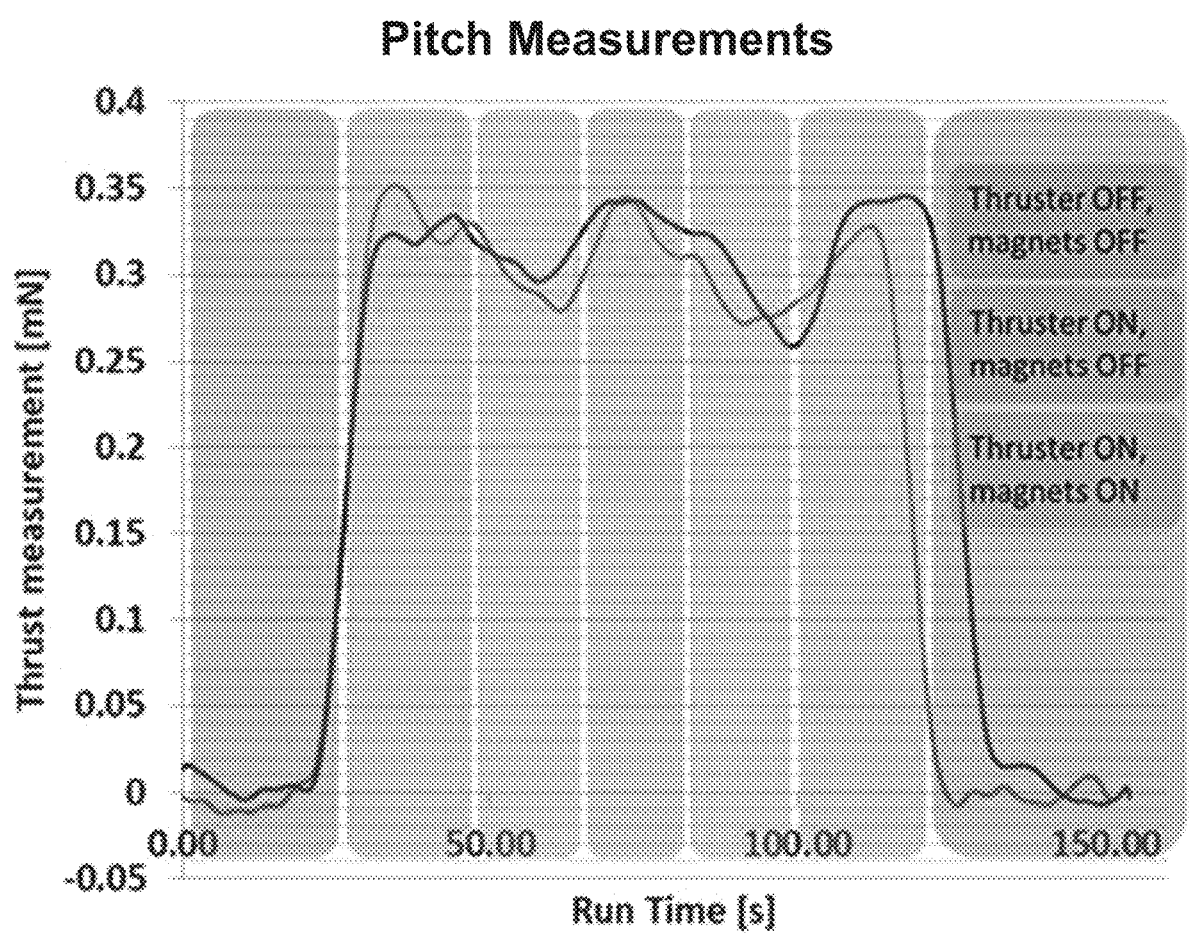
FIG. 47 is a chart showing Raw thrust stand results for pitch measurements.
Figure 48:
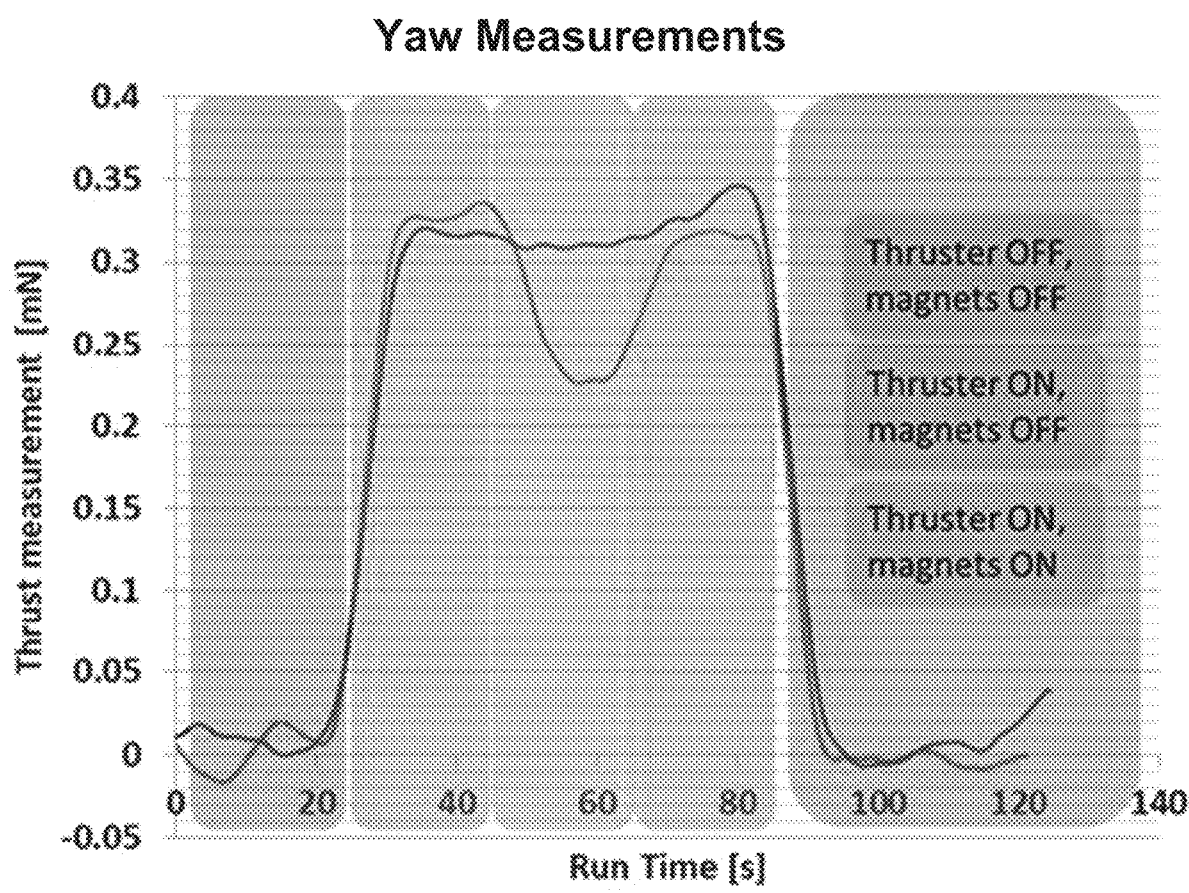
FIG. 48 is a chart showing Raw thrust stand results for yaw measurements.

FIGS. 47 and 48 show the measured thrust stand data of this system in operation for pitch and yaw. FIG. 47 showing Raw thrust stand results for pitch measurements, where the Thruster is mounted at 45 degrees on thrust stand (FIG. 46), as expected, the result would be equal, reduced thrust for both current directions when the magnets are enabled. And as expected, FIG. 47 shows small and approximately equal reductions in thrust when pitch is vectored up and down. When yaw is vectored, FIG. 48, And with the Thruster mounted at 45 degrees on thrust stand (FIG. 46), as expected, the result would be a decrease in thrust in forward current direction (red) and an increase in thrust with reverse current direction (black). As shown in FIG. 48, thrust was observed to be approximately constant in one direction, but drops significantly in the other direction. From this data, an estimated thrust deflection angle b can be calculated. The measurements are consistent if it is assumed that there is an approximately 15% total loss of thrust with the electromagnets turned on, and that the thrust vector angle is β≈10 degrees. This gives cos(b)=0.985, cos(45−b)=0.82 and cos(45+b)=0.57, accounting for the large polarity effect seen in FIG. 48, and the small variations shown for the pitch test configuration in FIG. 47. While more testing is planned at other mounting angles and at higher mean thrust rates in order to derive a more precise value for b, it is clear that the measured level of vectoring is sufficient to provide pitch and yaw control, and reaction wheel desaturation.

Roll torque, while not measured, can be estimated from the yaw measurements, and is estimated to be of the same order of magnitude when applied to reaction wheel desaturation.

These preliminary tests have demonstrated that there is sufficient field strength to deflect the thrust vector. Furthermore, reducing coil voltage from 300 to 200 V still produced a strong effect, and the capacitor configuration needed to supply sufficient charge at this voltage using flight-like capacitors is of identical size to the small bank used in the igniter circuits. Refinement of the electromagnets by increasing the mean $B_z$ in the interelectrode volume can fine tune the FPPT to provide vectoring of ±10° with fewer losses, and potentially less current pulse energy.

In order to verify that the previously measured vectoring was not deflecting plasma into the cathode walls, the test setup was modified to use a shorter cathode, thereby reducing cathode wall interference with the thrust vector. Furthermore, the thicker, standard insulator was used, which reduces B. The thruster was placed on the thrust stand at an approximate 45° angle as measured clockwise from the thrust stand's measurement axis. These tests were also run at a higher pulse rate of 4 Hz to reduce error. As seen in Table 5, an increase in thrust was detected when the electromagnets were turned on with current flow in the "reverse" direction, and a decrease in thrust was detected with current flow in the "forward" direction. In this test, the electromagnets are placed in the yaw configuration because this produces the most easily detectable change in thrust direction on the thrust stand.

Figure 49:
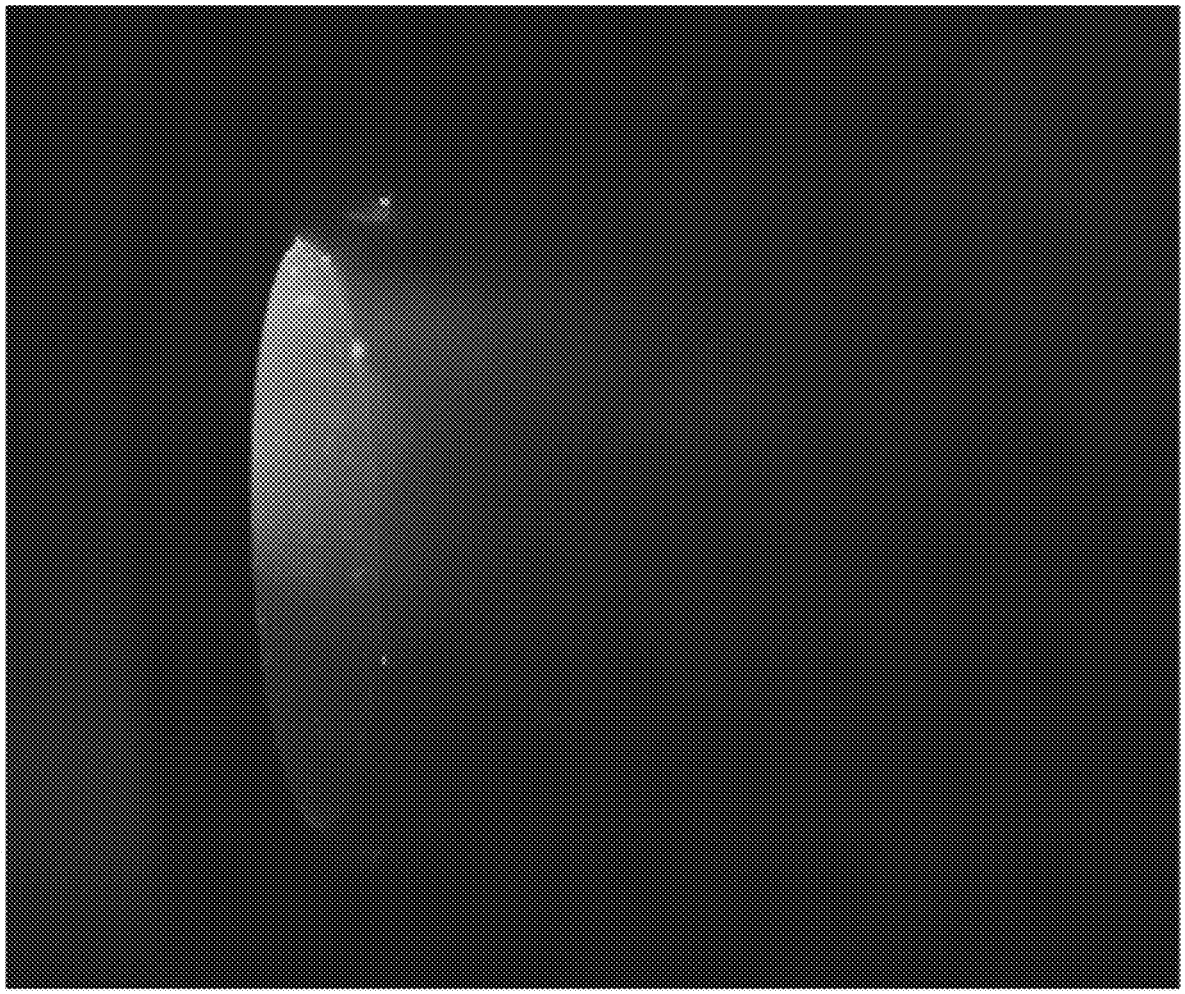
FIG. 49 is a photo of a Thruster firing with electromagnets turned on with current flow in the "forward" direction. Camera is looking down from above.
Figure 50:
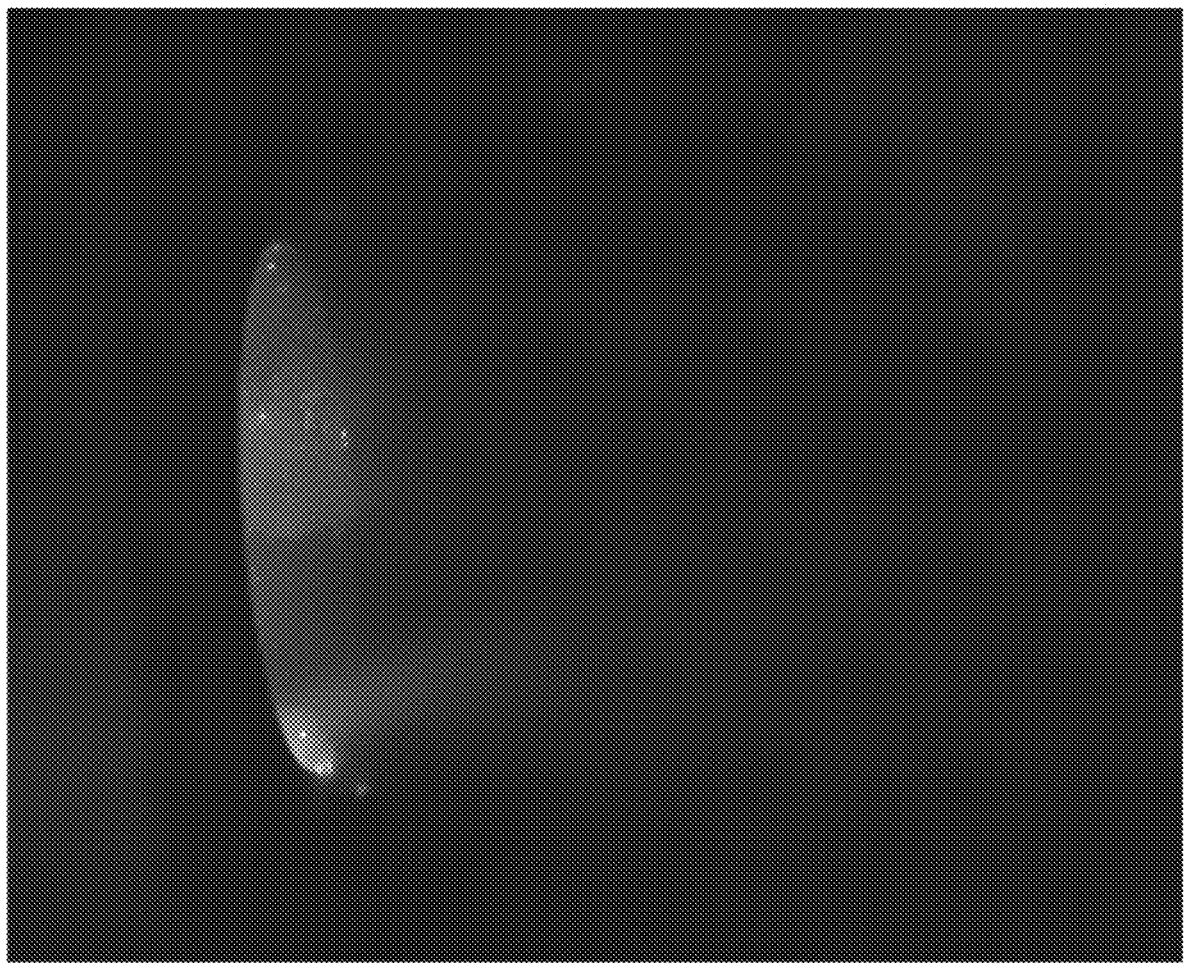
FIG. 50 is a photo of a Thruster firing with electromagnets turned on with current flow in the "reverse" direction. Camera is looking down from above.
Figure 51:
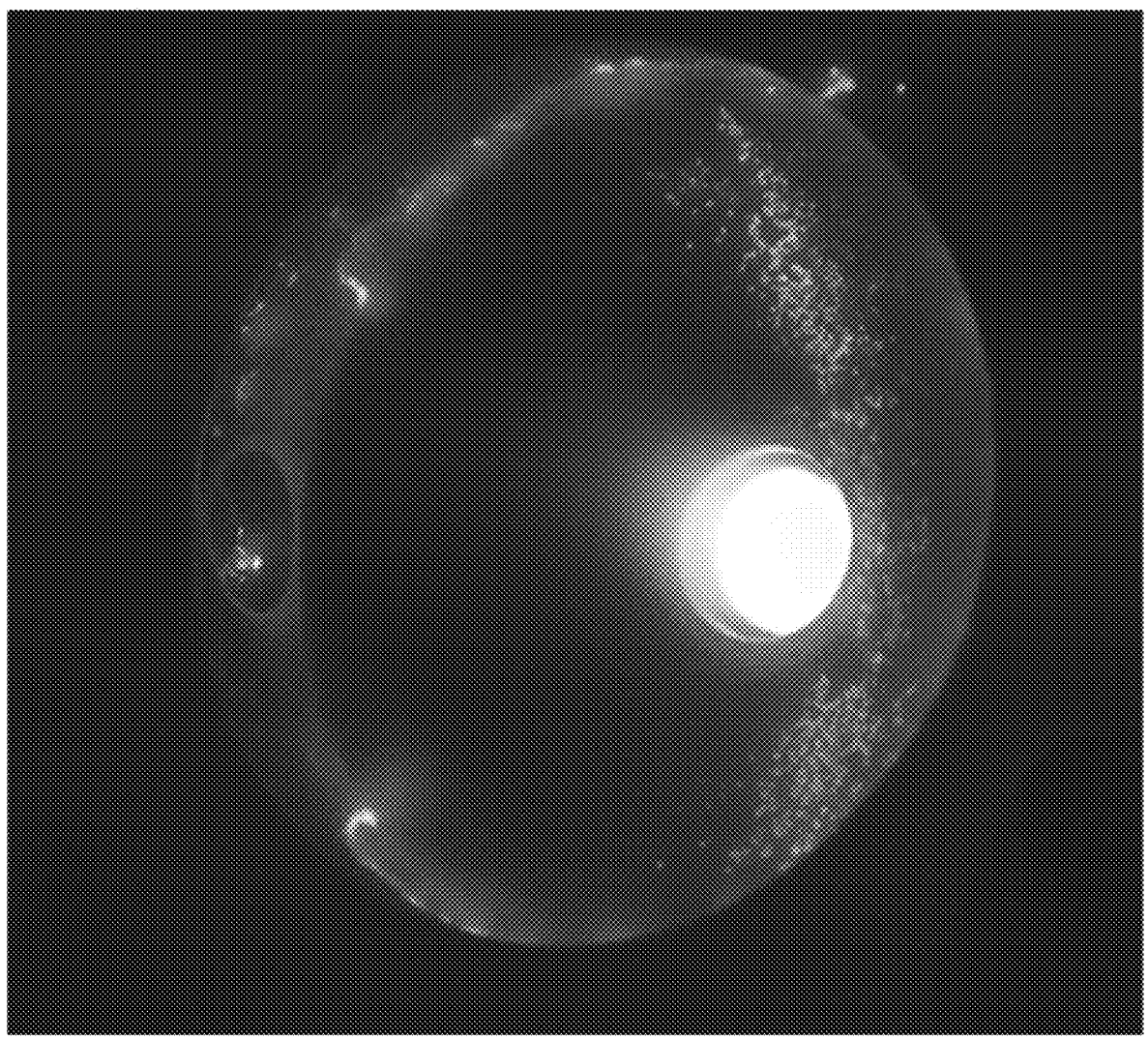
FIG. 51 is a photo of a Thruster firing with electromagnets turned on with current flow in the "forward" direction.
Figure 52:
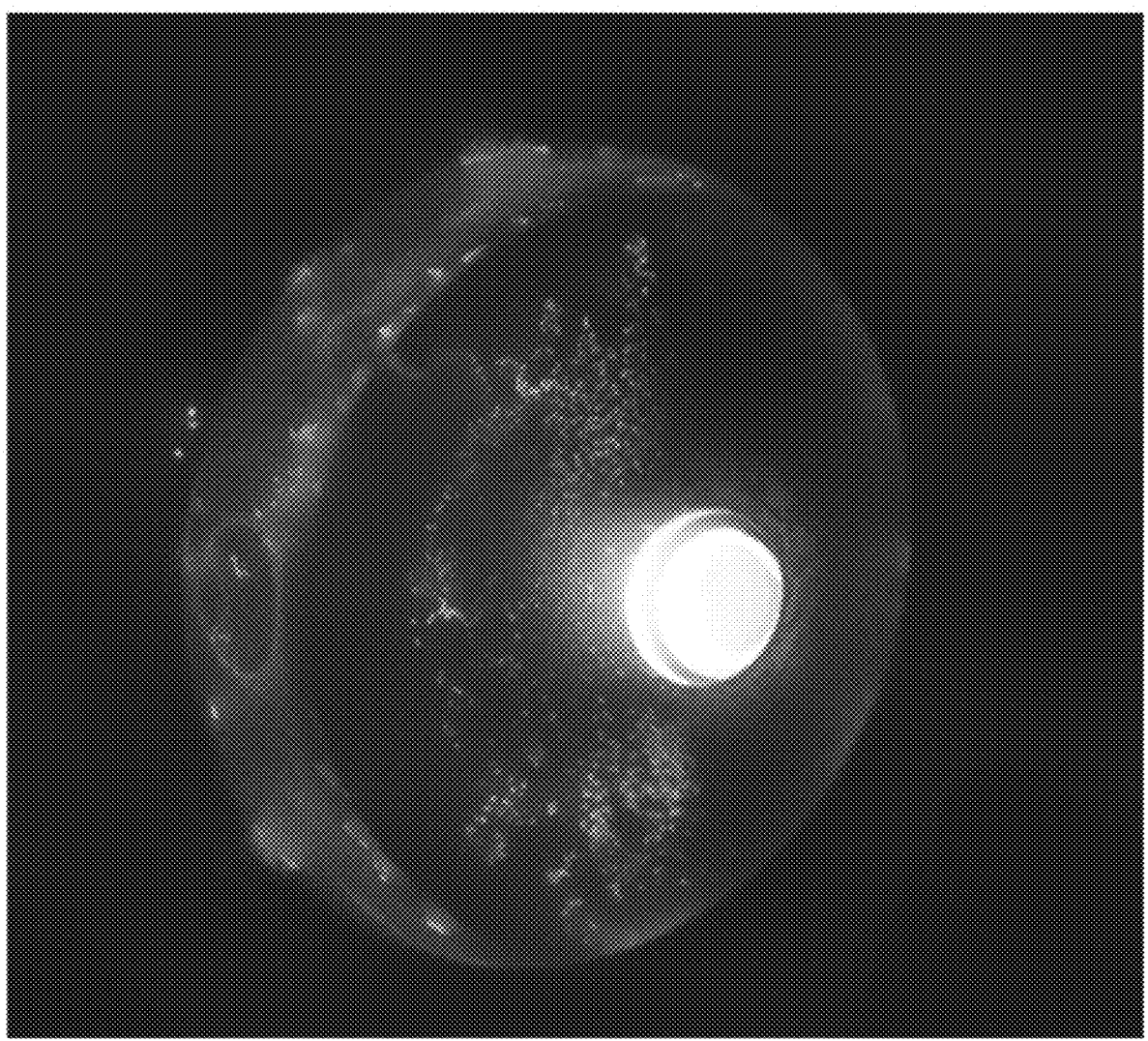
FIG. 52 is a photo of a Thruster firing with electromagnets turned on with current flow in the "reverse" direction.

From the thrust data at 0° the actual angle of the thruster assembly during this test was calculated to be approximately 41° (rather than 45°). The thrust data presented in Table 5 is consistent with a thrust vectoring angle of 9.2° and a two-percent decrease in overall thrust. The effect is also captured in photographs shown in FIGS. 49 and 50, where an asymmetrical thruster plume is visible. FIGS. 51 and 52 are photographs that show the concentration of cathode spots (indicating current attachment) on the same side of the thruster as the asymmetrical plumes.

TABLE 5

Short Cathode Vectoring Thrust Results (Yaw Configuration)

| Electromagnet State | Orientation | Average Ibit [uN-s] |
|---|---|---|
| Off | 0° | 132 |
| Off | 41° | 100 |
| "Forward" | 41° | 83 |
| "Reverse" | 41° | 110 |

Reaction Wheel Desaturation Using FPPT with Thrust Vectoring

The FPPT with Multi-Cathode or Multi-Coil Thrust Vectoring can be used to desaturate onboard reaction wheels (1, 2, or 3-axis) for spacecraft. An ancillary design requirement is that the spacecraft center of gravity (CG) lies close to the FPPT geometric axis, and a maximum distance of a couple of millimeters is suggested, as may be achieved with off-axis balance masses. As a corollary, the CG of the propellant spool must also lie on the FPPT axis and must remain there as propellant is consumed.

Pitch and Yaw. For calculation purposes, it is assumed that the thrust axis is vectored such that the torque lever arm d at the CG is =5 mm, corresponding roughly to a vector deflection angle of 5 degrees. For a given thruster impulse bit $I_{bit}$, the torque impulse bit is then $T_{bit}=d*I_{bit}$. From existing FPPT thrust stand data the thrust for a 32 J bank at 1.3 Hz is 0.35 mN, leading to a 16 J Ibit of 0.125 milliN−s and $T_{bit}$=0.625 microN−m−s/pulse.

For example, for a CubeSat magnetic gyroscope with a saturated angular momentum of L=0.011 N−m−s, the number of pulses needed is then 17,600. At a pulse rate of 2 Hz, this will take 2.5 hours to desaturate 1 wheel and 5 hours to desaturate both pitch and yaw. It is expected that similar times will be characteristic of roll control and roll wheel desaturation.

Low Impedance Hybrid-Anode

A drawback to the FPPT anode with internal fiber feed is that a significant impedance penalty is incurred. The discharge current is pinched to the axis downstream of the anode by the high self-magnetic field with a strength exceeding 2 Tesla and a resulting pressure on axis of tens of atmospheres. This small-diameter pinch region creates an ohmic resistance several times the impedance of the primary discharge, absorbing more than 50% of the stored capacitor bank energy. This energy multiply-ionizes the on-axis discharge plasma, and the majority of the energy is radiated in the ultraviolet, either escaping downstream or being absorbed by the cathode and insulator, heating these components.

Figure 53:
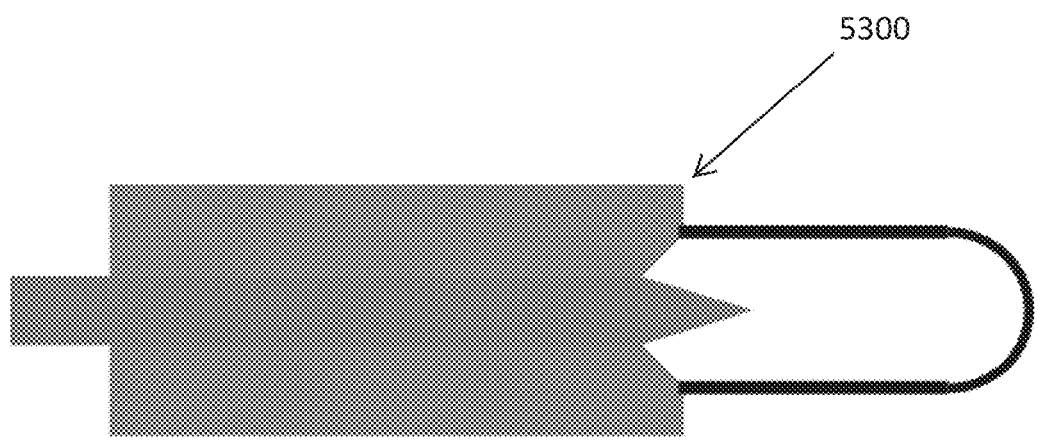
FIG. 53 is an illustration of the FPPT hybrid anode; showing an extender wire with 1-4 milliohms of resistance to reduce total impedance, where the plasma region is to the right side of the image.

The Hybrid-Anode 5300 (FIG. 53) provides an alternate current path to the anode through resistive metal wires attached to the anode. While some of the current flows in the metal wires, the remainder flows in the plasma. The wires can have a hoop form, as shown in FIG. 53, or can be multiple straight wires attached to the anode. Retaining plasma current is essential because plasma radiation is required to evaporate the solid propellant being fed through the anode. While a plasma pinch region will still exist downstream of the anode, the current and radiation are significantly reduced.

The number and arrangement of wires for the Hybrid-Anode is such that the impedance associated with the anode is reduced by an order of magnitude. With this mechanism to reduce impedance of the anode, the efficiency of the thruster is significantly increased, and component heating is significantly reduced.

Low Impedance Multi-Fiber Feed Method

A drawback to the FPPT anode with internal fiber feed is that a large impedance penalty is incurred. The discharge current is pinched to the axis downstream of the anode by the high self-magnetic field with a strength exceeding 2 Tesla and a resulting pressure on axis of tens of atmospheres. This small diameter pinch region creates an ohmic resistance several times the impedance of the primary discharge, absorbing more than 50% of the stored capacitor bank energy. This energy is used to multiply-ionize the discharge plasma, but the majority is radiated in the ultraviolet, either escaping downstream or being absorbed by the cathode and insulator, heating these components.

Figure 54:
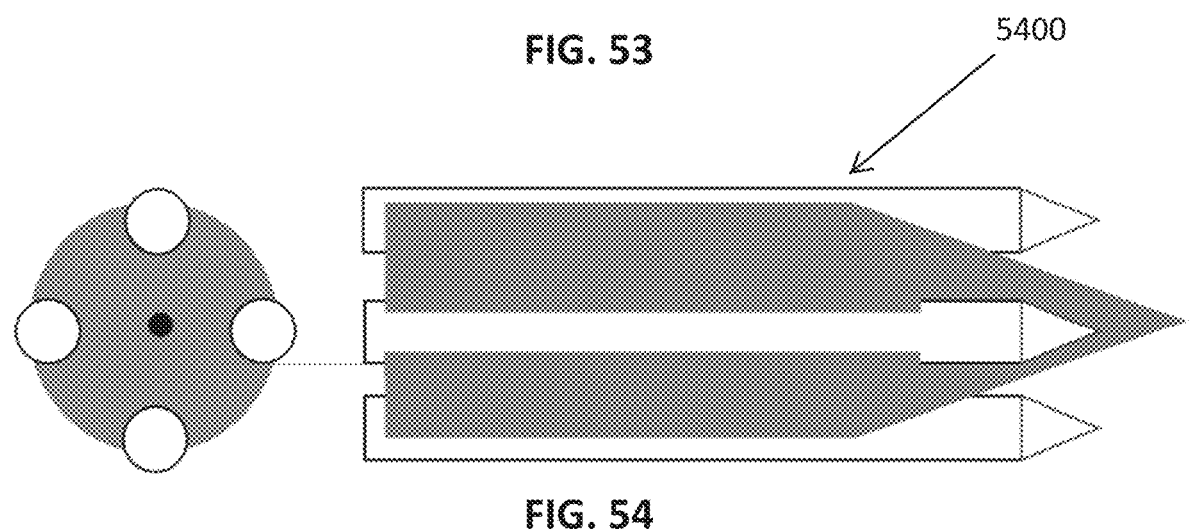
FIG. 54 is an illustration of the FPPT multi-fiber-anode, showing four 1.75 mm diameter fibers used to lower impedance with an anode core having notches to feed fibers, where the plasma region is to the right side of the right image.

A multi-fiber feed method (through anode, insulator, or cathode) increases thruster efficiency by eliminating the downstream pinch region and its associated high impedance and radiation. As an example, a Multi-Fiber-Anode 5400 (FIG. 54) is achieved by feeding two, three or four fibers simultaneously to the exterior of the anode. This arrangement provides a direct connection of the primary discharge current to the anode while retaining the essential source of radiation that evaporates the fiber. While FIG. 54 displays a multi-fiber feed method in which the fiber is fed along the anode, other feed geometries are possible. These include: (a) The fibers are fed axially through holes in the back insulator in close proximity to, but not necessarily touching, the anode. (b) The fibers are fed through insulating, e.g., ceramic, tubes through the back insulator at an angle to the axis. (c) The fibers are fed radially inward through insulating tubes that are supported by the outer electrode (cathode).

Note that the FPPT with Multi-Fiber feed method operates in a mode similar to all classical PPTs, namely that the fiber is located in a region of high magnetic field, and not in zero magnetic field as with the internally fed anode.

Coaxial Plasma Accelerator with High Inductance Gradient for Space Thrusters

Coaxial accelerators are used for accelerating plasma (and projectiles) to high velocity. In these devices the accelerating force is provided by the j×B force per unit volume, where for the MKS system of units j is the density of current flow in amperes per square meter, and B is the magnetic field perpendicular to the direction of the current in Tesla. For applications where low mass is a concern, such as for space thrusters, these devices are usually operated in the "self-field" mode, for which the necessary magnetic field is generated by the current in the device, without the use of sizable auxiliary magnets.

The equation for the total self-field accelerating force of the device in the z direction is $F_z=1/2(dL/dz)I^2$, where I is the total current through the device in amperes and dL/dz is the inductance gradient in henrys per meter in the direction z of the force. For a coaxial device formed of concentric cylindrical electrical conductors a positive or negative current flows from a power source, along an inner conducting electrode of radius Ri, outward between the coaxial conductors to an outer conducting electrode of radius Ro, then returning along the outer conductor to the power source. For this coaxial arrangement the inductance gradient is given by the equation $$\frac{dL}{dz} = \frac{\mu_0}{2\pi}\log_e(R_0/R_i)[\text{henrys/meter}]$$

where $\mu_o$ is the permeability of free space, $4\pi \times 10^{-7}$ [henrys/meter]. From this equation the inductance gradient can only be increased by increasing the radius ratio $R_o/R_i$, but practical and plasma stability considerations restrict the value of $R_o/R_i$ to less than about 10 for plasma conductors.

It is well known that general methods exist to increase the inductance and inductance gradient of current conductors and therefore the accelerating force. In a cylindrical solenoid coil, for example, multiple turns of wire are used to increase the inductance, which increases by the square of the number of turns. Another example is given by the "augmented" railgun, for which the current is conducted by parallel rail (also called parallel plate or parallel strip) conductors separated by insulating sidewalls. The augmentation increases the accelerating force by allowing the current to flow in series through auxiliary side coils arranged to increase the magnetic field between the rails. A special case called the "self-augmented" railgun eliminates the auxiliary coils and creates higher magnetic field using only the rails and a "muzzle short" at the end of the rails.

Unfortunately, the use of multiple turns or augmentation is not practical in a coaxial geometry, because the additional required radial current paths interfere with the axial path of the plasma or projectile being accelerated. This problem does not occur with the parallel plate geometry because the open space between the rails allows for placement of electrical conductors that do not interfere with the accelerated material. Note that for the case of an accelerator formed of parallel thin strips the equation for the inductance gradient becomes: $dL/dz=\mu_o h/w$ [henrys/meter] where h is the separation distance between the two strips, w is the width of the strips in the direction perpendicular to z, and the strip thickness is <<w. From this equation the inductance gradient can be significantly increased by increasing h and decreasing w. For comparison, the inductance gradient for a coaxial accelerator with $R_o/R_i=5$ is 0.32 microhenries/meter, and that for a parallel rail system with h=5 w is 6.3 microhenries/meter, which is a factor of 20 larger than the coaxial geometry and therefore produces a force 20 times larger for the same current.

However, a major difficulty with the parallel plate geometry is the insulating sidewalls, ideally made of ceramic, which can ablate significantly in the presence of the multi-megawatt current discharge existing between the rails, in the worst case reducing the lifetime of the rail accelerator to a single shot. Note that for space thrusters a large number of current pulses, as many as 10 to 100 million, can be required, rendering the parallel plate geometry with sidewalls unsuitable when very long thruster life is needed.

The present invention combines the best feature of the parallel plate geometry (i.e., high inductance gradient) with the best feature of the coaxial geometry (i.e., no sidewalls). The approach is to employ a coaxial geometry for which the effective width w has been reduced by segmenting the cylindrical conductor to increase the inductance gradient according to $dL/dz=\mu_o h/w$, analogous to what has been employed previously on parallel plate thrusters without sidewalls such as the SIMP-LEX thruster.

Figure 55A:
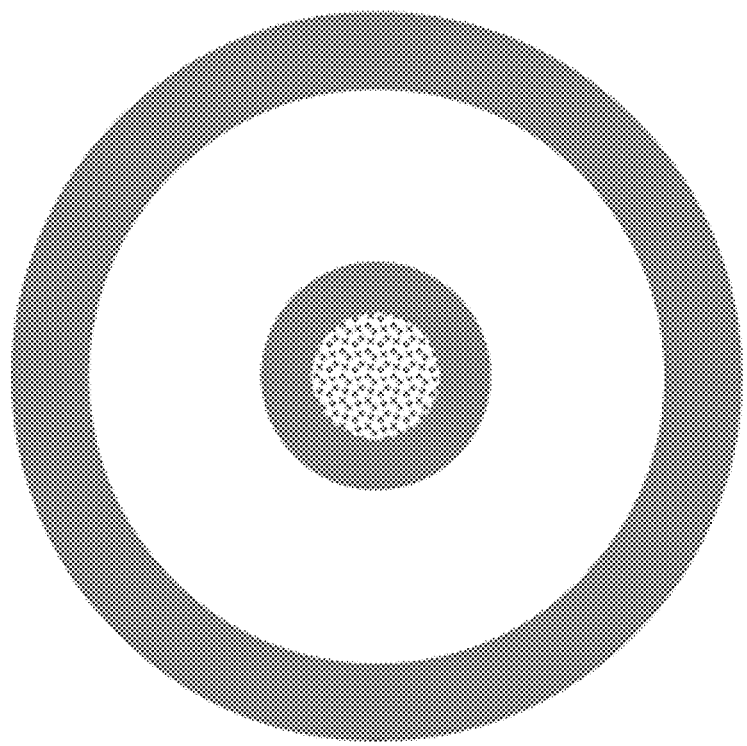
FIG. 55A illustrates a coaxial accelerator with cylindrical outer electrode creating azimuthally-symmetric radial current.
Figure 55B:
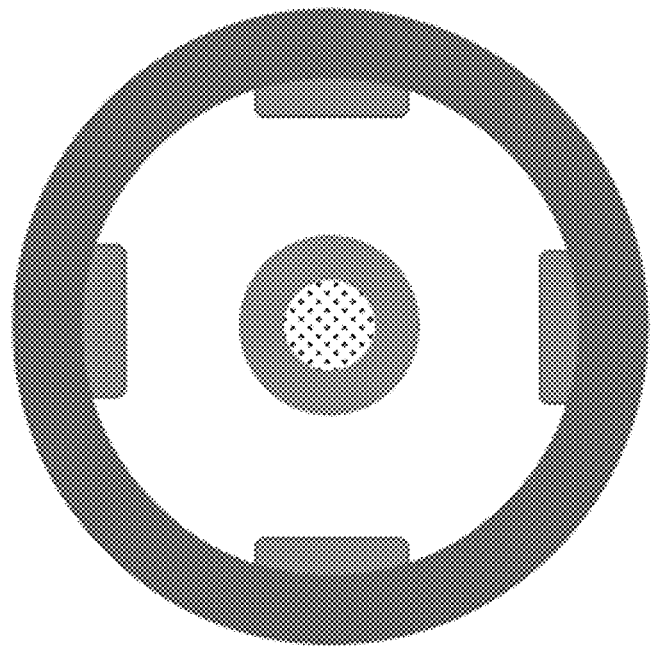
FIG. 55B illustrates a blue non-conducting outer tube structure supporting four segmented strip electrodes creating azimuthally-constricted radial current spokes.

The invention consists of effectively reducing w to increase the inductance gradient, by analogy with the classic parallel plate design, by segmenting the outer cylindrical conductor to restrict the width of the current in the azimuthal direction, forcing the current to flow between inner and outer electrodes in a cross or multi-spoke pattern, FIG. 55B.

FIGS. 55A and 55B show a cathode with a four-segment pattern forcing the current to flow in four narrow radial spokes. The segments can, if desired, be tapered and/or flared outward from the centerline. Gold designates a metal electrode and blue designates a tubular support insulator, preferably made of ceramic to minimize ablation. The 2N segmented electrodes (N=1, 2, 3 . . . ) are extended radially inward to provide separation of the plasma current and the insulator surface to reduce insulator ablation and are equally spaced to maintain azimuthal symmetry. For a fiber-fed space thruster, the center of the inner electrode, which could also be segmented but is not shown segmented in FIGS. 55A and 55B contains a fiber-fed propellant such as Teflon™ (or PTFE equivalent). While four cathode segments are shown, the invention can be achieved with at least two cathode segments.

The segmented electrodes have reduced width w, and the radial electric field is a minimum between segments, forcing the radial current into a multiple spoke pattern with high current density, increasing the inductance gradient dL/dz.

For example, by restricting the current flow area by 50%, the inductance gradient is approximately doubled, doubling the thrust if the total current is kept constant.

If the thrust is increased, the impulse and efficiency are also increased. A second option for accelerators is to reduce the current and maintain the thrust at its unsegmented value, while retaining higher efficiency.

Figure 56A:
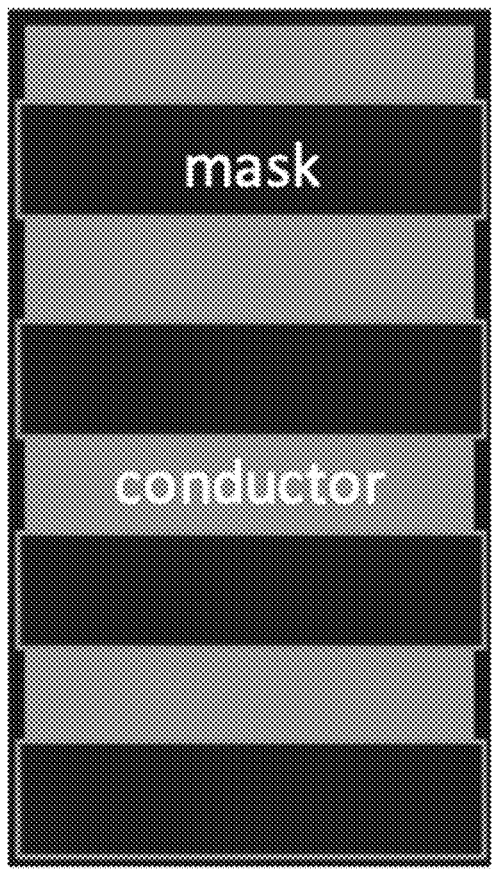
FIG. 56A illustrates an Unwrapped view of the inner surface of the outer conductor to show constant masking and constant inductance gradient in the acceleration direction.
Figure 56B:
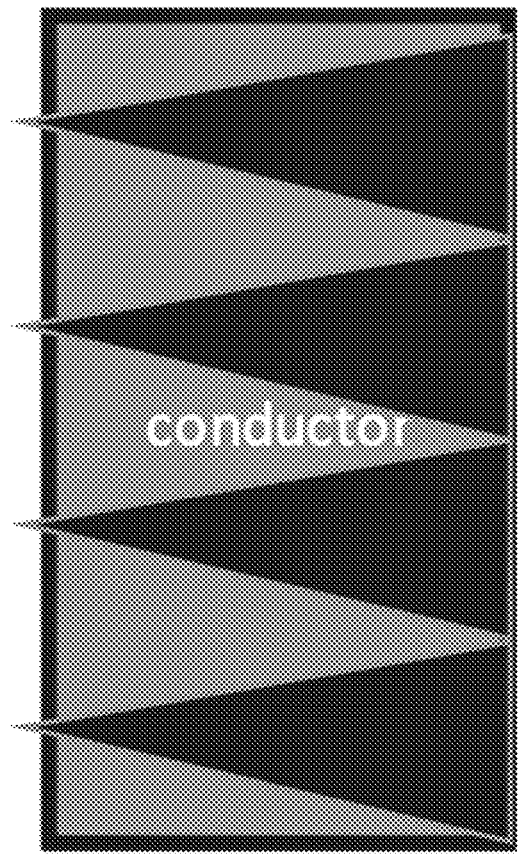
FIG. 56B illustrates an Unwrapped view of the inner surface of the outer conductor to show tapered masking and increasing inductance gradient in the acceleration direction.

In FIGS. 56A & B the cylindrical surface is shown unwrapped, displaying the circumference in the vertical direction. The segments can be of constant width in the axial acceleration direction (FIG. 56A). They can also be tapered, so as to decrease the current width w of the outer electrode, as shown (FIG. 56B), increasing the inductance gradient that varies as h/w.

In combination with segmenting, the electrodes can be flared to increase inductance gradient by increasing h. Because of the $\mu_o(h/w)$ dependence of dL/dz, flaring the outer electrodes will increase h, dL/dz and thrust. The gap h of the outer electrode flares to a larger diameter in the acceleration direction, and the diameter of inner electrode remains constant or contracts slightly in the acceleration direction. Flaring by itself has been used previously on several pulsed thrusters, both parallel plate and coaxial.

It is always desirable that the magnitude of the exhaust flow velocity in a coaxial accelerator is independent of radius. For the unsegmented geometry, FIG. 55B, because the accelerating magnetic pressure varies as $1/r^2$ between electrodes, the distribution of the injected mass is designed to provide a $1/r^2$ variation in the injected mass flux [kg/s/m$^2$] thus producing an efficient exhaust flow velocity from the accelerator that is independent of radius. For a fiber-fed thruster as shown in FIGS. 55A & B the ablated propellant expands spherically, and if the radial current disk is located downstream a distance of 1.8 times the cathode radius, the mass flux variation through the current disk closely approximates $1/r^2$.

For the segmented electrode geometry shown in FIG. 55A, the magnetic pressure is approximately constant with radius so that no advantage is gained from a $1/r^2$ variation in the injected mass flux [kg/s/m$^2$], although a radial variation in mass flux can be advantageous for other segmentation geometries if it results in an exhaust flow velocity that is independent of radius as determined by vacuum tank testing.

Figure 57:
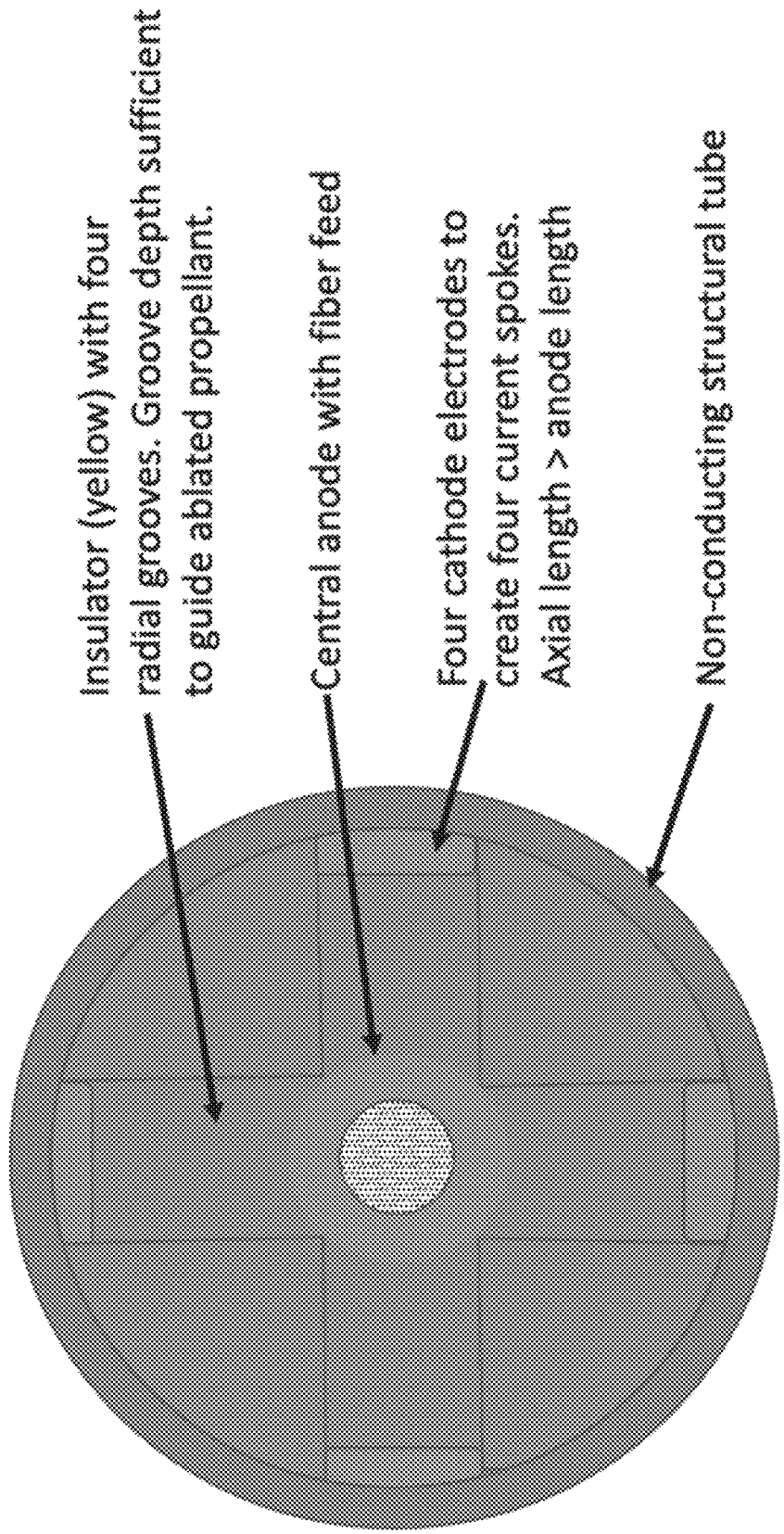
FIG. 57 illustrates a fiber-fed coaxial accelerator with segmented electrodes; injected gas from a short anode inset into a thick back insulator is guided toward the radial current spokes by deep grooves in the insulator.

As was shown in FIG. 55A, electrode segmenting restricts azimuthal current spread. For fiber-fed accelerators, combining segmenting with radial grooving of the back insulator will channel ablated propellant into the segmented current regions, as shown in FIG. 57.

Figure 58:
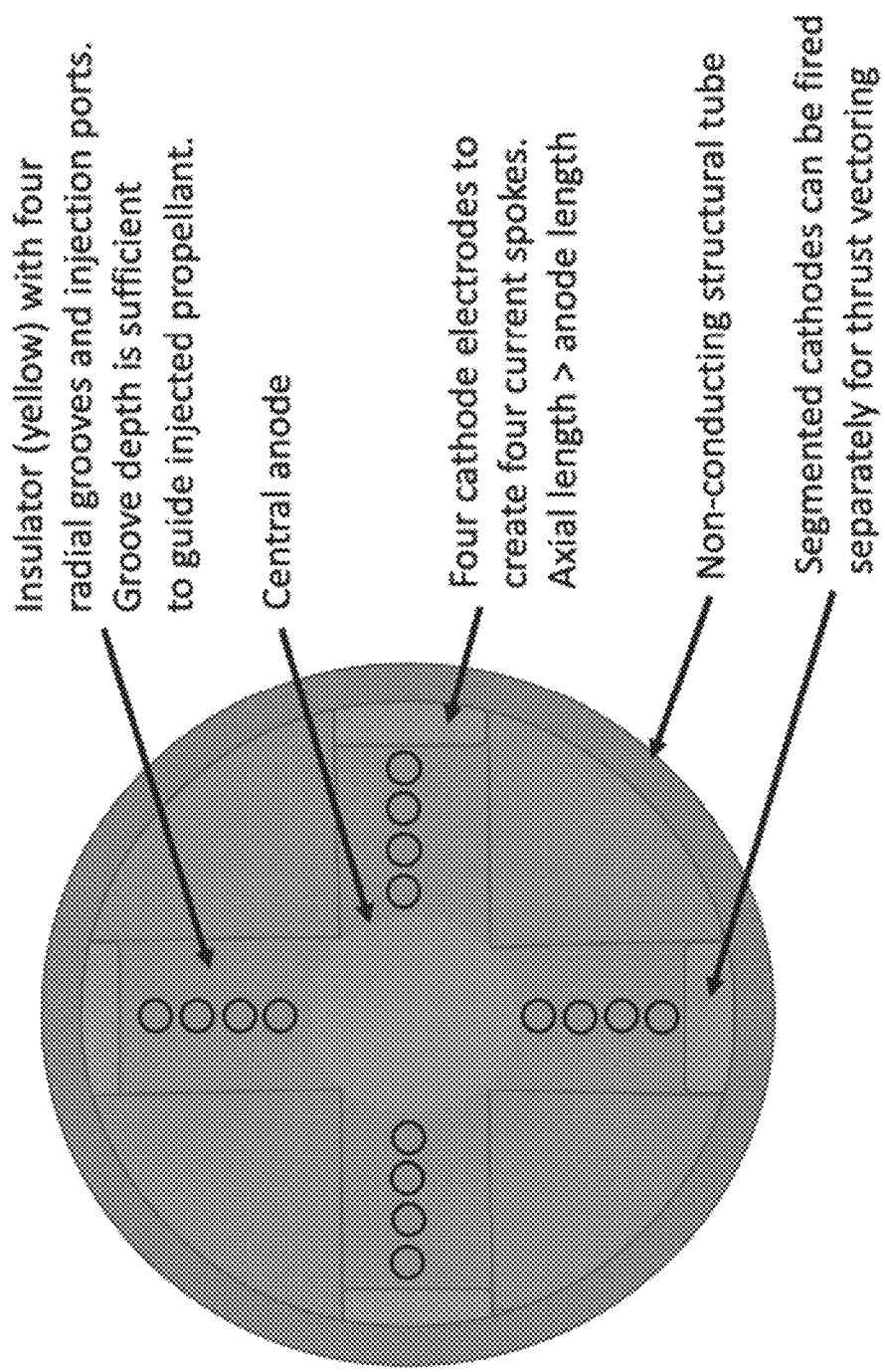
FIG. 58. For gas-fed coaxial accelerators with segmented electrodes, injected gas from an anode, of length approximately the same as the cathode length and inset into a thick back insulator, is guided toward the radial current spokes by deep grooves in the insulator.

For gas-fed coaxial accelerators with segmented electrodes, it is also desirable to restrict the injected gas distribution to minimize the gas injected between segmented regions, where current is reduced, and maximize the gas injected into the segmented regions where current flows. Although the interelectrode region is a vacuum, allowing injected gas to expand freely, this goal is accomplished by injecting gas through supersonic nozzles flanked by radial grooves that keep the bulk of the mass constrained along the injection nozzle axis and in the regions of high current, as shown in FIG. 58.

Both the segmented fiber-fed and segmented gas-fed thrusters can be adapted for pitch and yaw thrust vectoring, preferably with four equally-spaced segments. By supplying each segment with a separate capacitor bank, and preferentially firing 1, 2 or 3 of the banks, a component of thrust is created normal to the thruster axis, enabling pitch and/or yaw torque on a spacecraft. Alternatively, the vectoring on a given pulse can by limited to either pitch or yaw and a sequence of pulses can be used. For example, by alternating positive pitch-vectored pulses with positive yaw-vectored pulses, an average positive thrust vectoring can be created at an angle of 45° to pure pitch and yaw.

In summary various embodiments are disclosed and illustrated herein. In one such embodiment there is provided a pulsed plasma thruster defined to include: (a) a spool having a fiber propellant wound thereon; (b) a stepper motor in communication with the fiber propellant to pull the fiber propellant from the spool; (c) an insulated tube configured to have one end in communication with the stepper motor such that the fiber propellant is fed into the insulated tube; (d) an anode, electrically connected to ground, bored through and having one end in communication with the insulated tube, such that the fiber propellant travels through the anode, the anode having an exit end, wherein the fiber propellant fed through the anode exits at the exit end; (e) a coaxial insulator positioned about the exit end of the anode; (f) at least two cathodes further positioned about the coaxial insulator having a combined interior profile shaped into a nozzle region, and each cathode, of the at least two cathodes, having a corresponding insulated opening; (g) each cathode having a corresponding capacitor bank electrically connected in parallel to a power processing unit, each capacitor bank having a positive electrical connection to the anode and further having a negative electrical connection to its corresponding cathode, and wherein each capacitor bank is configured to lower its equivalent series resistance raising a pulse current and raising a predominantly electromagnetic $\vec{j}\times\vec{B}\,\vec{j}\times\vec{B}$ thrust generated by the pulsed plasma thruster; and (h) each cathode having a corresponding igniter fitted within the insulated opening defined by the cathode, and wherein when each igniter is pulsed, each igniter is configured to expel electrons toward the anode region to ignite a primary high current, high magnetic field discharge between the anode and cathodes thereby creating a plasma that vaporizes the fiber propellant at the exit end, and wherein the vaporizing fiber propellant combines with the high current discharge to create a partially or fully ionized plasma electromagnetically and electrothermally accelerated outward from the nozzle region to produce the predominantly $\vec{j}\times\vec{B}\,\vec{j}\times\vec{B}$ thrust, and wherein as the fiber propellant vaporizes, the stepper motor feeds more fiber propellant from the spool to the exit end.

In another such embodiment there is provided a pulsed plasma thruster defined to have (a) a centrally located anode; (b) a coaxial insulator positioned about an exit end of the centrally located anode; (c) a fiber propellant feed system including a motor configured to pull a fiber propellant from a spool and feed the fiber propellant to the centrally located anode and towards an end of the centrally located anode; (d) at least two cathodes insulated from each other and configured about the coaxial insulator to define an interior profile shaped into a nozzle region, and each cathode, of the at least two cathodes, having a corresponding insulated opening; and (e) an igniter fitted through each insulated opening in the at least two cathodes, wherein when the igniters are triggered, either together or separately, the igniters are configured to expel electrons toward the anode region to ignite a primary high energy discharge between the centrally located anode and the cathode thereby creating a plasma that vaporizes the fiber propellant at the end of the centrally located anode thereby generating vaporized and dissociated fiber propellant and wherein the dissociated fiber propellant combines with the primary high energy discharge to create a partially or fully ionized plasma, wherein the plasma is electromagnetically and electrothermally accelerated to produce predominantly $\vec{j}\times\vec{B}\,\vec{j}\times\vec{B}$ thrust, and wherein as the fiber propellant vaporizes, the motor feeds more fiber propellant from the spool to the end of the centrally located anode.

In yet another embodiment there is provided a pulsed plasma thruster defined to include (a) a centrally located anode; (b) a coaxial insulator positioned about an exit end of the centrally located anode; (c) a fiber propellant feed system including a motor configured to pull a fiber propellant from a spool and feed the fiber propellant to the centrally located anode and towards an end of the centrally located anode; (d) a cathode positioned about the coaxial insulator having a combined interior profile shaped into a nozzle region; (e) an igniter fitted through an opening in the cathode, wherein when the igniter is triggered, the igniter is configured to expel electrons toward the anode region to ignite a primary high energy discharge between the centrally located anode and the cathode thereby creating a plasma that vaporizes and dissociates the fiber propellant at the end of the centrally located anode thereby generating dissociated fiber propellant, and wherein the dissociated fiber propellant combines with the primary high energy discharge to create a partially or fully ionized plasma, wherein the plasma is electromagnetically and electrothermally accelerated to produce predominantly $\vec{j}\times\vec{B}\,\vec{j}\times\vec{B}$ thrust, and wherein as the fiber propellant vaporizes the motor feeds more fiber propellant from the spool to the end of the centrally located anode; and (f) at least one pair of independently controlled reversible electromagnets insulated from the plasma discharge and positioned between the anode and the cathode and positioned opposite of each other, and wherein each electromagnet is configured to exert electromagnetic fields over a volume of the plasma discharge to create positive or negative $B_z$ fields to affect the direction of the $\vec{j}\times\vec{B}\,\vec{j}\times\vec{B}$ thrust.

In yet still another embodiment there is provided a pulsed plasma thruster defined to have (a) a centrally located anode; (b) a coaxial insulator positioned about an exit end of the centrally located anode; (c) a fiber propellant feed system including a motor configured to pull a fiber propellant from a spool and feed the fiber propellant to the centrally located anode and towards an end of the centrally located anode; (d) a cathode positioned about the coaxial insulator having a combined interior profile shaped into a nozzle region; (e) an igniter fitted through an opening in the cathode, wherein when the igniter is triggered, the igniter is configured to expel electrons toward the anode region to ignite a primary high energy discharge between the centrally located anode and the cathode thereby creating a plasma that vaporizes the fiber propellant at the end of the centrally located anode thereby generating vaporized and dissociated fiber propellant, and wherein the dissociated fiber propellant combines with the primary high energy discharge to create a partially or fully ionized plasma, wherein the plasma is electromagnetically and electrothermally accelerated to produce predominantly $\vec{j}\times\vec{B}\,\vec{j}\times\vec{B}$ thrust, and wherein as the fiber propellant vaporizes the motor feeds more fiber propellant from the spool to the end of the centrally located anode; and (f) a resistive metal wire or multiple wires attached to the anode and configured to increase thruster efficiency and reduce component heating.

In yet another embodiment there is provided a pulsed plasma thruster having: (a) a centrally located anode; (b) a coaxial insulator positioned about an exit end of the centrally located anode; (c) at least two segmented cathodes electrically connected to each other to form a single cathode, the single cathode positioned about the coaxial insulator, wherein the coaxial insulator and single cathode combine to define an interior profile that is shaped into a nozzle region; (d) a gas propellant injected into the nozzle region between the single cathode and centrally located anode; and (e) an igniter, wherein when the igniter is triggered, the igniter is configured to expel electrons toward the anode region to ignite a primary high energy discharge between the centrally located anode and the single cathode thereby creating a plasma that vaporizes and dissociates the gas propellant thereby generating dissociated gas propellant, and wherein the dissociated gas propellant combines with the primary high energy discharge to create a partially or fully ionized plasma, wherein the plasma is electromagnetically and electrothermally accelerated to produce predominantly $\vec{j}\times\vec{B}\,\vec{j}\times\vec{B}$ thrust.

As provided herein one or more of the above embodiments may be combined with yet other aspects of different components as defined by one or more of the following: (a) where at least two cathodes are defined as four cathodes equally spaced around the coaxial insulator; (b) where the propellant fiber is made of polytetrafluoroethylene (Teflon™ (or PTFE equivalent)); (c) when provided with four cathodes, the corresponding igniters achieve pitch and yaw vectoring; (d) when provided with at least two cathodes, the corresponding igniters achieve pitch and yaw vectoring; (e) where each cathode has a corresponding igniter and the igniters are triggered to achieve pitch and yaw vectoring; (f) where each capacitor bank has a separate corresponding power processing unit; (g) where each cathode, of at least two cathodes, has a corresponding capacitor bank electrically connected in parallel to a power processing unit, each capacitor bank having a positive electrical connection to the anode and further having a negative electrical connection to its corresponding cathode, and wherein each capacitor bank is configured to lower its equivalent series resistance raising a pulse current and raising the predominantly $\vec{j}\times\vec{B}\,\vec{j}\times\vec{B}$ thrust generated by the pulsed plasma thruster; (h) where the at least two cathodes are defined as four cathodes equally spaced around the coaxial insulator and each having a corresponding insulated opening to receive an igniter, whereby four igniters are separately positioned in each corresponding insulated opening; (i) where the four cathodes and corresponding four igniters are configured to desaturate reaction wheels when onboard a spacecraft; (j) where each electromagnet, of the independently controlled reversible electromagnets, is connected to an H-bridge MOSFET; (k) where each of the at least one pair of independently controlled reversible electromagnets are insulated from the plasma discharge and positioned radially in the coaxial insulator between the anode and cathode; (l) where the at least one pair of independently controlled reversible electromagnets is further defined as two pair of independently controlled reversible electromagnets, wherein one pair of independently controlled reversible electromagnets being positioned 180 degree offset of the other pair, such that each independently controlled reversible electromagnet is at a 90 degree offset from each other; (m) where the resistive metal wire forms a hoop about the propellant; (n) where the fiber propellant is fed into two or more insulated tubes positioned about the exterior of the anode; (o) wherein one or more of the embodiment further includes at least one pair of independently controlled reversible electromagnets being insulated from the plasma discharge and being positioned between the anode and the cathode and positioned opposite of each other, and wherein each electromagnet is further insulated from the plasma discharge, and wherein each electromagnet is configured to exert electromagnetic fields over a volume of the plasma discharge to create positive or negative $B_z$ fields to affect the direction of the $\vec{j} \times \vec{B}\vec{j} \times \vec{B}$ thrust; (p) where the igniter is fitted through an opening in or adjacent to at least one of the cathodes; (q) where the segmented cathodes can be parallel, tapered or flared outward from a centerline; and/or (r) where the segmented cathodes are profiled to strips or plates.

While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention.

We claim:

1. A pulsed plasma thruster comprising:
a spool having a fiber propellant wound thereon;
a stepper motor in communication with the fiber propellant to pull the fiber propellant from the spool;
an insulated tube configured to have one end in communication with the stepper motor such that the fiber propellant is fed into the insulated tube;
an anode, electrically connected to ground, bored through and having one end in communication with the insulated tube, such that the fiber propellant travels through the anode, the anode having an exit end, wherein the fiber propellant fed through the anode exits at the exit end;
a coaxial insulator positioned about the exit end of the anode;
at least two cathodes further positioned about the coaxial insulator having a combined interior profile shaped into a nozzle region, and each cathode, of the at least two cathodes, having a corresponding insulated opening;
each cathode of the at least two cathodes having a corresponding capacitor bank electrically connected in parallel to a power processing unit, each capacitor bank having a positive electrical connection to the anode and further having a negative electrical connection to a corresponding cathode among the at least two cathodes, and wherein each capacitor bank is configured to lower a respective equivalent series resistance raising a pulse current and raising a predominantly electromagnetic thrust generated by the pulsed plasma thruster;
each cathode, of the at least two cathodes, having a corresponding igniter fitted within the insulated opening defined by the at least two cathode and wherein when each igniter is pulsed, each igniter is configured to expel electrons toward the anode region to ignite a primary high current, high magnetic field discharge between the anode and at least two cathodes thereby creating a plasma that vaporizes the fiber propellant at the exit end, and wherein the vaporizing fiber propellant combines with the high current discharge to create a partially or fully ionized plasma electromagnetically and electrothermally accelerated outward from the nozzle region to produce the predominantly $\vec{j} \times \vec{B}\vec{j} \times \vec{B}$ thrust, and wherein as the fiber propellant vaporizes, the stepper motor feeds more fiber propellant from the spool to the exit end.

2. The pulsed plasma thruster of claim 1, wherein the at least two cathodes are defined as four cathodes equally spaced around the coaxial insulator.

3. The pulsed plasma thruster of claim 2, wherein the propellant fiber is made of polytetrafluoroethylene.

4. The pulsed plasma thruster of claim 2, wherein the four cathodes and corresponding igniters achieve pitch and yaw vectoring.

5. The pulsed plasma thruster of claim 1, wherein two cathodes among the at least two cathodes and corresponding igniters achieve pitch and yaw vectoring.

6. The pulsed plasma thruster of claim 1, wherein each capacitor bank has a separate corresponding power processing unit.

7. A pulsed plasma thruster comprising:
a centrally located anode;
a coaxial insulator positioned about an exit end of the centrally located anode;
a fiber propellant feed system including a motor configured to pull a fiber propellant from a spool and feed the fiber propellant to the centrally located anode and towards an end of the centrally located anode;
at least two cathodes insulated from each other and configured about the coaxial insulator to define an interior profile shaped into a nozzle region, and each cathode, of the at least two cathodes, having a corresponding insulated opening;
an igniter fitted through each insulated opening in the at least two cathodes, wherein when the igniters are triggered, either together or separately, the igniters are configured to expel electrons toward an anode region to ignite a primary high energy discharge between the centrally located anode and at least one of the at least two cathodes thereby creating a plasma that vaporizes the fiber propellant at the end of the centrally located anode thereby generating vaporized and dissociated fiber propellant, and wherein the dissociated fiber propellant combines with the primary high energy discharge to create a partially or fully ionized plasma, wherein the plasma is electromagnetically and electrothermally accelerated to produce predominantly $\vec{j} \times \vec{B}$ $\vec{j} \times \vec{B}$ thrust, and wherein as the fiber propellant vaporizes, the motor feeds more fiber propellant from the spool to the end of the centrally located anode.

8. The pulsed plasma thruster of claim 7, wherein each cathode, of the at least two cathodes, has a corresponding capacitor bank electrically connected in parallel to a power processing unit, each capacitor bank having a positive electrical connection to the anode and further having a negative electrical connection to its corresponding cathode, and wherein each capacitor bank is configured to lower its equivalent series resistance raising a pulse current and raising the predominantly $\vec{j} \times \vec{B}\vec{j} \times \vec{B}$ thrust generated by the pulsed plasma thruster.

9. The pulsed plasma thruster of claim 7, wherein the at least two cathodes are defined as four cathodes equally spaced around the coaxial insulator and each having a corresponding insulated opening to receive an igniter, whereby four ignitors are separately positioned in each corresponding insulated opening.

10. The pulsed plasma thruster of claim 9, wherein the four cathodes and corresponding four igniters achieve pitch and yaw vectoring.

11. The pulsed plasma thruster of claim 9, wherein the four cathodes and corresponding four igniters are configured to desaturate reaction wheels when onboard a spacecraft.

12. A pulsed plasma thruster comprising:
a centrally located anode;
a coaxial insulator positioned about an exit end of the centrally located anode;
a fiber propellant feed system including a motor configured to pull a fiber propellant from a spool and feed the fiber propellant to the centrally located anode and towards an end of the centrally located anode;
a cathode positioned about the coaxial insulator having a combined interior profile shaped into a nozzle region;
an igniter fitted through an opening in the cathode, wherein when the igniter is triggered, the igniter is configured to expel electrons toward the anode region to ignite a primary high energy discharge between the centrally located anode and the cathode thereby creating a plasma that vaporizes and dissociates the fiber propellant at the end of the centrally located anode thereby generating dissociated fiber propellant, and wherein the dissociated fiber propellant combines with the primary high energy discharge to create a partially or fully ionized plasma, wherein the plasma is electromagnetically and electrothermally accelerated to produce predominantly $\vec{j} \times \vec{B} \vec{j} \times \vec{B}$ thrust, and wherein as the fiber propellant vaporizes the motor feeds more fiber propellant from the spool to the end of the centrally located anode; and
at least one pair of independently controlled reversible electromagnets insulated from the plasma discharge and positioned between the anode and the cathode and positioned opposite of each other, and wherein each electromagnet of the at least one pair of independently controlled reversible electromagnets is configured to exert electromagnetic fields over a volume of the plasma discharge to create positive or negative $B_z$ fields to affect the direction of the $\vec{j} \times \vec{B} \vec{j} \times \vec{B}$ thrust.

13. The pulsed plasma thruster of claim 12 wherein each electromagnet, of the independently controlled reversible electromagnets, is connected to an H-bridge MOSFET.

14. The pulsed plasma thruster of claim 12 wherein each of the at least one pair of independently controlled reversible electromagnets are insulated from the plasma discharge and positioned radially in the coaxial insulator between the anode and cathode.

15. The pulsed plasma thruster of claim 12 wherein the at least one pair of independently controlled reversible electromagnets is further defined as two pair of independently controlled reversible electromagnets, wherein one pair of independently controlled reversible electromagnets being positioned 180 degree offset of the other pair, such that each independently controlled reversible electromagnet is at a 90 degree offset from each other.

16. A pulsed plasma thruster comprising:
a centrally located anode;
a coaxial insulator positioned about an exit end of the centrally located anode;
a fiber propellant feed system including a motor configured to pull a fiber propellant from a spool and feed the fiber propellant to the centrally located anode and towards an end of the centrally located anode;
a cathode positioned about the coaxial insulator having a combined interior profile shaped into a nozzle region;
an igniter fitted through an opening in the cathode, wherein when the igniter is triggered, the igniter is configured to expel electrons toward an anode region to ignite a primary high energy discharge between the centrally located anode and the cathode thereby creating a plasma that vaporizes the fiber propellant at the end of the centrally located anode thereby generating vaporized and dissociated fiber propellant, and wherein the dissociated fiber propellant combines with the primary high energy discharge to create a partially or fully ionized plasma, wherein the plasma is electromagnetically and electrothermally accelerated to produce predominantly $\vec{j} \times \vec{B} \vec{j} \times \vec{B}$ a thrust, and wherein as the fiber propellant vaporizes the motor feeds more fiber propellant from the spool to the end of the centrally located anode; and
a resistive metal wire or multiple wires attached to the anode and configured to increase thruster efficiency and reduce component heating.

17. The pulsed plasma thruster of claim 16 wherein the resistive metal wire forms a hoop about the propellant.

18. The pulsed plasma thruster of claim 16, wherein the fiber propellant is fed into two or more insulated tubes positioned about the exterior of the centrally located anode.

19. A pulsed plasma thruster comprising:
a centrally located anode;
a coaxial insulator positioned about an exit end of the centrally located anode;
at least two segmented cathodes electrically connected to each other to form a single cathode, the single cathode positioned about the coaxial insulator, wherein the coaxial insulator and single cathode combine to define an interior profile that is shaped into a nozzle region;
a gas propellant injected into the nozzle region between the single cathode and centrally located anode; and
an igniter, wherein when the igniter is triggered, the igniter is configured to expel electrons toward the anode region to ignite a primary high energy discharge between the centrally located anode and the single cathode thereby creating a plasma that vaporizes and dissociates the gas propellant thereby generating dissociated gas propellant, and wherein the dissociated gas propellant combines with the primary high energy discharge to create a partially or fully ionized plasma, wherein the plasma is electromagnetically and electrothermally accelerated to produce predominantly $\vec{j} \times \vec{B} \vec{j} \times \vec{B}$ thrust.

20. The pulsed plasma thruster of claim 19 further comprising:
at least one pair of independently controlled reversible electromagnets being insulated from the plasma discharge and being positioned between the centrally located anode and the single cathode and positioned opposite of each other, and wherein each electromagnet is further insulated from the plasma discharge, and wherein each electromagnet of the at least one pair of independently controlled reversible electromagnets is configured to exert electromagnetic fields over a volume of the plasma discharge to create positive or negative $B_z$ fields to affect the direction of the $\vec{j} \times \vec{B} \vec{j} \times \vec{B}$ thrust.

21. The pulsed plasma thruster of claim 19, wherein the igniter is fitted through an opening in or adjacent to at least one cathode, of the at least two segmented cathodes.

22. The pulsed plasma thruster of claim 21, wherein each cathode, of the at least two segmented cathodes, has a corresponding igniter and the igniters are triggered to achieve pitch and yaw vectoring.

23. The pulsed plasma thruster of claim 19 wherein the at least two segmented cathodes can be parallel, tapered or flared outward from a centerline.

24. The pulsed plasma thruster of claim 19, wherein the at least two segmented cathodes are profiled to strips or plates.

* * * * *